US011804929B2

(12) United States Patent
Park et al.

(10) Patent No.: US 11,804,929 B2
(45) Date of Patent: *Oct. 31, 2023

(54) APPARATUS AND METHOD FOR TRANSMISSION OF UPLINK CONTROL INFORMATION IN NETWORK COOPERATIVE COMMUNICATION

(71) Applicant: SAMSUNG ELECTRONICS CO., LTD., Suwon-si (KR)

(72) Inventors: Jinhyun Park, Suwon-si (KR); Hoondong Noh, Suwon-si (KR); Youngrok Jang, Suwon-si (KR); Heecheol Yang, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/049,242

(22) Filed: Oct. 24, 2022

(65) Prior Publication Data

US 2023/0078277 A1    Mar. 16, 2023

Related U.S. Application Data

(63) Continuation of application No. 16/994,473, filed on Aug. 14, 2020, now Pat. No. 11,483,099.

(30) Foreign Application Priority Data

Aug. 16, 2019 (KR) .................. 10-2019-0100462
Oct. 11, 2019 (KR) .................. 10-2019-0126491
(Continued)

(51) Int. Cl.
*H04L 1/1812* (2023.01)
*H04B 7/0456* (2017.01)
(Continued)

(52) U.S. Cl.
CPC ......... *H04L 1/1819* (2013.01); *H04B 7/0456* (2013.01); *H04L 5/0055* (2013.01);
(Continued)

(58) Field of Classification Search
CPC ... H04B 7/0456; H04L 1/1819; H04L 1/1887; H04L 1/189; H04L 1/1896; H04L 5/0007;
(Continued)

(56) References Cited

U.S. PATENT DOCUMENTS 7,907,906 B2    3/2011   Murata et al.
8,199,666 B2    6/2012   Shen
(Continued)

FOREIGN PATENT DOCUMENTS

CA    3072214 A1  *  2/2019   .......... H04W 72/042
CN    105917598 A  *  8/2016   ........... H04L 1/0072
(Continued)

OTHER PUBLICATIONS

European Patent Office, "Supplementary European Search Report" dated Feb. 28, 2022, in connection with European Patent Application No. 20853686.2, 11 pages.
(Continued)

*Primary Examiner* — Eric Nowlin

(57) ABSTRACT

The disclosure relates to a communication technique and a system for integrating a 5G communication system with IoT technology to support a higher data transmission rate after a 4G system. The disclosure may be applied to intelligent services, based on 5G communication technology and IoT-related technologies (e.g., smart home, smart building, smart city, smart car or connected car, health care, digital education, retail, security and safety related services, etc.).

16 Claims, 24 Drawing Sheets

(30) Foreign Application Priority Data

Oct. 24, 2019 (KR) ........................ 10-2019-0133304
Feb. 14, 2020 (KR) ........................ 10-2020-0018624

(51) Int. Cl.
- H04L 5/00 (2006.01)
- H04W 76/27 (2018.01)
- H04W 72/0446 (2023.01)
- H04W 72/23 (2023.01)

(52) U.S. Cl.
CPC ....... H04W 72/0446 (2013.01); H04W 72/23 (2023.01); H04W 76/27 (2018.02)

(58) Field of Classification Search
CPC .............. H04L 5/0055; H04W 72/042; H04W 72/0446; H04W 76/27
See application file for complete search history.

(56) References Cited

U.S. PATENT DOCUMENTS

| | | | |
|---|---|---|---|
| 9,667,386 B2 * | 5/2017 | Li | ............................ H04L 1/189 |
| 10,020,917 B2 | 7/2018 | Lee et al. | |
| 10,484,141 B2 * | 11/2019 | Li | ............................ H04L 1/189 |
| 10,575,299 B2 * | 2/2020 | Ying | ................... H04W 72/044 |
| 10,631,174 B2 | 4/2020 | You et al. | |
| 11,317,396 B2 * | 4/2022 | Khoshnevisan | .......... H04L 1/08 |
| 11,483,099 B2 * | 10/2022 | Park | ....................... H04L 1/1671 |
| 11,503,490 B2 * | 11/2022 | Park | ....................... H04L 1/1671 |
| 11,595,997 B2 * | 2/2023 | Moroga | ................... H04L 1/189 |
| 2006/0035594 A1 | 2/2006 | Murata et al. | |
| 2010/0260120 A1 | 10/2010 | Shen | |
| 2012/0236793 A1 | 9/2012 | Shen | |
| 2015/0131579 A1 * | 5/2015 | Li | .......................... H04L 1/1858 370/329 |
| 2015/0181576 A1 | 6/2015 | Papasakellariou et al. | |
| 2015/0318960 A1 | 11/2015 | Shen | |
| 2017/0134124 A1 | 5/2017 | Lee et al. | |
| 2017/0264399 A1 * | 9/2017 | Li | .......................... H04L 1/1812 |
| 2018/0109286 A1 * | 4/2018 | Yao | ......................... H04W 4/70 |
| 2019/0053211 A1 * | 2/2019 | Ying | ...................... H04W 72/23 |
| 2020/0015229 A1 * | 1/2020 | Yang | ..................... H04W 72/21 |
| 2020/0213980 A1 | 7/2020 | Takeda et al. | |
| 2020/0221317 A1 | 7/2020 | You et al. | |
| 2020/0367208 A1 * | 11/2020 | Khoshnevisan | ...... H04L 5/1469 |
| 2021/0021386 A1 | 1/2021 | Gao | |
| 2021/0099255 A1 | 4/2021 | Gao | |
| 2021/0226759 A1 | 7/2021 | Takeda et al. | |
| 2021/0259004 A1 * | 8/2021 | Takeda | .................. H04W 72/21 |
| 2021/0297192 A1 | 9/2021 | Miao | |
| 2021/0306107 A1 | 9/2021 | Yin et al. | |
| 2021/0307051 A1 * | 9/2021 | Chatterjee | ............. H04L 1/0025 |
| 2021/0314094 A1 | 10/2021 | Gao | |
| 2021/0314107 A1 | 10/2021 | Yoshioka et al. | |
| 2021/0321353 A1 | 10/2021 | Muruganathan et al. | |
| 2021/0352731 A1 | 11/2021 | Yang et al. | |
| 2022/0131645 A1 * | 4/2022 | Miao | ......................... H04L 1/08 |
| 2022/0149996 A1 | 5/2022 | Moon et al. | |
| 2022/0256566 A1 * | 8/2022 | Gao | .................. H04W 72/1263 |
| 2022/0360306 A1 * | 11/2022 | Sun | ....................... H04W 72/23 |

FOREIGN PATENT DOCUMENTS

| | | | | |
|---|---|---|---|---|
| CN | 110324126 A | | 10/2019 | |
| CN | 105917598 B | * | 12/2019 | .......... H04L 1/0072 |
| CN | 110875801 A | * | 3/2020 | .......... H04L 1/0072 |
| CN | 112567666 A | | 3/2021 | |
| CN | 112567677 A | | 3/2021 | |
| CN | 112805945 A | | 5/2021 | |
| CN | 114175552 A | * | 3/2022 | .......... H04L 1/0025 |
| CN | 115606232 A | * | 1/2023 | .......... H04B 7/0626 |
| EP | 3113404 B1 | | 4/2019 | |
| EP | 3780445 A1 | | 2/2021 | |
| EP | 3780448 A1 | | 2/2021 | |
| EP | 3780445 A4 | | 5/2021 | |
| EP | 3817259 A1 | | 5/2021 | |
| EP | 3817268 A1 | | 5/2021 | |
| EP | 3817490 A1 | | 5/2021 | |
| EP | 3832926 A1 | | 6/2021 | |
| EP | 3832929 A1 | | 6/2021 | |
| EP | 3968544 A1 | * | 3/2022 | .......... H04L 1/0072 |
| EP | 3666001 B1 | * | 10/2022 | .......... H04W 72/042 |
| JP | 2022549556 A | * | 11/2022 | ............... H04L 1/08 |
| KR | 20200135528 A | | 12/2020 | |
| KR | 20200135531 A | | 12/2020 | |
| WO | WO-2015072774 A1 | * | 5/2015 | .......... H04L 1/0072 |
| WO | WO-2016164028 A1 | * | 10/2016 | .......... H04B 1/7143 |
| WO | 2017078299 A1 | | 5/2017 | |
| WO | WO-2019032748 A1 | * | 2/2019 | .......... H04W 72/042 |
| WO | 2020026295 A1 | | 2/2020 | |
| WO | 2020032779 A1 | | 2/2020 | |
| WO | 2020033640 A1 | | 2/2020 | |
| WO | WO-2020150699 A1 | * | 7/2020 | ............... H04L 1/08 |

OTHER PUBLICATIONS

3GPP TS 38.213 v15.6.0 (Jun. 2019); Technical Specification; 3rd Generation Partnership Project; Technical Specification Group Radio Access Network; NR; Physical layer procedures for control (Release 15), 107 pages.

CATT: "Corrections on carrier aggregation and bandwidth part operation", R1-1808381, 3GPP TSG RAN WG1 Meeting #94, Gothenburg, Sweden, Aug. 20-24, 2018, 14 pages.

Zte, "Summary on Multiple TB scheduling enhancement for NB-IoT", 3GPP TSG-RAN WG1 Meeting #97, May 13-17, 2019, R1-1907567, 13 pages.

LG Electronics, "Discussion on multiple transport blocks scheduling in NB-IoT", 3GPP TSG RAN WG1 #97, Apr. 8-12, 2019, R1-1906692, 7 pages.

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.6.0 (Jun. 2019), 133 pages.

Sierra Wireless, "LTE-M Pre-configured UL Resources Design Considerations", 3GPP TSG RAN WG1 Meeting #96, Feb. 25-Mar. 3, 2019, R1-1901628, 14 pages.

International Search Report dated Nov. 20, 2020 in connection with International Patent Application No. PCT/KR2020/010899, 3 pages.

\* cited by examiner

FIG. 15A
Case 1 15-10
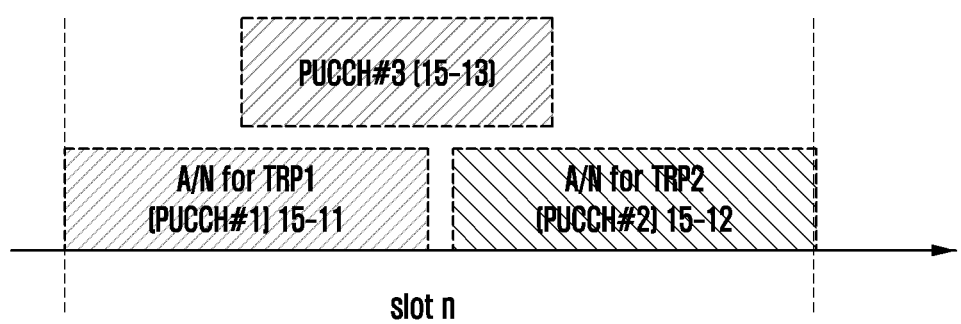
Case 2 15-20
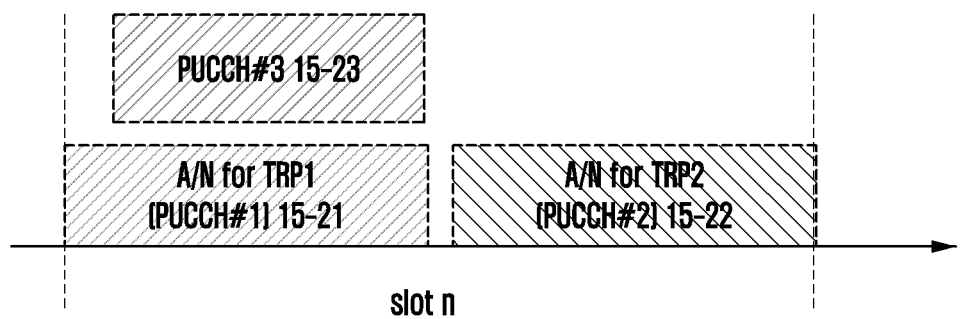

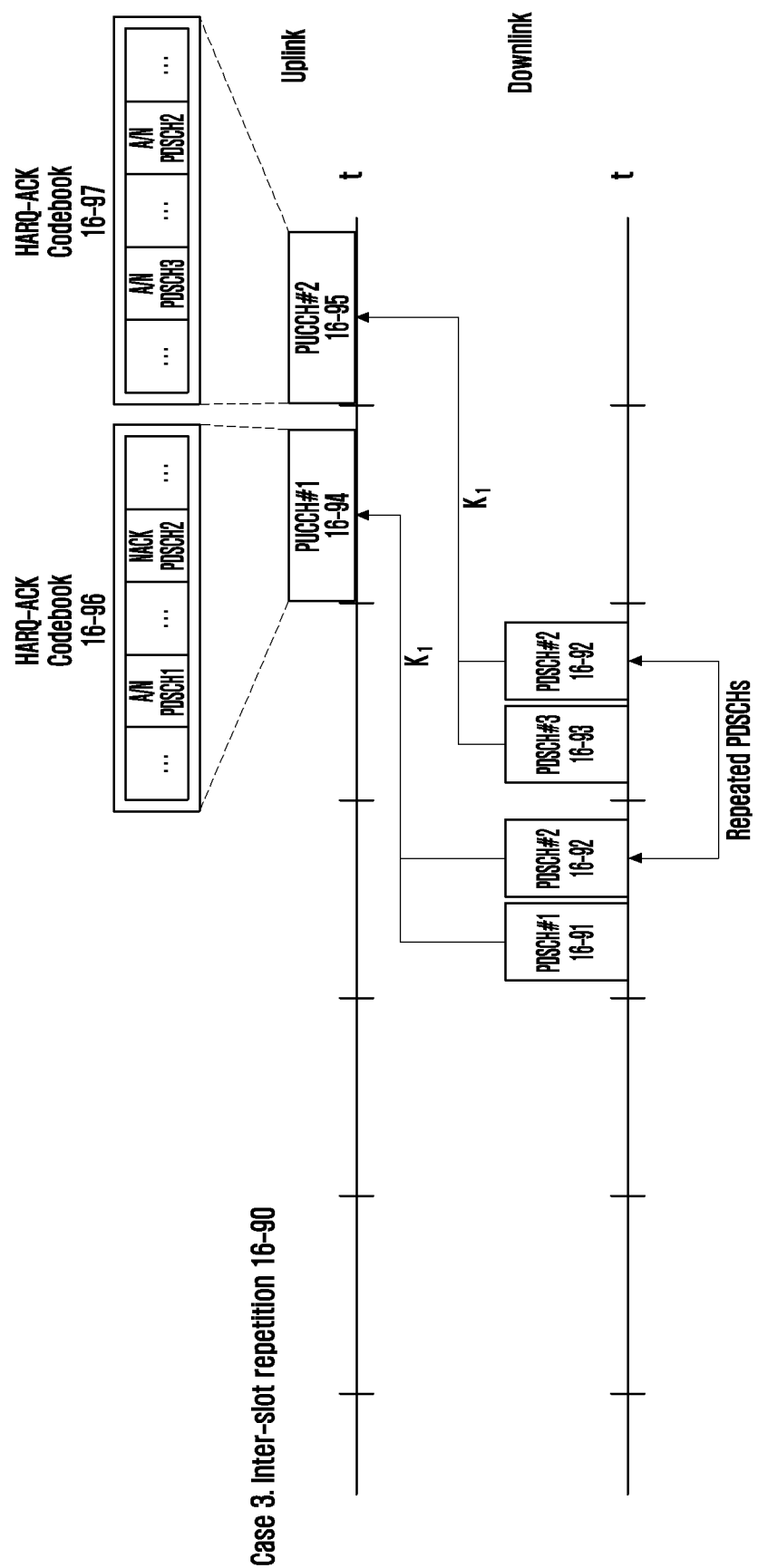

APPARATUS AND METHOD FOR TRANSMISSION OF UPLINK CONTROL INFORMATION IN NETWORK COOPERATIVE COMMUNICATION

CROSS-REFERENCE TO RELATED APPLICATIONS

This application is a continuation of application Ser. No. 16/994,473, now U.S. Pat. No. 11,483,099 issued Oct. 25, 2022, which is based on and claims priority under 35 U.S.C. 119 to Korean Patent Application No. 10-2019-0100462 filed on Aug. 16, 2019, Korean Patent Application No. 10-2019-0126491 filed on Oct. 11, 2019, Korean Patent Application No. 10-2019-0133304 filed on Oct. 24, 2019, and Korean Patent Application No. 10-2020-0018624 filed on Feb. 14, 2020 in the Korean Intellectual Property Office, the disclosures of which are herein incorporated by reference in their entirety.

BACKGROUND

1. Field

The disclosure relates to a wireless communication system and, more particularly, to a method and apparatus for transmitting uplink control information to a plurality of transmission points/panels/beams by a terminal for cooperative communication between multiple transmission points/panels/beams.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

The above information is presented as background information only to assist with an understanding of the disclosure. No determination has been made, and no assertion is made, as to whether any of the above might be applicable as prior art with regard to the disclosure.

SUMMARY

The disclosure provides a method for transmitting uplink control information to a plurality of transmission points/panels/beams by a terminal for network coordination in a wireless communication system.

In order to solve the above-described problem, an embodiments according to this disclosure comprise a method performed by a terminal in a wireless communication system, the method comprising: receiving, from a base station, configuration information including information on at least one repetition number and information on at least one transmission timing for hybrid automatic repeat request (HARQ) feedback transmission; receiving, from the base station, downlink control information (DCI) including information indicating one of the at least one transmission timing and information indicating one of the at least one repetition number; receiving, from the base station, data in a plurality of first slots based on a repetition number indicated by the DCI; and transmitting, to the base station, HARQ feedback in a plurality of second slots determined based on the plurality of first slots, wherein the HARQ feedback is set to a negatively acknowledgement (NACK) in a slot other than a slot determined based on a transmission timing indicated by the DCI among the plurality of second slots.

In order to solve the above-described problem, an embodiments according to this disclosure comprise a method performed by a base station in a wireless communication system, the method comprising: transmitting, to a terminal, configuration information including information on at least one repetition number and information on at least one transmission timing for hybrid automatic repeat request (HARQ) feedback transmission; transmitting, to the terminal, downlink control information (DCI) including information indicating one of the at least one transmission timing and information indicating one of the at least one repetition number; transmitting, to the terminal, data in a plurality of first slots based on a repetition number indicated by the DCI; and receiving, from the terminal, HARQ feedback in a plurality of second slots determined based on the plurality of first slots, wherein the HARQ feedback is set to a negatively acknowledgement (NACK) in a slot other than a slot determined based on a transmission timing indicated by the DCI among the plurality of second slots.

In order to solve the above-described problem, an embodiments according to this disclosure comprise a terminal in a wireless communication system, the terminal comprising: a transceiver; and a controller coupled with the transceiver and configured to: receive, from a base station, configuration information including information on at least one repetition number and information on at least one transmission timing for hybrid automatic repeat request (HARQ) feedback transmission, receive, from the base station, downlink control information (DCI) including information indicating one of the at least one transmission timing and information indicating one of the at least one repetition number, receive, from the base station, data in a plurality of first slots based on a repetition number indicated by the DCI, and transmit, to the base station, HARQ feedback in a plurality of second slots determined based on the plurality of first slots, wherein the HARQ feedback is set to a negatively acknowledgement (NACK) in a slot other than a slot determined based on a transmission timing indicated by the DCI among the plurality of second slots.

In order to solve the above-described problem, an embodiments according to this disclosure comprise a base station in a wireless communication system, the base station comprising: a transceiver; and a controller configured to: transmit, to a terminal, configuration information including information on at least one repetition number and information on at least one transmission timing for hybrid automatic repeat request (HARQ) feedback transmission, transmit, to the terminal, downlink control information (DCI) including information indicating one of the at least one transmission timing and information indicating one of the at least one repetition number, transmit, to the terminal, data in a plurality of first slots based on a repetition number indicated by the DCI, and receive, from the terminal, HARQ feedback in a plurality of second slots determined based on the plurality of first slots, wherein the HARQ feedback is set to a negatively acknowledgement (NACK) in a slot other than a slot determined based on a transmission timing indicated by the DCI among the plurality of second slots.

According to the disclosure, when network coordination is used in a wireless communication system, the time required for the terminal to transmit uplink control information to each transmission point/panel/beam can be shortened.

Before undertaking the DETAILED DESCRIPTION below, it may be advantageous to set forth definitions of certain words and phrases used throughout this patent document: the terms "include" and "comprise," as well as derivatives thereof, mean inclusion without limitation, the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 15A illustrates a view for a case where overlap occurs between PUCCH resources according to an embodiment;

FIG. 16C is a view illustrating type 1 HARQ-ACK codebook methods for each PDSCH repetitive transmission across multiple slots, a PDSCH repetitive transmission within a single slot, and no repetitive transmission according to an embodiment;

DETAILED DESCRIPTION

Figure 1:
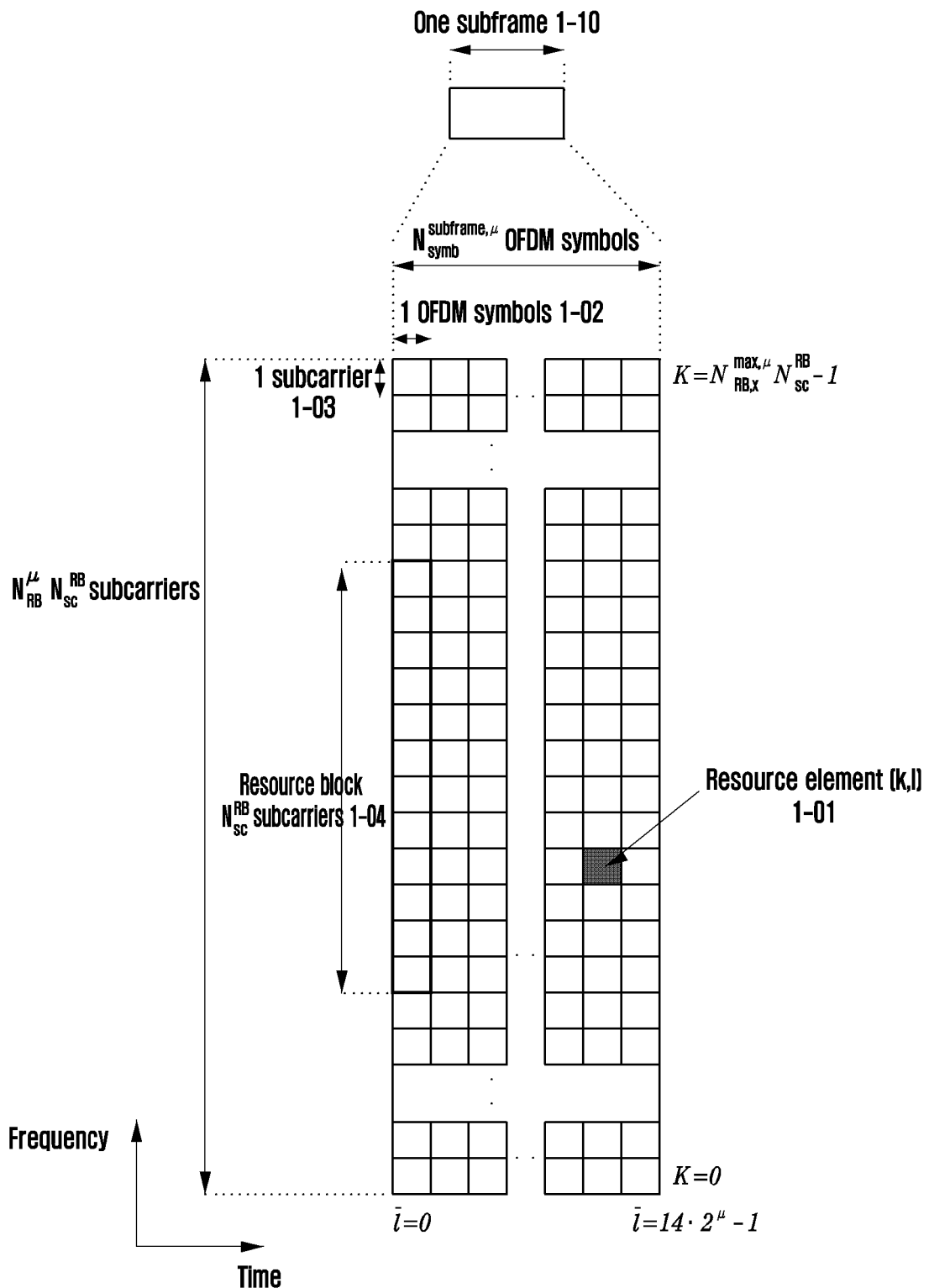
FIG. 1 illustrates a view for a basic structure of a time-frequency domain of a mobile communication system according to an embodiment.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification. Hereinafter, the base station is a subject that performs resource allocation of a terminal, and may be at least one of a gNode B (gNB), an eNode B (eNB), a Node B, a base station (BS), a radio access unit, a base station controller, or a node on a network. The terminal may include a user equipment (UE), a mobile station (MS), a cellular phone, a smart phone, a computer, or a multimedia system capable of performing communication functions. Of course, it is not limited to the above example. Hereinafter, the disclosure describes a technique for a terminal to receive broadcast information from a base station in a wireless communication system. The disclosure relates to a communication technique and a system for integrating a 5th generation (5G) communication system with an Internet of Things (IoT) technology to support a higher data transfer rate after a 4th generation (4G) system. The disclosure may be applied to intelligent services (e.g., smart home, smart building, smart city, smart car or connected car, health care, digital education, retail, security and safety related services, etc.), based on 5G communication technology and IoT-related technologies.

In the following description, terms referring to broadcast information, terms referring to control information, terms associated with communication coverage, terms referring to state changes (e.g., event), terms referring to network entities, terms referring to messages, terms referring to device elements, and the like are illustratively used for the sake of convenience. Therefore, the disclosure is not limited by the terms as used below, and other terms referring to subjects having equivalent technical meanings may be used.

In the following description, the disclosure uses terms and names defined in 3rd generation partnership project long term evolution (3GPP LTE) standards for the convenience of description. However, the disclosure is not limited by these terms and names, and may be applied in the same way to systems that conform other standards.

The wireless communication system has evolved into a broadband wireless communication system that provides high-speed and high-quality packet data services using communication standards, such as high-speed packet access (HSPA) of 3GPP, long-term evolution (LTE) or evolved universal terrestrial radio access (E-UTRA), LTE-advanced (LTE-A), LTE-Pro, high-rate packet data (HRPD) of 3GPP2, ultra-mobile broadband (UMB), and IEEE 802.16e, etc., rather than providing initial voice-based services.

As a representative example of a broadband wireless communication system, in an LTE system, an orthogonal frequency division multiplexing (OFDM) scheme is adopted in downlink (DL), and a single carrier frequency division multiple access (SC-OFDM) scheme is adopted in uplink (UL). The uplink refers to a radio link through which a terminal (user equipment (UE) or mobile station (MS)) transmits data or control signals to a base station (eNode B, or base station (BS)), and the downlink refers to a radio link through which a base station transmits data or control signals to a terminal. In such a multiple access method, data or control information of each user is usually divided by assigning and operating so that time-frequency resources to which data or control information to be carried for each user do not overlap, that is, orthogonality is established.

As a future communication system after LTE, that is, a 5G communication system should be able to freely reflect various requirements of users and service providers, so service satisfying various requirements should be supported. Services considered for 5G communication systems include enhanced mobile broadband (eMBB), massive machine type communication (mMTC), and ultra-reliability low latency communication (URLLC), and so on.

According to some embodiments, the eMBB aims to provide a more improved data transmission rate than the existing LTE, LTE-A or LTE-Pro. For example, in a 5G communication system, the eMBB should be able to provide a maximum data rate of 20 Gbps in the downlink and a maximum data rate of 10 Gbps in the uplink from the perspective of one base station. At the same time, the actual perceived data rate of the increased terminal should be provided. In order to satisfy this requirement, it is required to improve transmission/reception technology including a more advanced multi input multi output (MIMO) transmission technology. Also, it is possible to satisfy the data transmission speed required by the 5G communication system by using a wider bandwidth than 20 MHz in the 3-6 GHz or 6 GHz or higher frequency band, instead of the 2 GHz band used by the current LTE.

At the same time, mMTC is being considered to support application services such as the Internet of Things (IoT) in 5G communication systems. In order to efficiently provide the Internet of Things, mMTC may be required to support access to a large-scale terminal within a cell, improve the coverage of the terminal, improve battery time, and reduce the cost of the terminal. The Internet of Things should be able to support a large number of terminals (e.g., 1,000,000 terminals/km2) in a cell, as the cell is attached to various sensors and various devices to provide communication functions. In addition, because of the nature of the service, the terminal supporting mMTC is likely to be located in a shaded area that cannot be covered by a cell, such as the basement of a building, and thus may require wider coverage than other services provided by a 5G communication system. Since the terminal supporting mMTC should be configured with a low-cost terminal, and it is difficult to frequently replace the battery of the terminal, a very long battery lifetime may be required.

Finally, URLLC, which is a cellular-based wireless communication service used for a specific purpose (mission-critical), is a service that is used for remote control of robots or mechanical devices, industrial automation, unmanned aerial vehicles, remote health control, emergency notifications, etc., and should provide communication providing ultra-low latency and ultra-high reliability. For example, a service supporting URLLC should satisfy an air interface latency of less than 0.5 milliseconds and at the same time has a requirement of a packet error rate of 10-5 or less. Therefore, for a service supporting URLLC, a 5G system needs to provide a smaller transmit time interval (TTI) than other services, and at the same time, a design requirement is required to allocate a wide resource in a frequency band. However, the above-described mMTC, URLLC, and eMBB are only examples of different service types, and the service types to which the disclosure is applied are not limited to the above-described examples. The services considered in the above-mentioned 5G communication system should be provided by being fused with each other on the basis of one framework. That is, for efficient resource management and control, it is preferable that each service is integrated and controlled and transmitted as one system rather than being operated independently.

In addition, hereinafter, embodiments will be described as examples of an LTE, LTE-A, LTE Pro, or NR system, but the embodiments may be applied to other communication systems having similar technical backgrounds or channel types. In addition, the embodiments may be applied to other communication systems through some modifications within a range not significantly departing from the scope of the disclosure as judged by a person having skilled technical knowledge.

The disclosure relates to a method and an apparatus for reporting channel state information to increase power saving efficiency of a terminal in a wireless communication system.

According to the disclosure, when the terminal operates in the power saving mode in the wireless communication system, the power saving effect may be further improved by optimizing the channel state information reporting method accordingly.

Hereinafter, the frame structure of the 5G system will be described in more detail with reference to the drawings.

FIG. 1 illustrates a view for a basic structure of a time-frequency domain of a mobile communication system according to an embodiment.

Referring to FIG. 1, the horizontal axis represents a time domain, and the vertical axis represents a frequency domain. The basic unit in the time and frequency domains is a resource element (RE) 1-01 and may be defined as 1 orthogonal frequency division multiplexing (OFDM) symbol 1-02 in the time axis and 1 subcarrier 1-03 in the frequency axis. In the frequency domain, N_sc^RB (e.g., 12) consecutive REs may constitute one resource block (RB) 1-04. In an embodiment, a plurality of OFDM symbols may constitute one subframe 1-10.

Figure 2:
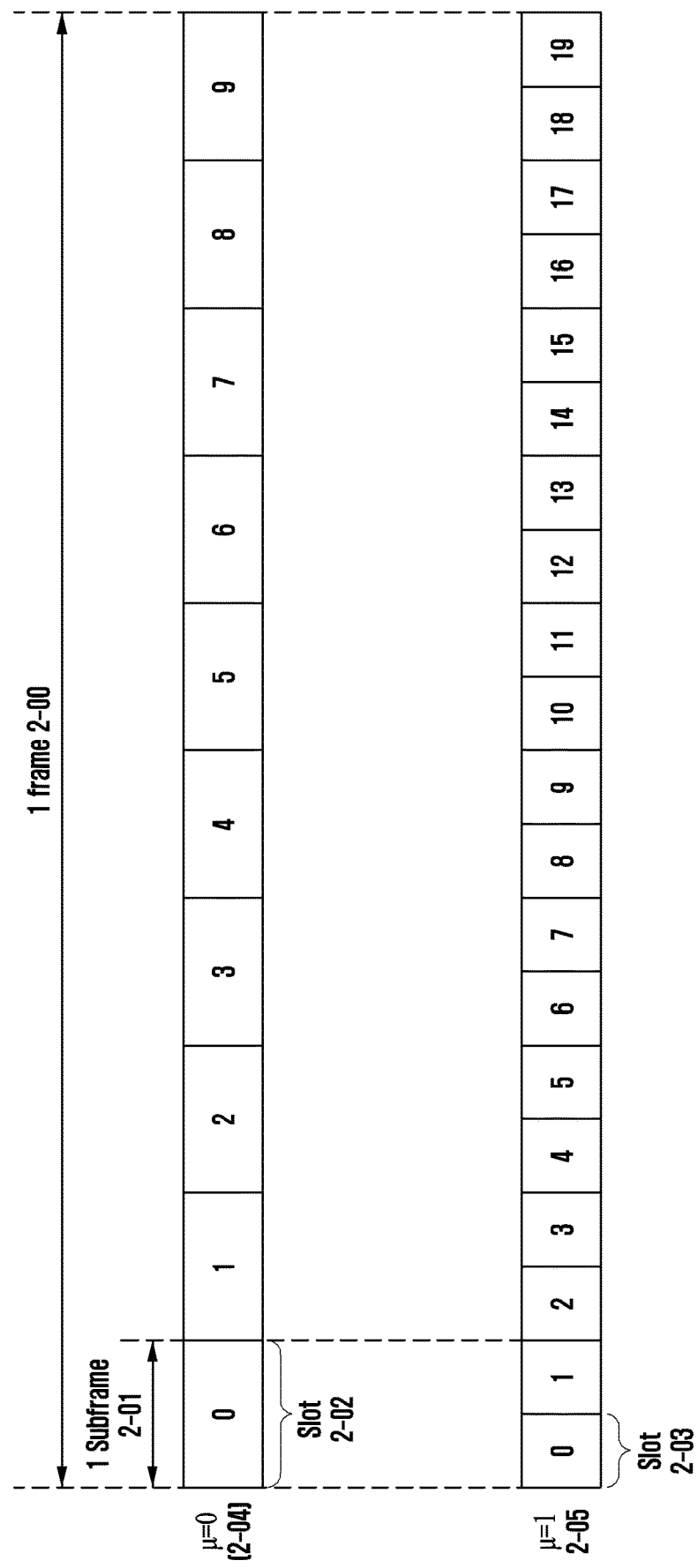
FIG. 2 illustrates a view for explaining a frame, subframe and slot structure of a mobile communication system according to an embodiment.

FIG. 2 illustrates a view for explaining a frame, subframe and slot structure of a next generation mobile communication system according to an embodiment.

Referring to FIG. 2, one frame 2-00 may be composed of one or more subframes 2-01, and one subframe may be composed of one or more slots 2-02. As an example, one frame 2-00 may be defined as 10 milli-seconds (ms). One subframe 2-01 may be defined as 1 ms, and in this case, one frame 2-00 may consist of a total of 10 subframes 2-01. One slot 2-02, 2-03 may be defined by 14 OFDM symbols (i.e., the number of symbols per slot ($N_{symb}^{slot}$)=14). One subframe 2-01 may be composed of one or a plurality of slots 2-02, 2-03, the number of slots 2-02, 2-03 per subframe 2-01 may be different depending on the configuration value p for the subcarrier spacing. In the example of FIG. 2, the case where the subcarrier spacing is configured is μ=0 (2-04) and μ=1 (2-05). When μ=0 (2-04), one subframe 2-01 may consist of one slot 2-02, and when μ=1 (2-05), one subframe 2-01 may be composed of two slots 2-03. That is, the number of slots per subframe ($N_{slot}^{subframe,\mu}$) may vary according to the configuration value p for the subcarrier spacing, and thus the number of slots ($N_{slot}^{frame,\mu}$) per frame may vary. The $N_{slot}^{subframe,\mu}$ and $N_{slot}^{frame,\mu}$ according to each subcarrier spacing configuration p may be defined as in [Table 1] below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 2 |
| 4 | 14 | 160 | 16 |
| 5 | 14 | 320 | 32 |

In NR, one component carrier (CC) or serving cell may be configured with up to 250 or more RBs. Therefore, when the terminal always receives the entire serving cell bandwidth (LTE), such as LTE, the power consumption of the terminal may be extreme, and in order to solve this, the base station may configure one or more bandwidth parts (BWP) for the terminal, in order to support the terminal to change the reception area in the cell. In the NR, the base station may configure the 'initial BWP', which is the bandwidth of CORESET #0 (or common search space, CSS) for the terminal through the master information block (MIB). Then, the base station may configure the initial BWP (first BWP) of the terminal through radio resource control (RRC) signaling, and may notify the terminal of at least a piece of BWP configuration information that may be indicated through downlink control information (DCI) in the future. Thereafter, the base station may indicate which band the terminal will use by notifying the BWP ID through DCI. If the terminal cannot receive DCI from the currently allocated BWP for a specific time or more, the terminal may return to 'default BWP' and try to receive DCI.

Figure 3:
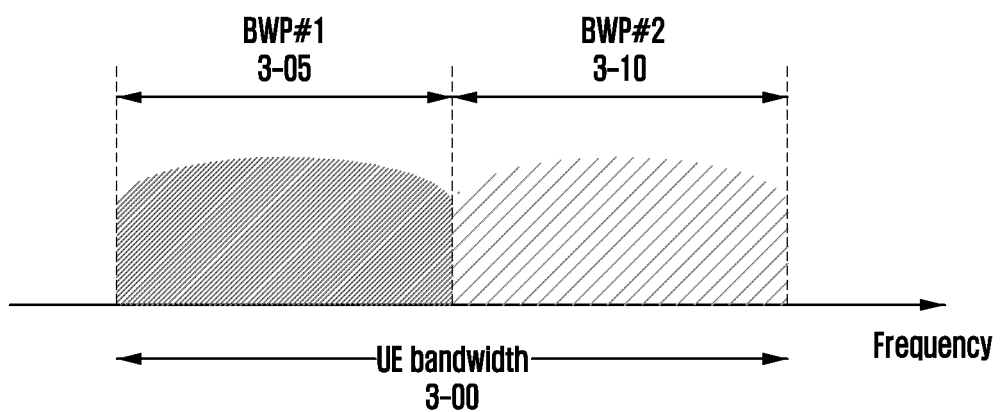
FIG. 3 illustrates an example of a configuration of a bandwidth part (BWP) in a wireless communication system according to an embodiment.

FIG. 3 illustrates a view for an example of a configuration of a bandwidth part (BWP) in a wireless communication system according to an embodiment.

Referring to FIG. 3, FIG. 3 illustrates an example in which the terminal bandwidth (3-00) is configured to have two bandwidth portions, namely, the bandwidth portion #1 (3-05) and the bandwidth portion #2 (3-10). The base station may configure one or a plurality of bandwidth portions for the terminal, and may configure information as shown in [Table 2] below for each bandwidth portion.

TABLE 2

| BWP ::= | SEQUENCE { |
|---|---|
| bwp-Id (Bandwidth part identifier) | BWP-Id, |
| locationAndBandwidth (Bandwidth part location) | INTEGER (1..65536), |
| subcarrierSpacing | ENUMERATED {n0, n1, n2, n3, n4, n5}, |
| cyclicPrefix | ENUMERATED { extended } |
| } | |

Of course, the disclosure is not limited to the above-described example, and various parameters related to the bandwidth part may be configured for the terminal in addition to the above-described configuration information. The above-described information may be transmitted to the terminal by the base station through higher layer signaling, for example, RRC signaling. At least one bandwidth portion among the configured one or multiple bandwidth portions may be activated. Whether to activate the configured bandwidth part may be transmitted semi-statically through RRC signaling from the base station to the terminal, or may be dynamically transmitted through a MAC control element (CE) or DCI.

According to an embodiment, a terminal before a radio resource control (RRC) connection may receive an initial bandwidth part (initial BWP) for initial access from a base station through a master information block (MIB). More specifically, in order to receive the system information (remaining system information; may correspond to RMSI or system information block (SIB) 1) required for initial access through the MIB in the initial access step, the terminal may receive configuration information for the control area (control resource set, CORSET) and the search space through which the PDCCH may be transmitted. The control area and the search space configured by the MIB may be regarded as identifier (ID) 0, respectively.

The base station may notify the terminal of configuration information such as frequency allocation information, time allocation information, and numerology for the control area #0 through the MIB. In addition, the base station may notify the terminal of the configuration information for the monitoring period and occasion for the control area #0 through the MIB, that is, the configuration information for the search space #0. The terminal may regard the frequency domain configured as the control area #0 obtained from the MIB as an initial bandwidth part for initial access. At this time, the identifier (ID) of the initial bandwidth part may be regarded as 0.

The bandwidth parts supported by the above-described next-generation mobile communication system (5G or NR system) may be used for various purposes.

For example, when the bandwidth supported by the terminal is smaller than the system bandwidth, the bandwidth supported by the terminal may be supported through configuring the bandwidth portion. For example, in Table 2, the frequency location (configuration information 2) of the bandwidth portion is configured for the terminal, so that the terminal may transmit and receive data at a specific frequency location within the system bandwidth.

As another example, for the purpose of supporting different numerology, the base station may configure a plurality of bandwidth portions for the terminal. For example, in order to support data transmission and reception using a subcarrier spacing of 15 kHz and a subcarrier spacing of 30 kHz to arbitrary terminals, two bandwidth portions may be configured to use subcarrier spacings of 15 kHz and 30 kHz, respectively. Different bandwidth parts may be frequency division multiplexing (FDM), and when data is to be transmitted/received at a specific subcarrier spacing, a bandwidth part configured at a corresponding subcarrier spacing may be activated.

As another example, for the purpose of reducing power consumption of the terminal, the base station may configure a bandwidth portion having different sizes of bandwidth for the terminal. For example, if the terminal supports a very large bandwidth, for example, a bandwidth of 100 MHz, and always transmits/receives data with the corresponding bandwidth, the large bandwidth may cause very large power consumption. In particular, it is very inefficient in terms of power consumption for the terminal to perform monitoring of an unnecessary downlink control channel for a large bandwidth of 100 MHz in a situation where there is no traffic. Therefore, for the purpose of reducing power consumption of the terminal, the base station may configure a bandwidth portion of a relatively small bandwidth for the terminal, for example, a bandwidth portion of 20 megaHertz (MHz). In a situation where there is no traffic, the terminal may perform a monitoring operation in the 20 MHz bandwidth portion, and when data occurs, may transmit/receive data using the 100 MHz bandwidth portion according to the instructions of the base station.

In the method of configuring the above-described bandwidth part, terminals before the RRC connection may receive the configuration information for the initial bandwidth part through the master information block (MIB) in the initial access step. More specifically, the terminal may receive, from the MIB of the physical broadcast channel (PBCH), a control area (control resource set (CORESET)) for a downlink control channel through which a downlink control information (DCI) scheduling a system information block (SIB) may be transmitted. The bandwidth of the control area configured as the MIB may be regarded as an initial bandwidth part, and the terminal may receive a PDSCH through which SIB is transmitted through the configured initial bandwidth part. The initial bandwidth part may be used for other system information (OSI), paging, and random access, in addition to the purpose of receiving the SIB. Hereinafter, a synchronization signal (SS)/PBCH block of a next generation mobile communication system (5G or NR system) will be described.

The SS/PBCH block may mean a physical layer channel block composed of a primary SS (PSS), a secondary SS (SSS), and a PBCH. More specifically, the SS/PBCH block may be defined as follows.

- PSS: A signal that is a reference for downlink time/frequency synchronization, and may provide some information of a cell ID.
- SSS: SSS is a reference for downlink time/frequency synchronization, and may provide remaining cell ID information not provided by the PSS. Additionally, the SSS may serve as a reference signal for demodulation of the PBCH.
- PBCH: PBCH makes it possible to provide essential system information necessary for transmitting/receiving data channels and control channels of the terminal. The essential system information may include search space related control information indicating radio resource mapping information of a control channel, scheduling control information for a separate data channel transmitting system information, and the like.
- SS/PBCH block: The SS/PBCH block may consist of a combination of PSS, SSS and PBCH. One or more SS/PBCH blocks may be transmitted within 5 ms, and each SS/PBCH block transmitted may be distinguished by an index.

The terminal may detect PSS and SSS in the initial access stage and decode PBCH. The terminal may acquire MIB from the PBCH, and may receive control area #0 through the MIB. The terminal may perform monitoring for the control area #0, assuming that the selected SS/PBCH block and the demodulation reference signal (DMRS) transmitted from the control area #0 are quasi co location (QCL). The terminal may receive system information as downlink control information transmitted from the control area #0. The terminal may obtain random access channel (RACH) related configuration information necessary for initial access from the received system information. The terminal may transmit a physical RACH (PRACH) to the base station in consideration of the selected SS/PBCH index, and the base station receiving the PRACH may acquire information on the SS/PBCH block index selected by the terminal. It may be seen that the base station selects a certain block from each SS/PBCH block, and monitors the control area #0 corresponding to (or associated with) the SS/PBCH block selected by the terminal.

Hereinafter, downlink control information (hereinafter referred to as DCI) in a next-generation mobile communication system (5G or NR system) will be described in detail. In a next-generation mobile communication system (5G or NR system), scheduling information for uplink data (or physical uplink shared channel (PUSCH)) or scheduling information for downlink data (or physical downlink shared channel (PDSCH)) may be transmitted from a base station to a terminal through DCI. The terminal may monitor the DCI format for fallback and the DCI format for non-fallback for PUSCH or PDSCH. The fallback DCI format may be composed of a predetermined fixed field between the base station and the terminal, and the DCI format for non-fallback may include a configurable field.

DCI may be transmitted through a physical downlink control channel (PDCCH) through a channel coding and modulation process. Cyclic redundancy check (CRC) may be attached to the DCI message payload, and the CRC may be scrambled with a radio network temporary identifier (RNTI) corresponding to the identity of the terminal. Different RNTIs may be used for scrambling the CRC attached to the payload of the DCI message, depending on the purpose of the DCI message, for example, terminal-specific (UE-specific) data transmission, power control command or random access response. That is, the RNTI is not explicitly transmitted, but may be included in the CRC calculation process and transmitted. When the DCI message transmitted on the PDCCH is received, the terminal may identify the CRC using the allocated RNTI. If the CRC identification result is correct, the terminal may know that the corresponding message has been transmitted to the terminal.

For example, DCI scheduling a PDSCH for system information (SI) may be scrambled with SI-RNTI. The DCI scheduling the PDSCH for the random access response (RAR) message may be scrambled with RA-RNTI. The DCI scheduling the PDSCH for the paging message may be scrambled with P-RNTI. DCI notifying of the slot format indicator (SFI) may be scrambled with SFI-RNTI. DCI notifying of transmit power control (TPC) may be scrambled with TPC-RNTI. The DCI for scheduling the terminal-specific PDSCH or PUSCH may be scrambled with cell RNTI (C-RNTI).

DCI format 0_0 may be used as a fallback DCI scheduling PUSCH, and at this time, CRC may be scrambled with C-RNTI. In one embodiment, DCI format 0_0 in which CRC is scrambled with C-RNTI may include information as shown in [Table 3] below.

TABLE 3

- Identifier for DCI formats - [1] bit
- Frequency domain resource assignment -$\lceil \log_2(N_{RB}^{UL, BWP}(N_{RB}^{UL, BWP} + 1)/2) \rceil$ bits
- Time domain resource assignment - X bits
- Frequency hopping flag - 1 bit
- Modulation and coding scheme - 5 bits
- New data indicator - 1 bit
- Redundancy version - 2 bits
- HARQ process number - 4 bits
- TPC command for scheduled PUSCH - [2] bits
- UL/SUL indicator - 0 or 1 bit DCI format 0_1 may be used as a non-fallback DCI scheduling PUSCH, and the CRC may be scrambled with C-RNTI. In an embodiment, DCI format 0_1 in which CRC is scrambled with C-RNTI may include information as shown in [Table 4] below.

TABLE 4

-Carrier indicator − 0 or 3 bits
-UL/SUL − 0 or 1 bit
-Identifier for DCI formats − [1] bits
-Bandwidth part indicator- 0, 1, or 2 bits
-Frequency domain resource assignment
   · For resource allocation type 0, $\lceil N_{RB}^{UL,BWP} / P \rceil$ bits
   · For resource allocation type 1, $\lceil \log_2(N_{RB}^{UL,BWP}(N_{RB}^{UL,BWP} +1)/2 \rceil$ bits
-Time domain resource assignment − 1, 2, 3, or 4 bits
-VRB-to-PRB mapping to physical resource block mapping− 0 or 1 bit, only for resource allocation type 1
   · 0 bits if only resource allocation type 0 is configured;
   · 1 bit otherwise
-Frequency hopping flag − 0 or 1 bit only for resource allocation type 1.
· 0 bits if only resource allocation type 0 is configured;
· 1 bit otherwise
-Modulation and coding scheme − 5 bits
-New data indicator − 1 bit
-Redundancy version − 2 bits
-HARQ process number − 4 bits
-$1^{st}$ downlink assignment index − 1 or 2 bits
· 0 bits for semi-static HARQ-ACK codebook;
· 2 bits for dynamic HARQ-ACK codebook with single HARQ-ACK codebook.
-$2^{nd}$ downlink assignment index − 0 or 2 bits
· 2 bits for dynamic HARQ-ACK codebook with two HARQ-ACK sub-codebooks;
· 0 bits otherwise
-TPC command for scheduled PUSCH − 2 bits -SRS resource indicator − $\left\lceil \log_2\left(\sum_{k=1}^{L_{max}} \binom{N_{SRS}}{k}\right)\right\rceil$ or $\lceil \log_2(N_{SRS}) \rceil$ bits · $\left\lceil \log_2\left(\sum_{k=1}^{L_{max}} \binom{N_{SRS}}{k}\right)\right\rceil$ bits for non-codebook based PUSCH transmission;

· $\lceil \log_2(N_{SRS}) \rceil$ bits for codebook based PUSCH transmission.
-Precoding information and number of layers − up to 6 bits
-Antenna ports − up to 5 bits
-SRS request − 2 bits
-CSI request − 0, 1, 2, 3, 4, 5, or 6 bits
-CBG transmission information − 0, 2, 4, 6, or 8 bits
-PTRS-DMRS association − 0 or 2 bits
-Beta offset indicator − 0 or 2 bits
-DMRS sequence initialization − 0 or 1 bit DCI format 1_0 may be used as a fallback DCI for scheduling the PDSCH, and the CRC may be scrambled with C-RNTI. In an embodiment, DCI format 1_0 in which the CRC is scrambled with C-RNTI may include information as shown in [Table 5] below.

TABLE 5

- Identifier for DCI formats - [1] bit
- Frequency domain resource assignment - $\lceil \log_2 (N_{RB}^{DL,BWP} (N_{RB}^{DL,BWP} + 1)/2) \rceil$ bits
- Time domain resource assignment - X bits
- VRB-to-PRB mapping - 1 bit
- Modulation and coding scheme - 5 bits
- New data indicator - 1 bit
- Redundancy version - 2 bits
- HARQ process number - 4 bits
- Downlink assignment index - 2 bits
- TPC command for scheduled PUSCH - [2] bits
- PUCCH resource indicator - 3 bits
- PDSCH-to-HARQ feedback timing indicator - [3] bits DCI format 1_1 may be used as a non-fallback DCI for scheduling a PDSCH, where CRC may be scrambled with C-RNTI. In an embodiment, DCI format 1_1 in which CRC is scrambled by C-RNTI may include information as shown in [Table 6] below.

TABLE 6

Figure 4:
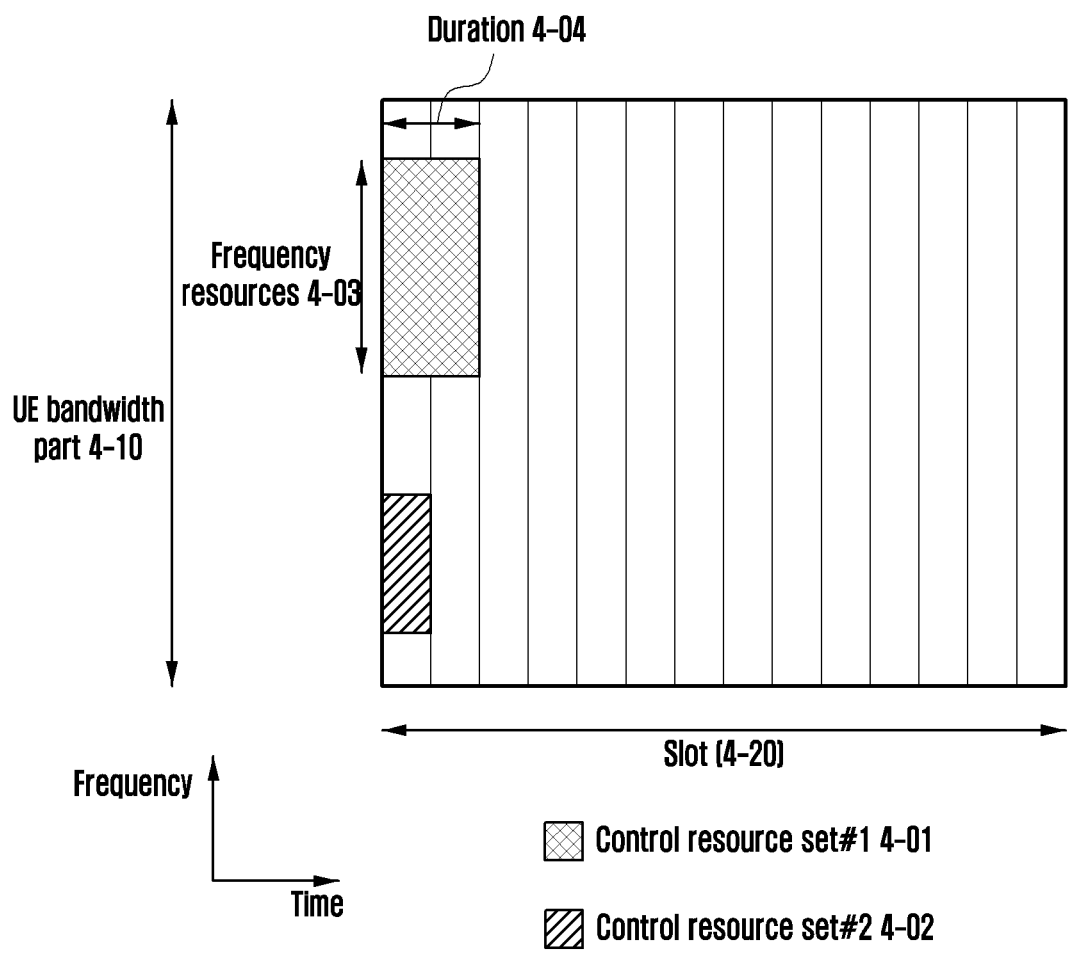
FIG. 4 illustrates a view for an example of configuring a control region of a downlink control channel in a wireless communication system according to an embodiment.

-Carrier indicator - 0 or 3 bits
-Identifier for DCI formats - [1] bits
-Bandwidth part indicator - 0, 1, or 2 bits
-Frequency domain resource assignment
 · For resource allocation type 0, $\lceil N_{RB}^{DL,BWP} / P \rceil$ bits
 · For resource allocation type 1, $\lceil \log_2(N_{RB}^{UL,BWP}(N_{RB}^{UL,BWP} + 1)/2 \rceil$ bits
-Time domain resource assignment - 1, 2, 3, or 4 bits
-VRB-to-PRB mapping - 0 or 1 bit, only resource allocation type 1
 · 0 bits if only resource allocation type 0 is configured;
 · 1 bit otherwise
-PRB bundling size indicator - 0 or 1 bit
-Rate matching indicator - 0, 1, or 2 bits
-ZP CSI-RS trigger - 0, 1, or 2 bits
For transport block 1:
 -Modulation and coding scheme - 5 bits
 -New data indicator - 1 bit
 -Redundancy version - 2 bits
For transport block 2:
 -Modulation and coding scheme - 5 bits
 -New data indicator - 1 bit
 -Redundancy version - 2 bits
 -HARQ process number - 4 bits
 -Downlink assignment index - 0 or 2 or 4 bits
 -TPC command for scheduled PUSCH - 2 bits
 -PUCCH resource indicator - 3 bits
 -PDSCH-to-HARQ feedback timing indicator - 3 bits
 -Antenna ports - 4, 5, or 6 bits
 -Transmission configuration indication - 0 or 3 bits
 -SRS request - 2 bits
 -CBG transmission information - 0, 2, 4, 6, or 8 bits
 -CGB flushing out information - 0 or 1 bit
 -DMRS sequence initialization - 0 or 1 bit FIG. 4 illustrates a view for an example of configuring a control area of a downlink control channel in a next generation mobile communication system according to an embodiment. That is, FIG. 4 is a view illustrating an embodiment of a control area (control resource set (CORE-SET)) in which a downlink control channel is transmitted in a 5G wireless communication system according to an embodiment.

Referring to FIG. 4, FIG. 4 illustrates an embodiment in which two control areas (control area #1 4-01 and control area #2 4-02) are configured in one slot 4-20 within the bandwidth part of the terminal (UE bandwidth part) 4-10 and on the frequency axis, within one slot 4-20 on the time axis. The control areas 4-01 and 4-02 may be configured as a specific frequency resource 4-03 within the entire terminal bandwidth part 4-10 on the frequency axis. The control areas 4-01 and 4-02 may be configured as one or a plurality of OFDM symbols on the time axis, which may be defined as a control resource set duration (4-04). Referring to FIG. 4, control area #1 (4-01) may be configured as a control resource set duration of 2 symbols, and control area #2 (4-02) may be configured as a control resource set duration of 1 symbol.

The control area in the above-described next-generation mobile communication system (5G or NR system) may be configured by the base station performing higher layer signaling (e.g., system information, master information block (MIB), radio resource control (RRC) signaling) to the terminal. Configuring a control area to a terminal means providing information such as a control area identifier, a frequency location of the control area, and a symbol length of the control area. For example, the configuration for the control area may include information as shown in [Table 7] below.

TABLE 7

```
ControlResourceSet ::=                         SEQUENCE {00Correspod to L1 parameter
'CORESET-ID'
    ControlResourceSetId                       ControlResourceSetId,
(Control area identity)
    frequencyDomainResources                   BIT STRING (SIZE (45)),
(frequency domain allocation information)
    Duration                                   INTEGER (1..maxCoReSetDuration),
(Time axis allocation information)
    Cce-REG-MappingType                        CHOICE {
(CCE-to-REG mapping scheme)
    Interleaved                                SEQUENCE {
       reg-BundleSize                             ENUMERATED {n2, n3, n6},
       precoderGranularity                        ENUMERATED {SameAsREG -
bundle, allCntiguousRBs},
       interleaverSize                            ENUMERATED {n2, n3, n6},
       shiftIndex
       INTEGER (0... maxNrofPhysicalResourceBlocks-1)
       (interleaver shift)
},
    nonInterleaved                             NULL
},
       tci-StatesPDCCH                         S             EQUENCE (SIZE
(1..maxNrofTCI-StatesPDCCH)) OF TCI-StateId     OPTIONAL,
(QCL configuration information)
       Tci-PresentInDCI                        ENUMERATED {enabled}
       }
```

In [Table 7], tci-StatesPDCCH (hereinafter referred to as "TCI state") configuration information may include information of one or more synchronization signal (SS)/physical broadcast channel (PBCH) index or channel state information reference signal (CSI-RS) index in a quasi co located (QCL) relationship with a demodulation reference signal (DMRS) transmitted in the corresponding control area. In addition, the tci-StatesPDCCH configuration information may include information on what the QCL relationship is. For example, the configuration of the TCI state may include information as shown in [Table 8] below.

TABLE 8

```
TCI-State ::=                    SEQUENCE {
    tci-StateId                  ,
    qci-Type1                        QCL-Info,
    qci-Type2                        QCL-Info       Optional
    ...
}
,
    QCL-Info ::=                 SEQUENCE {
        cell (cell index)            ServiceCellIndex   Optional
        bwp-Id (BWP index)           BWP-Id             Optional
        referenceSignal (reference RS index)  CHOICE {
            csi-rs                       NZP-CSI-RS-ResourceId,
            ssb                          SSB-Index,
        },
        qcl-Type                     ENUMERATED {typeA, typeB, typeC, typeD
        ...
}
```

Referring to the TCI state configuration, the cell index of the reference RS and/or the BWP index and the QCL type may be configured together with the index of the reference RS in the QCL relationship, that is, the SS/PBCH block index or the CSI-RS index. The QCL type indicates channel characteristics that are assumed to be shared between the reference RS and the control area DMRS, and the examples of possible QCL types are as follows.

QCL typeA: Doppler shift, Doppler spread, average delay, delay spread.
QCL typeB: Doppler shift, Doppler spread.
QCL typeC: Doppler shift, average delay.
QCL typeD: Spatial Rx parameter.

The TCI state may be similarly configured for the control area DMRS as well as other target RSs, such as PDSCH DMRS and CSI-RS, but a detailed description thereof will be omitted so as not to obscure the subject matter of the description.

Figure 5:
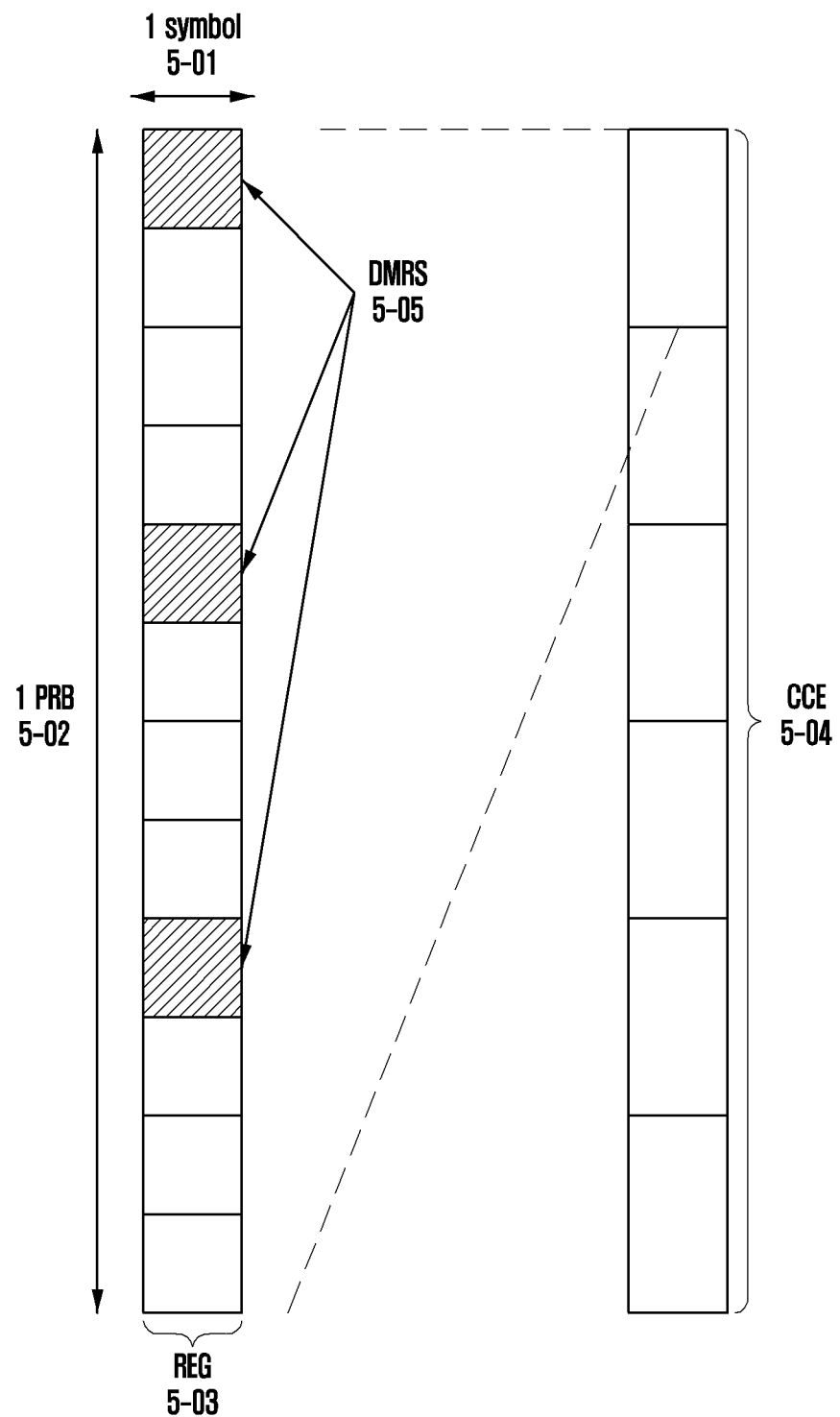
FIG. 5 illustrates a view for explaining the structure of a downlink control channel of a mobile communication system according to an embodiment.

FIG. 5 illustrates a view for explaining the structure of a downlink control channel of a next generation mobile communication system according to an embodiment. That is, FIG. 5 is a view illustrating an example of a basic unit of time and frequency resources configuring a downlink control channel that may be used in 5G according to an embodiment.

Referring to FIG. 5, a basic unit of time and frequency resources constituting a control channel may be defined as a resource element group (REG) 5-03. REG 5-03 may be defined as 1 OFDM symbol 5-01 on the time axis, 1 physical resource block (PRB) 5-02 on the frequency axis, that is, 12 subcarriers. The base station may configure a downlink control channel allocation unit by connecting REGs 5-03.

As illustrated in FIG. 5, when a basic unit to which a downlink control channel is allocated in 5G is called a control channel element (CCE) 5-04, 1 CCE 5-04 may consist of a plurality of REGs 5-03. For example, the REG 5-03 shown in FIG. 5 may be composed of 12 REs, and if 1 CCE 5-04 is composed of 6 REGs 5-03, 1 CCE 5-04 may consist of 72 REs.

When a downlink control area is configured, the corresponding area may be composed of a plurality of CCEs 5-04, and a specific downlink control channel may be transmitted by being mapped to one or a plurality of CCEs 5-04 according to the aggregation level (AL) in the control area. The CCEs 5-04 in the control area are divided into numbers, and the numbers of the CCEs 5-04 may be assigned according to a logical mapping method.

The basic unit of the downlink control channel shown in FIG. 5, that is, REG 5-03, may include both DCI mapped REs to which DCI is mapped and an area to which the reference signal DMRS 5-05, which is a reference signal for decoding, is mapped. As shown in FIG. 5, three DMRSs 5-05 may be transmitted in 1 REG 5-03. The number of CCEs required to transmit the PDCCH may be 1, 2, 4, 8, or 16 depending on the aggregation level (AL), and the number of different CCEs may be used to implement link adaptation of a downlink control channel. For example, when AL=L, one downlink control channel may be transmitted through L CCEs.

The terminal should detect a signal without knowing the information on the downlink control channel, and a search space indicating a set of CCEs for blind decoding may be defined. The search space is a set of downlink control channel candidates composed of CCEs that the terminal should attempt decoding on a given aggregation level. Since there are various aggregation levels that make a bundle of 1, 2, 4, 8, and 16 CCEs, the terminal may have a plurality of search spaces. The search space set may be defined as a set of search spaces at all configured aggregation levels.

The search space may be classified into a common search space and a terminal-specific search space. According to an embodiment, a certain group of terminals or all terminals may examine a common search space of the PDCCH in order to receive control information common to cells such as dynamic scheduling or paging messages for system information.

For example, the terminal may receive PDSCH scheduling allocation information for transmission of the SIB including the operator information of the cell by examining the common search space of the PDCCH. In the case of the common search space, since a certain group of terminals or all terminals should receive the PDCCH, the common search space may be defined as a set of predetermined CCEs. Meanwhile, the terminal may receive scheduling allocation information for the terminal-specific PDSCH or PUSCH by examining the terminal-specific search space of the PDCCH. The terminal-specific search space may be terminal-specifically defined as a function of the identity of the terminal and various system parameters.

In 5G, parameters for the search space for the PDCCH may be configured from the base station to the terminal by higher layer signaling (e.g., SIB, MIB, RRC signaling). For example, the base station may configure the number of PDCCH candidate groups at each aggregation level L, the monitoring period for the search space, the monitoring occasion in symbol units in the slot for the search space, the search space type (common search space or terminal-specific search space), the combination of the DCI format and RNTI to be monitored in the search space, a control area index to monitor the search space, etc., for the terminal. For example, the above-described configuration may include information such as [Table 9] below.

According to the configuration information, one or a plurality of sets of search spaces may exist in a common search space or a terminal-specific search space. For example, search space set #1 and search space set #2 may be configured as a common search space, and search space set #3 and search space set #4 may be configured as a terminal-specific search space.

In the common search space, the combination of the following DCI format and RNTI may be monitored. Of course, it is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI

TABLE 9

```
SearchSpace:: =                         SEQUENCE {
    -- Identity of the search space.           SearchSpaceId = 0 identifies the
      SearchSpace configured via PBCH (MIB) or ServingCellConfigCommon.
    searchSpaceId                       SearchSpaceId,
    (search space indentifier)
    controlResourceSetId                ,
    (control area identifier)
    monitoringSlotPeriodicityAndOffset          CHOICE {
    (monitoring slot level period)
       sl1                              NULL,
       sl2                              INTEGER (0...1),
       sl4                              INTEGER (0...3),
       sl5                          INTEGER (0...4),
       sl8                              INTEGER (0...7),
       sl10                             INTEGER (0...9),
       sl16                             INTEGER (0...15),
       sl20                             INTEGER (0...19)
    }
    duration (monitoring duration)      INTEGER (2...2559)
    monitoringSymbolsWithinSlot              BIT STRING (SIZE (14))
    (monitoring symbol within slot)
    nrofCandidates                      SEQUENCE {
    (number of PDCCH candidates by aggregation level)
    aggregationLevel1                   ENUMERATED {n0, n1, n2, n3, n4,
n5, n6, n8},
    aggregationLevel2                   ENUMERATED {n0, n1, n2, n3, n4,
n5, n6, n8},
    aggregationLevel4                   ENUMERATED {n0, n1, n2, n3, n4,
n5, n6, n8},
    aggregationLevel8                   ENUMERATED {n0, n1, n2, n3, n4,
n5, n6, n8},
    aggregationLevel16                  ENUMERATED {n0, n1, n2, n3, n4,
n5, n6, n8},
    },
    searchSpaceType                     CHOICE {
    (search space type)
    -- Configures this search space as common search space (CSS) and DCI formats to
monitor.
       common                           SEQUENCE {
       (common search space)
       }
       Ue-Specific                      SEQUENCE {
       (terminal-specific search space)
           -- Indicates whether the UE monitors in this USS for DCI formats 0-0 and 1-0 or
for 0-1 and 1-1.
           Formats                      ENUMERATED {formats 0-0-
And-1-0, formats0-1-And-1-1},
           ...
    }
```

Based on the configuration information, the base station may configure one or a plurality of search space sets for the terminal. According to one embodiment, the base station may configure the search space set 1 and the search space set 2, configure the terminal to monitor the DCI format A scrambled with X-RNTI in the search space set 1 in the common search space, and configure the terminal to monitor the DCI format B scrambled with Y-RNTI in the search space set 2 in the terminal-specific search space.

DCI format 2_0 with CRC scrambled by SFI-RNTI
DCI format 2_1 with CRC scrambled by INT-RNTI
DCI format 2_2 with CRC scrambled by TPC-PUSCH-RNTI, TPC-PUCCH-RNTI
DCI format 2_3 with CRC scrambled by TPC-SRS-RNTI In the terminal-specific search space, the combination of the following DCI format and RNTI may be monitored. Of course, it is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may follow the definitions and uses below.

C-RNTI (Cell RNTI): Terminal-specific PDSCH scheduling purpose.

TC-RNTI (Temporary Cell RNTI): Terminal-specific PDSCH scheduling purpose.

CS-RNTI (Configured Scheduling RNTI): Semi-statically configured terminal-specific PDSCH scheduling purpose.

RA-RNTI (Random Access RNTI): PDSCH scheduling in random access stage.

P-RNTI (Paging RNTI): PDSCH scheduling for paging transmission.

SI-RNTI (System Information RNTI): For PDSCH scheduling where system information is transmitted.

INT-RNTI (Interruption RNTI): Used to inform whether or not the PDSCH is puncturing.

TPC-PUSCH-RNTI (Transmit Power Control for PUSCH RNTI): Purpose of indicating power control command for PUSCH.

TPC-PUCCH-RNTI (Transmit Power Control for PUCCH RNTI): Purpose of indicating power control command for PUCCH.

TPC-SRS-RNTI (Transmit Power Control for SRS RNTI): Purpose of indicating power control command for SRS.

In an embodiment, the DCI formats described above may be defined as in [Table 10] below.

TABLE 10

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format Notifying a group of UEs of the PRB(s) and OFDM symbol(s) there UE may assume no transmission is intended for the UE |
| 2_2 | Transmission of TPC commands for PUCCH and PUSCH |
| 2_3 | Transmission of a group of TPC commands for SRS transmissions by one or more UEs |

According to an embodiment, in 5G, a plurality of search space sets may be configured with different parameters (e.g., parameters in [Table 8]). Therefore, the set of search space sets monitored by the terminal at each point in time may be different. For example, if the search space set #1 is configured for the X-slot period, the search space set #2 is configured for the Y-slot period, and X and Y are different, the terminal may monitor both the search space set #1 and the search space set #2 in a specific slot, and monitor one of the search space set #1 and the search space set #2 in a specific slot.

When a plurality of search space sets are configured for the terminal, the following conditions may be considered in order to determine the set of search spaces that the terminal should monitor.

[Condition 1: Limit the Maximum Number of PDCCH Candidates]

The number of PDCCH candidates that may be monitored per slot may not exceed $M^\mu$. $M^\mu$ may be defined as the maximum number of PDCCH candidate groups per slot in a cell configured to a subcarrier spacing of $15 \cdot 2^\mu$ kHz, and may be defined as shown in [Table 11] below.

TABLE 11

| $\mu$ | Maximum number of PDCCH candidates per slot and per serving cell ($M^\mu$) |
| --- | --- |
| 0 | 44 |
| 1 | 36 |
| 2 | 22 |
| 3 | 20 |

[Condition 2: Limit the Maximum Number of CCEs]

The number of CCEs constituting the entire search space per slot (here, the entire search space may mean the entire set of CCEs corresponding to a union area of a plurality of search space sets) may not exceed $C^\mu$. $C^\mu$ may be defined as the maximum number of CCEs per slot in a cell configured to a subcarrier spacing of $15 \cdot 2^\mu$ kHz, and may be defined as shown in [Table 12] below.

TABLE 12

| $\mu$ | Maximum numbar of CCEs per slot and per serving cell ($C^\mu$) |
| --- | --- |
| 0 | 56 |
| 1 | 56 |
| 2 | 48 |
| 3 | 32 |

For the convenience of description, a situation that satisfies both of the conditions 1 and 2 at a specific point in time may be exemplarily defined as "condition A". Therefore, not satisfying the condition A may mean not satisfying at least one of the conditions 1 and 2 described above.

Depending on the configurations of the search space sets of the base station, a condition A may not be satisfied at a specific time. If the condition A is not satisfied at a specific time, the terminal may select and monitor only a subset of the set of search spaces configured to satisfy the condition A at the time, and the base station may transmit the PDCCH to the selected search space set.

According to an embodiment, the following method may be followed as a method of selecting some search spaces from a set of all set search spaces.

[Method 1]

If the condition A for the PDCCH is not satisfied at a specific time (slot), the terminal (or the base station) may preferentially select a set of search spaces in which the search space type is configured as a common search space from among the set of search spaces existing at a corresponding time point over the set of search spaces configured as a terminal-specific search space.

When all of the set of search spaces configured as a common search space are selected (i.e., when the condition A is satisfied even after selecting all search spaces set as a common search space), the terminal (or the base station) may select a set of search spaces configured as a terminal-specific search space. At this time, when there are a plurality of search space sets configured as terminal-specific search spaces, a search space set having a low search space set index may have a higher priority. In consideration of a priority, the terminal or the base station may select the terminal-specific search space sets within a range in which condition A is satisfied.

In the following, time and frequency resource allocation methods for data transmission in NR are described.

Figure 6:
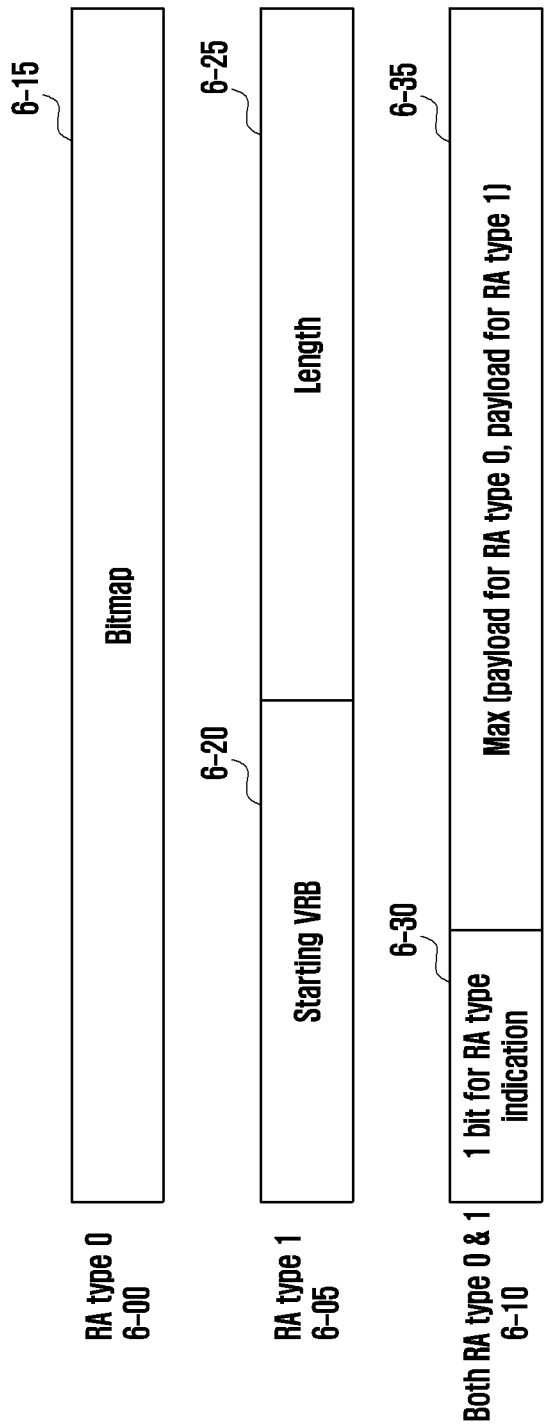
FIG. 6 illustrates a view for a frequency axis resource allocation example of a physical downlink shared channel (PDSCH) in a wireless communication system according to an embodiment.

In NR, the following detailed frequency domain resource allocation (FD-RA) may be provided in addition to frequency axis resource candidate allocation through BWP indication. FIG. 6 illustrates a view for an example of PDSCH frequency axis resource allocation in a wireless communication system according to an embodiment.

Specifically, FIG. 6 illustrates three types of frequency axis resource allocation methods of type 0 (6-00), type 1 (6-05), and dynamic switch (6-10) configurable through an upper layer in NR.

Referring to FIG. 6, if the terminal is configured to use only resource type 0 through upper layer signaling (6-00), some downlink control information (DCI) for allocating PDSCH to the corresponding terminal has a bitmap composed of NRBG bits. The conditions for this will be explained again later. At this time, NRBG refers to the number of resource block groups (RBG) determined as shown in [Table 13] according to the BWP size allocated by the BWP indicator and the upper layer parameter RBG-Size. Data is transmitted to the RBG indicated by 1.

TABLE 13

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

If the terminal is configured to use only resource type 1 through upper layer signaling 6-05, some DCIs allocating PDSCH to the corresponding terminal have frequency axis resource allocation information composed of $\lfloor \log_2(N_{RB}^{DL,BWP}(N_{RB}^{DL,BWP}+1)/2) \rfloor$ bits. The conditions for this will be explained again later. Through this, the base station may configure a starting VRB 6-20 and a length 6-25 of frequency axis resources that are continuously allocated therefrom.

If the terminal is configured to use both resource type 0 and resource type 1 through upper layer signaling (6-10), some DCIs allocating PDSCH to the corresponding terminal have frequency axis resource allocation information composed of bits of a larger value 6-35 among payload 6-15 for configuring resource type 0 and payload 6-20, 6-25 for configuring resource type 1. The conditions for this will be explained again later. At this time, one bit may be added to the first part (MSB) of the frequency axis resource allocation information in DCI, and when the corresponding bit is 0, the one bit may indicate that resource type 0 is used, and when the corresponding bit is 1, the one bit may indicate that resource type 1 is used.

In the following, a time domain resource allocation method for a data channel in a next generation mobile communication system (5G or NR system) is described.

The base station may configure a table of time domain resource allocation information for a downlink data channel (physical downlink shared channel (PDSCH)) and an uplink data channel (physical uplink shared channel PUSCH)) to the terminal as higher layer signaling (e.g., RRC signaling). A table consisting of a maximum of maxNrofDL-Allocations=16 entries may be configured for PDSCH, and a table consisting of a maximum of maxNrofUL-Allocations=16 entries may be configured for PUSCH. In an embodiment, in the time domain resource allocation information, PDCCH-to-PDSCH slot timing (corresponding to a time spacing in slot units between the time when the PDCCH is received and the time when the PDSCH scheduled by the received PDCCH is transmitted, denoted by K0), PDCCH-to-PUSCH slot timing (corresponding to the time interval in slot units between the time when the PDCCH is received and the time when the received PDCCH schedules the PUSCH is transmitted, denoted by K2), information about the location and length of a start symbol for which PDSCH or PUSCH is scheduled in the slot, a mapping type of PDSCH or PUSCH, and the like may be included. For example, information such as [Table 14] or [Table 15] below may be notified of from the base station to the terminal.

TABLE 14

| PDSCH-TimeDomainResourceAllocationList information element |
|---|
| PDSCH-TimeDomainResourceAllocationList ::= SEQUENCE (SIZE (1..maxNrofDL-Allocations))<br>PDSCH-TimeDomainResourceAllocation<br>PDSCH-TimeDomainResourceAllocation ::= SEQUENCE {<br>    k0                                    INTEGER (0.. OPTIONAL,<br>-- Need S<br>        (PDCCH-to-PDSCH timing, slot unit)<br>    mappingType                  ENUMERATED {typeA, typeB},<br>    (PDSCH mapping type)<br>    startSymbolAndLength         INTEGER (0 .. 127)<br>    (start symbol and length of PDSCH) |

TABLE 15

| PUSCH-TimeDomainResourceAllocationList information element |
|---|
| PUSCH-TimeDomainResourceAllocationList ::= SEQUENCE (SIZE(1..maxNrofUL-Allocations)) OF<br>PUSCH-TimeDomainResourceAllocation<br>PUSCH-TimeDomainResourceAllocation ::= SEQUENCE {<br>    K2                                   INTEGER (0..32) OPTIONAL,  -- Need S<br>        (PDCCH-to-PUSCH timing, slot unit)<br>    mappingType                  ENUMERATED {typeA, typeB},<br>    (PUSCH mapping type)<br>    startSymbolAndLength         INTEGER (0 .. 127)<br>    (start symbol and length of PUSCH) |

The base station may notify the terminal of one of the entries in the table for the time domain resource allocation information described above through L1 signaling (e.g., DCI) (e.g., indicated by the 'time domain resource allocation' field in DCI). The terminal may acquire time domain resource allocation information for PDSCH or PUSCH based on the DCI received from the base station.

Figure 7:
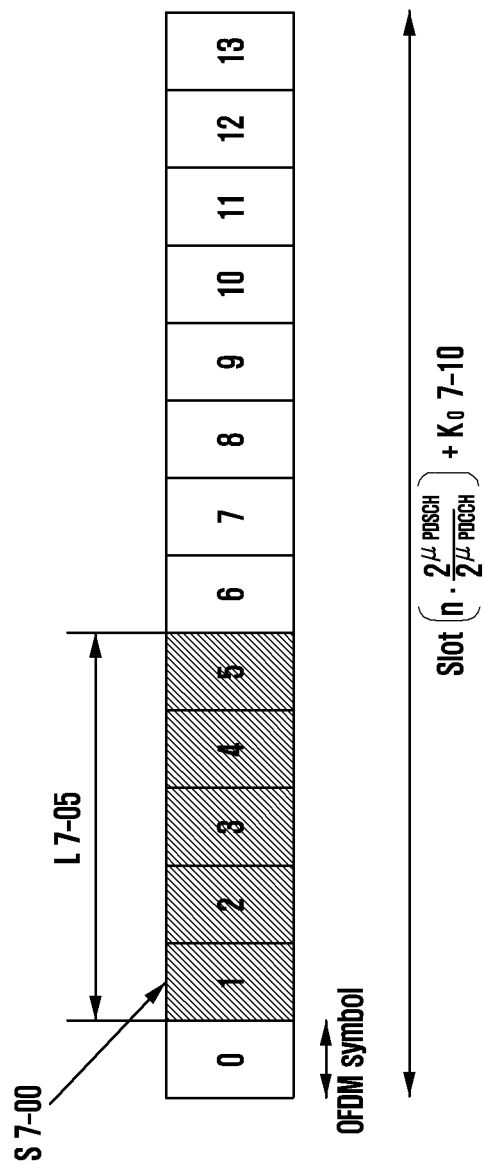
FIG. 7 illustrates a view for an example of time axis resource allocation of a PDSCH in a wireless communication system according to an embodiment.

FIG. 7 illustrates a view for an example of time-axis resource allocation of PDSCH in a wireless communication system according to an embodiment.

Referring to FIG. 7, a base station may indicate subcarrier spacings (SCS) ($\mu_{PDSCH}$, $\mu_{PDCCH}$) of a data channel and a control channel configured using an upper layer, scheduling offset (K0) value, and the time axis position of the PDSCH resource according to the OFDM symbol start position (7-00) and length (7-05) in one slot dynamically indicated through DCL.

Figure 8:
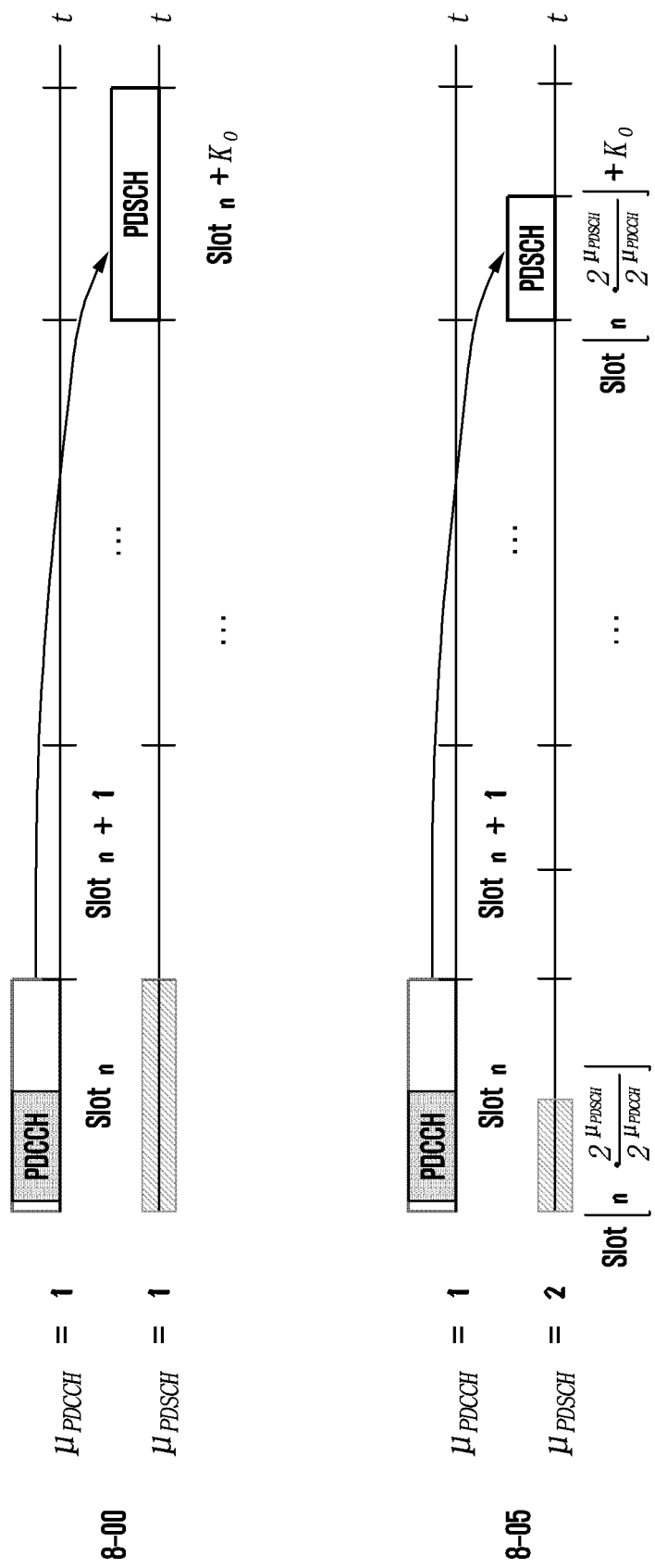
FIG. 8 illustrates a view for an example of time axis resource allocation according to a subcarrier interval of a data channel and a control channel in a wireless communication system according to an embodiment.

FIG. 8 illustrates a view for an example of time axis resource allocation according to subcarrier spacings of a data channel and a control channel in a wireless communication system according to an embodiment.

Referring to FIG. 8, it may be seen that when the subcarrier spacings of the data channel and the control channel are the same (8-00, $\mu_{PDSCH}=\mu_{PDCCH}$), the slot number for data and control is the same, so that a scheduling offset occurs for the base station and the terminal according to a predetermined slot offset K0 in the base station and terminal. On the other hand, it may be seen that when the subcarrier spacings of the data channel and the control channel are different (8-05, $\mu_{PDSCH}\neq\mu_{PDCCH}$), the slot numbers for data and control are different, so that a scheduling offset occurs for the base station and the terminal, based on the subcarrier spacing of the PDCCH, according to a predetermined slot offset $K_0$ in the base station and terminal.

In LTE and NR, the terminal has a procedure of reporting the capability supported by the terminal to the corresponding base station while connected to the serving base station. In the following description, this is referred to as terminal (UE) capability (reporting).

The base station may transfer a terminal capability enquiry message requesting capability reporting to a terminal in a connected state. In the message, the base station may include a request for terminal capability for each RAT type. The request for each RAT type may include requested frequency band information. In addition, the terminal capability enquiry message may request a plurality of RAT types from one RRC message container, or a terminal capability enquiry message including a request for each RAT type may be transferred to the terminal multiple times. That is, the terminal capability enquiry may be repeated multiple times, and the terminal may report the number of times by configuring the corresponding terminal capability information message. In the next-generation mobile communication system, the terminal capability requests for MR-DC including NR, LTE, and E-UTRA New radio dual connectivity (EN-DC) may be made. In addition, the terminal capability enquiry message is generally transmitted initially after the terminal is connected to the base station, but may be requested under any conditions when the base station needs.

In the step, the terminal receiving the terminal capability report request from the base station may configure the terminal capability according to the RAT type and band information requested from the base station. A Method of configuring terminal capability by the terminal in the NR system is as follows.

1. If the terminal is provided with a list of LTE and/or NR bands at the terminal capability request from the base station, the terminal may configure a band combination (BC) for EN-DC and NR stand-alone (SA). That is, a candidate list of BC for EN-DC and NR SA may be configured based on bands requested by the FreqBandList to the base station. Also, the priority of the bands has priority in the order described in FreqBandList.

2. If the base station requests the terminal capability report by configuring the "eutra-nr-only" flag or the "eutra" flag, the terminal may completely remove the NR SA BCs from the configured BC candidate list. This operation may be performed only when the LTE base station (eNB) requests "eutra" capability.

3. Thereafter, the terminal may remove fallback BCs from the candidate list of BCs configured in the above step. Here, fallback BC corresponds to a case in which a band corresponding to at least one SCell is removed from a super set BC, and may be omitted because the super set BC may already cover the fallback BC. This step is also applied to Multi-RAT Dual Connectivity (MR-DC), that is, LTE bands may also be applied. The remaining BC after this stage is the final "candidate BC list".

4. The terminal may select BCs to report by selecting BCs corresponding to the requested RAT type in the final "candidate BC list". In this step, the terminal may configure the supportedBandCombinationList in a predetermined order. That is, the terminal may configure BC and terminal capabilities to report in a predetermined order of rat-Type. (nr→eutra-nr→eutra). In addition, the featureSetCombination for the configured supportedBandCombinationList may be configured, and the list of "candidate feature set combinations" may be constructed from the candidate BC list where the list for fallback BC (which includes the same or lower level capability) is removed. The "candidate feature set combination" includes both feature set combinations for NR and EUTRA-NR BC, and may be obtained from feature set combinations of UE-NR-Capabilities and UE-MRDC-Capabilities containers.

5. Further, if the requested rat type is eutra-nr, featureSetCombinations may be included in both containers, UE-MRDC-Capabilities and UE-NR-Capabilities. However, the feature set of New Radio (NR) may include only UE-NR-Capabilities.

After the terminal capability is configured, the terminal may transmit a terminal capability information message including terminal capability to the base station. The base station may then perform appropriate scheduling and transmission/reception management for the corresponding terminal, based on the terminal capability received from the terminal.

In the NR, the terminal may transmit uplink control information (UCI) to the base station through a physical uplink control channel (PUCCH). The control information may include at least one of a HARQ-ACK indicating whether demodulation/decryption is successful for a transport block (TB) received by the terminal through the PDSCH, a scheduling request (SR) for requesting resource allocation to a PUSCH base station for uplink data transmission by the terminal, and channel state information (CSI), which is information for reporting the channel state of the terminal.

The PUCCH resource may be largely classified into a long PUCCH and a short PUCCH according to the allocated symbol length. In NR, a long PUCCH has a length of 4 symbols or more in a slot, and a short PUCCH has a length of 2 symbols or less in a slot.

Describing the Long PUCCH in more detail, the long PUCCH may be used for the purpose of improving uplink cell coverage, and thus may be transmitted in the DFT-S-OFDM method, which is a short carrier transmission rather than OFDM transmission. The long PUCCH supports transport formats such as PUCCH format 1, PUCCH format 3, and PUCCH format 4 depending on the number of control information bits that can be supported and whether terminal multiplexing is supported through Pre-DFT OCC support at the front end of IFFT.

First, PUCCH format 1 is a long PUCCH format, based on DFT-S-OFDM that can support up to 2 bits of control information and uses frequency resources of 1 RB. The control information may be composed of HARQ-ACK, SR or a combination thereof. In PUCCH format 1, an OFDM symbol including a demodulation reference signal (DMRS), which is a demodulation reference signal (or reference signal), and an OFDM symbol including a UCI are repeatedly configured.

For example, when the number of transmission symbols in PUCCH format 1 is 8 symbols, the first start symbol of 8 symbols is sequentially composed of DMRS symbols, UCI symbols, DMRS symbols, UCI symbols, DMRS symbols, UCI symbols, DMRS symbols, and UCI symbols. The DMRS symbol is spread by using an orthogonal code (or orthogonal sequence or spreading code, w_i(m)) in a time axis in a sequence corresponding to a length of 1 RB on a frequency axis within one OFDM symbol, and is transmitted after performing IFFT.

The UCI symbol has a structure that generates d(0) by modulating 1-bit control information by BPSK and 2-bit control information by QPSK, scrambles and multiplies the generated d(0) by a sequence corresponding to the length of 1 RB on the frequency axis, spreads the scrambled sequence using an orthogonal code (or orthogonal sequence or spreading code, w_i(m)) on the time axis, and transmits the same after performing IFFT.

The terminal generates a sequence, based on the group hopping or sequence hopping configuration and the configured ID, received from the base station as a higher signal, and generates a sequence corresponding to a length of 1 RB by cyclic shifting the generated sequence with an initial cyclic shift (CS) value set as a hi her signal to. w_i(m) is determined as given like $$w_i(m) = e^{\frac{j2\pi\varphi(m)}{N_{SF}}}$$

when the length of the spreading code (NSF) is given, and is given as in Table 16 below. i means the index of the spreading code itself, and m means the index of elements of the spreading code. Here, the numbers in [ ] in [Table 16] mean $\varphi(m)$, for example, when the length of the spreading code is 2 and the index i=0 of the configured spreading code, the spreading code w_i(m) becomes $w_i(0)=e^{j2\pi \cdot 0/N_{SF}}=1$, $w_i(1)=e^{j2\pi \cdot 0/N_{SF}}=1$, so that w_i(m)=[1 1].

more than 2 bits, and the number of RBs used may be configured through an upper layer. The control information may be composed of HARQ-ACK, SR, CSI or a combination thereof. The DMRS symbol positions in PUCCH format 3 are presented in the following [Table 17] depending on whether frequency hopping in the slot and additional DMRS symbols are configured.

TABLE 17

| | DMRS position in PUCCH format 3/4 | | | |
|---|---|---|---|---|
| | Additional DMRS is not configured | | Additional DMRS is configured | |
| PUCCH format 3/4 Transmission length | Frequency hopping is not configured | Frequency hopping is configured | Frequency hopping is not configured | Frequency hopping is configured |
| 4 | 1 | 0, 2 | 1 | 0, 2 |
| 5 | | 0, 3 | | 0, 3 |
| 6 | | 1, 4 | | 1, 4 |
| 7 | | 1, 4 | | 1, 4 |
| 8 | | 1, 5 | | 1, 5 |
| 9 | | 1, 6 | | 1, 6 |
| 10 | | 2, 7 | | 1, 3, 6, 8 |
| 11 | | 2, 7 | | 1, 3, 6, 9 |
| 12 | | 2, 8 | | 1, 4, 7, 10 |
| 13 | | 2, 9 | | 1, 4, 7, 11 |
| 14 | | 3, 10 | | 1, 5, 8, 12 |

For example, if the number of transmission symbols in PUCCH format 3 is 8 symbols, the first start symbol of 8 symbols starts with 0, and DMRS is transmitted to the 1st and 5th symbols. The above table also applies to the DMRS symbol position in PUCCH format 4.

Next, PUCCH format 4 is a long PUCCH format based on DFT-S-OFDM capable of supporting more than 2 bits of control information, and uses frequency resources of 1 RB. The control information may be composed of HARQ-ACK, SR, CSI, or a combination thereof. The difference between PUCCH format 4 and PUCCH format 3 is that PUCCH format 4 may multiplex PUCCH format 4 of multiple terminals within one RB. It is possible to multiplex PUCCH format 4 of multiple UEs by applying Pre-DFT OCC to control information in the IFFT front end. However, the number of control information symbols that may be transmitted by one terminal is reduced according to the number of terminals to be multiplexed. The number of multiplexable terminals, that is, the number of different OCCs that may be used may be 2 or 4, and the number of OCCs and the OCC index to be applied may be configured through an upper layer.

TABLE 16

Spreading code for PUCCH format 1 $w_i(m) = e^{j2\pi\phi(m)/N_{SF}}$

| | $\phi(m)$ | | | | | | |
|---|---|---|---|---|---|---|---|
| $N_{SF}$ | i = 0 | i = 1 | i = 2 | i = 3 | i = 4 | i = 5 | i = 6 |
| 1 | [0] | — | — | — | — | — | — |
| 2 | [0 0] | [0 1] | — | — | — | — | — |
| 3 | [0 0 0] | [0 1 2] | [0 2 1] | — | — | — | — |
| 4 | [0 0 0 0] | [0 2 0 2] | [0 0 2 2] | [0 2 2 0] | — | — | — |
| 5 | [0 0 0 0 0] | [0 1 2 3 4] | [0 2 4 1 3] | [0 3 1 4 2] | [0 4 3 2 1] | — | — |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | — |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

Next, PUCCH format 3 is a long PUCCH format, based on DFT-S-OFDM that can support control information of Next, the short PUCCH will be described. The short PUCCH may be transmitted in both a downlink centric slot (downlink centric slot) and an uplink centric slot (uplink centric slot), and is usually transmitted in the last symbol of the slot, or the OFDM symbol at the back (e.g., the last OFDM symbol or the second OFDM symbol at the end, or the last 2 OFDM symbols). Of course, it is also possible to transmit the Short PUCCH at an arbitrary position in the slot. Also, the short PUCCH may be transmitted using one OFDM symbol or two OFDM symbols. The short PUCCH may be used to shorten a delay time compared to long PUCCH in a situation in which uplink cell coverage is good and is transmitted in CP-OFDM.

The short PUCCH supports transmission formats such as PUCCH format 0 and PUCCH format 2 according to the number of control information bits that can be supported. First, PUCCH format 0 is a short PUCCH format capable of supporting up to 2 bits of control information, and uses frequency resources of 1 RB. The control information may be composed of HARQ-ACK, SR or a combination thereof. The PUCCH format 0 does not transmit DMRS, and has a structure in which only sequences mapped to 12 subcarriers on a frequency axis within one OFDM symbol are transmitted. The terminal generates a sequence based on the group hopping or sequence hopping set and the set ID received as a higher signal from the base station, cyclically shifts the generated sequence to a final CS value obtained by adding another CS value according to whether the indicated initial cyclic shift (CS) value is ACK or NACK, and then maps and transmits the mapped sequence to 12 subcarriers.

For example, if HARQ-ACK is 1 bit, as shown in [Table 18] below, 6 is added to the initial CS value to generate the final CS, and in the case of NACK, 0 is added to the initial CS to generate the final CS. The CS value 0 for NACK and the CS value 6 for ACK are defined in the standard, and the terminal always generates PUCCH format 0 according to the value and transmits 1-bit HARQ-ACK.

TABLE 18

| 1 bit HARQ-ACK Final CS | NACK (Initial CS + 0) MOD 12 = Initial CS | ACK (Initial CS + 6) MOD 12 |
| --- | --- | --- |

For example, in a case where HARQ-ACK is 2 bits, as shown in [Table 19], if 2-bit HARQ-ACK is (NACK, NACK), 0 is added to the initial CS value, if 2-bit HARQ-ACK is (NACK, ACK), 3 is added to the initial CS value, if 2-bit HARQ-ACK is (ACK, ACK), 6 is added to the initial CS value, and if 2-bit HARQ-ACK is (ACK, NACK), 9 is added to the initial CS value. The CS values for (NACK, NACK) 0, CS values for (NACK, ACK) 3, CS values for (ACK, ACK) 6, and CS values for (ACK, NACK) 9 are defined in the specification, and the terminal always generates a PUCCH format 0 according to the above values and transmits a 2-bit HARQ-ACK.

When the final CS value exceeds 12 by the CS value added according to ACK or NACK to the initial CS value, since the length of the sequence is 12, modulo 12 is applied to the final CS value.

TABLE 19

| 2 bit HARQ-ACK Final CS | NACK, NACK (Initial CS + 0) MOD 12 = Initial CS | NACK, ACK (Initial CS + 3) MOD 12 | ACK, ACK (Initial CS + 6) MOD 12 | ACK, NACK (Initial CS + 9) MOD 12 |
| --- | --- | --- | --- | --- |

Next, PUCCH format 2 is a short PUCCH format supporting more than 2 bits of control information, and the number of RBs used may be configured through an upper layer. The control information may be composed of HARQ-ACK, SR, CSI, or a combination thereof. In the PUCCH format 2, when the index of the first subcarrier is #0, the position of the subcarrier through which the DMRS is transmitted in one OFDM symbol is fixed to a subcarrier having an index of #1, #4, #7, #10. The control information is mapped to the remaining subcarriers except for the subcarrier where the DMRS is located through a modulation process after channel coding.

In summary, the values and ranges that may be configured for each PUCCH format described above may be summarized as in [Table 20]. If there is no need to configure a value in the following table, the value is indicated as N.A.

TABLE 20

| | | PUCCH Format 0 | PUCCH Format 1 | PUCCH Format 2 | PUCCH Format 3 | PUCCH Format 4 |
| --- | --- | --- | --- | --- | --- | --- |
| Starting symbol | Configurability | √ | √ | √ | √ | √ |
| | Value range | 0-13 | 0-10 | 0-13 | 0-10 | 0-10 |
| Number of symbols in a slot | Configurability | √ | √ | √ | √ | √ |
| | Value range | 1, 2 | 4-14 | 1, 2 | 4-14 | 4-14 |
| Index for identifying starting PRB | Configurability | √ | √ | √ | √ | √ |
| | Value range | 0-274 | 0-274 | 0-274 | 0-274 | 0-274 |
| Number of PRBs | Configurability | N.A. | N.A. | √ | √ | N.A. |
| | Value range | N.A. (Default is 1) | N.A. (Default is 1) | 1-16 | 1-6, 8-10, 12, 15, 16 | N.A. (Default is 1) |
| Enabling frequency hopping (intra-slot) | Configurability | √ | √ | √ | √ | √ |
| | Value range | On/Off (only for 2 symbol) | On/Off | On/Off (only for 2 symbol) | On/Off | On/Off |
| Freq.cy resource of $2^{nd}$ hop if intra-slot frequency hopping is enabled | Configurability | √ | √ | √ | √ | √ |
| | Value range | 0-274 | 0-274 | 0-274 | 0-274 | 0-274 |

TABLE 20-continued

| | | PUCCH Format 0 | PUCCH Format 1 | PUCCH Format 2 | PUCCH Format 3 | PUCCH Format 4 |
|---|---|---|---|---|---|---|
| Index of initial cyclic shift | Configurability | √ | √ | N.A. | N.A. | N.A. |
| | Value range | 0-11 | 0-11 | N.A. | N.A. | N.A. |
| Index of time-domain OCC | Configurability | N.A. | √ | N.A. | N.A. | N.A. |
| | Value range | N.A. | 0-6 | N.A. | N.A. | N.A. |
| Length of Pre-DFT OCC | Configurability | N.A. | N.A. | N.A. | N.A. | ✓ |
| | Value range | N.A. | N.A. | N.A. | N.A. | 2, 4 |
| Index of Pre-DFT OCC | Configurability | N.A. | N.A. | N.A. | N.A. | ✓ |
| | Value range | N.A. | N.A. | N.A. | N.A. | 0, 1, 2, 3 |

Meanwhile, in order to improve uplink coverage, multi-slot repetition may be supported for PUCCH formats 1, 3, and 4, and PUCCH repetition may be configured for each PUCCH format.

Next, the PUCCH resource configuration of the base station or the terminal will be described. The base station may configure PUCCH resources for each BWP through an upper layer for a specific terminal. The configuration may be as shown in [Table 21].

TABLE 21

```
PUCCH-Config ::=                                         SEQUENCE {
    resourceSetToAddModList                              SEQUENCE (SIZE
(1..maxNrofPUCCH-ResourceSets)) OF PUCCH-ResourceSet         OPTIONAL, --
Need N
    resourceSetToReleaseList                             SEQUENCE (SIZE
(1..maxNrofPUCCH-ResourceSets)) OF PUCCH-ResourceSetId       OPTIONAL, --
Need N
    resourceToAddModList                                 SEQUENCE (SIZE
(1..maxNrofPUCCH-Resources)) OF PUCCH-Resource               OPTIONAL, --
Need N
    resourceToReleaseList                                SEQUENCE (SIZE
(1..maxNrofPUCCH-Resources)) OF PUCCH-ResourceId             OPTIONAL, --
Need N
    format1                                              SetupRelease {
PUCCH-FormatConfig }                                         OPTIONAL, --
Need M
    format2                                              SetupRelease {
PUCCH-FormatConfig }                                         OPTIONAL, --
Need M
    format3                                              SetupRelease {
PUCCH-FormatConfig }                                         OPTIONAL, --
Need M
    format4                                              SetupRelease {
PUCCH-FormatConfig }                                         OPTIONAL, --
Need M
        schedulingRequestResourceToAddModList            SEQUENCE (SIZE
(1..maxNrofSR-Resources)) OF SchedulingRequestResourceConfig
OPTIONAL, -- Need N
    schedulingRequestResourceToReleaseList               SEQUENCE (SIZE
(1..maxNrofSR-Resources)) OF SchedulingRequestResourceId
OPTIONAL, -- Need N
        multi-CSI-PUCCH-ResourceList                     SEQUENCE (SIZE
(1..2)) OF PUCCH-ResourceId                                  OPTIONAL, --
Need M
        dl-DataToUL-ACK                                  SEQUENCE (SIZE
(1..8)) OF INTEGER (0..15)                                   OPTIONAL, --
Need M
    spatialRelationInfoToAddModList                      SEQUENCE (SIZE
(1..maxNrofSpatialRelationInfos)) OF PUCCH-SpatialRelationInfo
OPTIONAL, -- Need N
    spatialRelationInfoToReleaseList                     SEQUENCE (SIZE
(1..maxNrofSpatialRelationInfos)) OF PUCCH-SpatialRelationInfoId
OPTIONAL, -- Need N
    pucch-PowerControl                                   PUCCH-PowerControl
OPTIONAL, -- Need M
    ...
}
```

According to the above table, one or more PUCCH resource sets in a PUCCH resource set for a specific BWP may be configured, and a maximum payload value for UCI transmission may be configured in some of the PUCCH resource sets. Each PUCCH resource set may include one or more PUCCH resources, and each of the PUCCH resources may belong to one of the PUCCH formats described above.

For the PUCCH resource set, the maximum payload value of the first PUCCH resource set may be fixed to 2 bits, and thus the corresponding value may not be separately configured through an upper layer or the like. When the remaining PUCCH resource set is configured, the index of the corresponding PUCCH resource set may be configured in ascending order according to the maximum payload value, and the maximum payload value might not be configured in the last PUCCH resource set. The upper layer configuration for the PUCCH resource set may be as shown in [Table 22].

TABLE 22

```
-- A set with one or more PUCCH resources
PUCCH-ResourceSet ::=            SEQUENCE {
    pucch-ResourceSetId              PUCCH-ResourceSetId,
    resourceList                     SEQUENCE (SIZE
    (1..maxNrofPUCCH-ResourcesPerSet)) OF PUCCH-ResourceId,
    maxPayloadMinus1                 INTEGER (4..256)
OPTIONAL  -- Need R
}
```

The resourceList parameter of the table may include IDs of PUCCH resources belonging to the PUCCH resource set.

If the initial access or the PUCCH resource set is not configured, the PUCCH resource set as shown in [Table 22], which is composed of a plurality of cell specific PUCCH resources in the initial BWP, may be used. The PUCCH resource to be used for initial access in this PUCCH resource set may be indicated through SIB1.

TABLE 23

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0. 3. 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

The maximum payload of each PUCCH resource included in the PUCCH resource set may be 2 bits in a case of PUCCH format 0 or 1, and may be determined by symbol length, number of PRBs, and maximum code rate for the remaining formats. The aforementioned symbol length and number of PRBs may be configured for each PUCCH resource, and the maximum code rate may be configured for each PUCCH format.

Next, PUCCH resource selection for UCI transmission will be described. In the case of SR transmission, PUCCH resource for the SR corresponding to the schedulingRequestID may be configured through the upper layer as shown in [Table 24]. The PUCCH resource may be a resource belonging to PUCCH format 0 or PUCCH format 1.

TABLE 24

```
SchedulingRequestResourceConfig ::=   SEQUENCE {
  schedulingRequestResourceId           SchedulingRequestResourceId,
  schedulingRequestID                   SchedulingRequestId,
  periodicityAndOffset                  CHOICE {
    sym2                                  NULL,
    sym6or7                               NULL,
    sl1                                   NULL,
-- Recurs in every slot
    sl2                                   INTEGER (0..1),
    sl4                                   INTEGER (0..3),
    sl5                                   INTEGER (0..4),
    sl8                                   INTEGER (0..7),
    sl10                                  INTEGER (0..9),
    sl16                                  INTEGER (0..15),
    sl20                                  INTEGER (0..19),
    sl40                                  INTEGER (0..39),
    sl80                                  INTEGER (0..79),
    sl160                                 INTEGER (0..159),
    sl320                                 INTEGER (0..319),
    sl640                                 INTEGER (0..639),
  }
OPTIONAL,   -- Need M
  resource                              PUCCH-ResourceId
OPTIONAL    -- Need M
}
```

For the configured PUCCH resource, a transmission period and an offset are configured through a periodicityAndOffset parameter of [Table 24]. If there is uplink data to be transmitted by the terminal at a time corresponding to the set period and offset, the corresponding PUCCH resource is transmitted, otherwise the corresponding PUCCH resource might not be transmitted.

In the case of CSI transmission, PUCCH resources to transmit a periodic or semi-persistent CSI report through PUCCH may be configured in the PUCCH-CSI-ResourceList parameter as shown in [Table 23]. The parameter contains a list of PUCCH resources for each BWP for a cell or CC to transmit a corresponding CSI report. The PUCCH resource may be a resource belonging to PUCCH format 2 or PUCCH format 3 or PUCCH format 4.

TABLE 25

```
CSI-ReportConfig ::=                  SEQUENCE {
  reportConfigId                        CSI-ReportConfigId,
  carrier                               ServCellIndex
OPTIONAL,   -- Need S
  ...
  reportConfigType                      CHOICE {
    periodic                              SEQUENCE {
      reportSlotConfig                      CSI-
ReportPeriodicityAndOffset,
      pucch-CSI-ResourceList                SEQUENCE
(SIZE (1..maxNrofBWPs)) OF PUCCH-CSI-Resource
    },
    semiPersistentOnPUCCH                 SEQUENCE {
      reportSlotConfig                      CSI-
ReportPeriodicityAndOffset,
      pucch-CSI-ResourceList                SEQUENCE
(SIZE (1..maxNrofBWPs)) OF PUCCH-CSI-Resource
    },
    ...
  }
}
```

For the PUCCH resource, a transmission period and an offset are configured through reportSlotConfig in [Table 23].

In the case of HARQ-ACK transmission, the resource set of the PUCCH resource to be transmitted is first selected according to the payload of the UCI including the corresponding HARQ-ACK. That is, a PUCCH resource set having a minimum payload not smaller than the UCI payload is selected. Next, the PUCCH resource in the PUCCH resource set may be selected through the PUCCH resource indicator (PRI) in DCI that schedules the TB corresponding to the corresponding HARQ-ACK, and the PRI may be a PUCCH resource indicator specified in [Table 5] or [Table 6]. The relationship between the PRI and the PUCCH resource selected from the PUCCH resource set may be as shown in [Table 26].

TABLE 26

| PUCCH resource indicator | PUCCH resource |
|---|---|
| '000' | $1^{st}$ PUCCH resource provided by pucch-ResourceId obtained from the $1^{st}$ value of resourceList |
| '001' | $2^{nd}$ PUCCH resource provided by pucch-ResourceId obtained from the $2^{nd}$ value of resourceList |
| '010' | $3^{rd}$ PUCCH resource provided by pucch-ResourceId obtained from the $3^{rd}$ value of resourceList |
| '011' | $4^{th}$ PUCCH resource provided by pucch-ResourceId obtained from the $4^{th}$ value of resourceList |
| '100' | $5^{th}$ PUCCH resource provided by pucch-ResourceId obtained from the $5^{th}$ value of resourceList |
| '101' | $6^{th}$ PUCCH resource provided by pucch-ResourceId obtained from the $6^{th}$ value of resourceList |
| '110' | $7^{th}$ PUCCH resource provided by pucch-ResourceId obtained from the $7^{th}$ value of resourceList |
| '111' | $8^{th}$ PUCCH resource provided by pucch-ResourceId obtained from the $8^{th}$ value of resourceList |

If the number of PUCCH resources in the selected PUCCH resource set is greater than 8, PUCCH resources may be selected by the following equation.

$$r_{PUCCH} = \begin{cases} \left\lfloor \frac{n_{CCE,p} \cdot \lceil R_{PUCCH}/8 \rceil}{N_{CCE,p}} \right\rfloor + \\ \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \\ \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases}$$ [Equation 1]

In the above equation, $r_{PUCCH}$ represents the index of the selected PUCCH resource in the PUCCH resource set, $R_{PUCCH}$ represents the number of PUCCH resources belonging to the PUCCH resource set, $\Delta_{PRI}$ represents the PRI value, $N_{CCE,p}$ represents the total number of CCEs of the CORESET to which the reception DCI belongs, and $n_{CCE,p}$ represents the first CCE index for the reception DCI.

The time when the corresponding PUCCH resource is transmitted is after the $K_1$ slot from the TB transmission corresponding to the corresponding HARQ-ACK. The candidates of the $K_1$ value are configured as an upper layer, and more specifically, are configured in a dl-DataToUL-ACK parameter in PUCCH-Config specified in [Table 21]. The $K_1$ value of one of these candidates may be selected by the PDSCH-to-HARQ feedback timing indicator in DCI scheduling the TB, and this value may be a value specified in [Table 5] or [Table 6]. Meanwhile, the unit of the $K_1$ value may be a slot unit or a sub-slot unit. Here, a sub-slot is a unit having a length smaller than that of a slot, and one or a plurality of symbols may constitute one sub-slot.

Next, a case in which two or more PUCCH resources are located in one slot will be described. The terminal may transmit UCI through one or two PUCCH resources in one slot or sub-slot, when UCI is transmitted through two PUCCH resources in one slot/sub-slot, i) each PUCCH resource does not overlap in a symbol unit, and ii) at least one PUCCH resource may be a short PUCCH. Meanwhile, the terminal might not expect to transmit a plurality of PUCCH resources for HARQ-ACK transmission in one slot.

Next, a PUCCH transmission procedure when two or more PUCCH resources overlap will be described. When two or more PUCCH resources overlap, one of the overlapping PUCCH resources may be selected or a new PUCCH resource may be selected according to the above-described condition, that is, the transmitted PUCCH resource should not overlap in a symbol unit. In addition, all UCI payloads transmitted through overlapping PUCCH resources may be multiplexed or partially dropped. First, case 1: multi-slot repetition is not configured in the PUCCH resource, and case 2: the multi-slot repetition is configured will be described.

For Case 1, when the PUCCH resource overlaps, Case 1 is divided into Case 1-1) when two or more PUCCH resources for HARQ-ACK transmission overlap and Case 1-2) for the rest. Case 1-1) is illustrated in FIG. 9.

Figure 9:
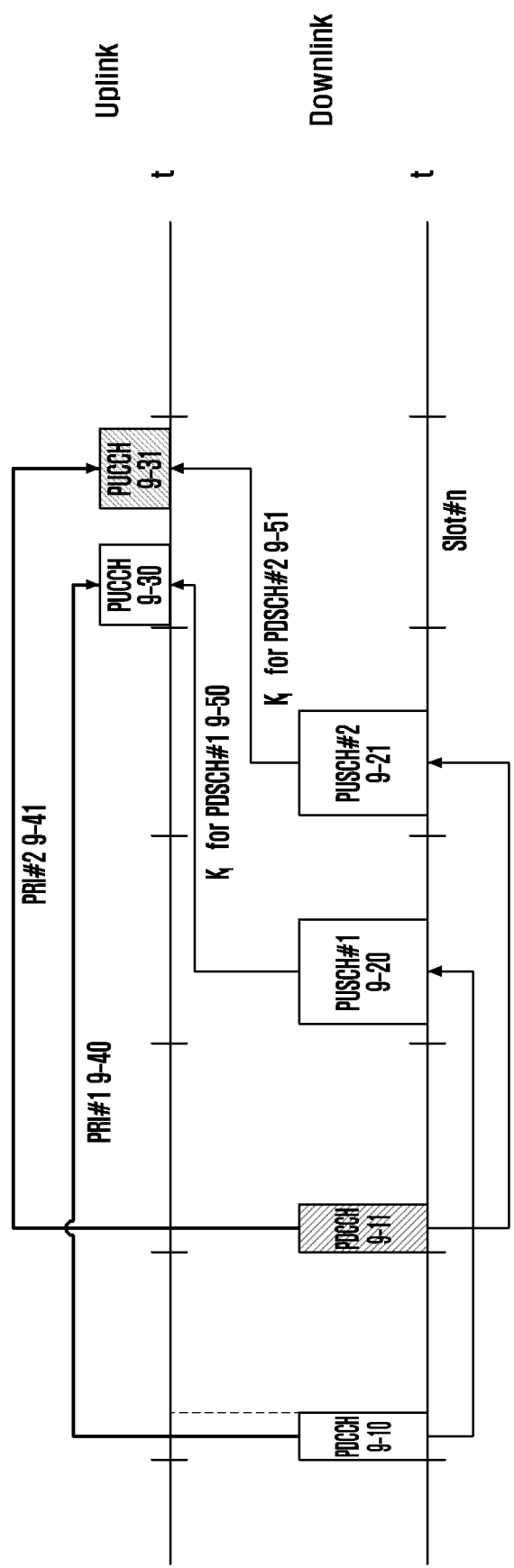
FIG. 9 illustrates a view for a case in which multiple PUCCH resources for HARQ-ACK transmission for a PDSCH overlap when multi-slot repetition is not configured according to an embodiment.

FIG. 9 illustrates a view for a case in which multiple PUCCH resources for HARQ-ACK transmission for a PDSCH overlap when multi-slot repetition is not configured according to an embodiment. Referring to FIG. 9, for two or more different PDCCHs (9-10, 9-11) that schedule the PDSCH, when the transmission slots of the PUCCH resource corresponding to each PDCCH are the same, the corresponding PUCCH resources may be considered to overlap each other. That is, when the uplink slots corresponding to the $K_1$ value (9-50, 9-51) indicated by multiple PDCCHs are the same, PUCCH resources corresponding to the corresponding PDCCHs may be considered to overlap with each other.

At this time, among the PUCCH resources indicated by the PRIs 9-40, 9-41 in the PDCCH, only the PUCCH resource 9-31 selected based on the PRI 9-41 corresponding to the PDCCH 9-11 transmitted at the last time is selected and transmitted. Therefore, all of the HARQ-ACK information for PDSCH 9-21 through the selected PUCCH resource 9-31, and the HARQ-ACK information for other PUCCH 9-30 overlapping the PUCCH resource 9-31 are transmitted after being encoded by a predefined HARQ-ACK codebook.

Next, the case 1-2) in which the PUCCH resource for HARQ-ACK transmission and the PUCCH resource for SR and/or CSI transmission overlap, or when a plurality of PUCCH resources for SR and/or CSI transmission overlap will be described. In the above case, when a plurality of PUCCH resources transmitted in the same slot overlap one or more symbols on the time axis, the corresponding PUCCH resources are defined to overlap, and whether to multiplex UCIs in these resources may be summarized as in [Table 27].

TABLE 27

| | PUCCH 1 | | |
|---|---|---|---|
| PUCCH 2 | SR | HARQ-ACK | CSI |
| SR | — | Case 1-2-1 (Multiplex or not depending on PUCCH format) | Always multiplex |

TABLE 27-continued

| | PUCCH 1 | | |
|---|---|---|---|
| PUCCH 2 | SR | HARQ-ACK | CSI |
| HARQ-ACK | | Always multiplex (HARQ-ACK codebook) | Case 1-2-2 (Multiplex or not by higher layer) |
| CSI | Always multiplex | Case 1-2-2 | Case 1-2-2 |

According to the above table, these UCIs are always multiplexed when overlapping between PUCCH resources where HARQ-ACK is transmitted or overlapping between PUCCHs where SR and CSI are transmitted.

On the other hand, when each PUCCH resource in which SR and HARQ-ACK are transmitted overlaps, that is, in case 1-2-1, whether to perform UCI multiplexing is divided according to the format of the PUCCH resource.

SR on PUCCH format 0+HARQ-ACK on PUCCH format 1: SR is dropped and only HARQ-ACK is transmitted
Other cases: SR and HARQ-ACK are multiplexed In addition, in the remaining cases corresponding to Case 1-2-2, that is, when HARQ-ACK and CSI overlap between transmitted PUCCH resources or when CSI overlaps among multiple transmitted PUCCH resources, whether these UCIs are multiplexed may follow the upper layer configuration. In addition, configuration of whether to multiplex between HARQ-ACK and CSI and configuration of whether to multiplex between multiple CSIs may be independently performed.

For example, whether to multiplex between HARQ-ACK and CSI may be configured through simultaneous HARQ-ACK-CSI parameters per PUCCH format 2, 3, or 4, and the corresponding parameters may be configured as the same value for the PUCCH format. If multiplexing is configured not to be performed through the above parameters, only HARQ-ACK may be transmitted and overlapping CSI may be dropped. In addition, whether to multiplex between multiple CSIs may be configured through a multi-CSI-PUCCH-ResourceList parameter in PUCCH-Config. That is, when the multi-CSI-PUCCH-ResourceList parameter is configured, multiplexing between CSIs may be performed, otherwise, only the PUCCH corresponding to the CSI having a higher priority may be transmitted according to the priority between CSIs.

When the UCI multiplexing is performed as described above, the method of selecting the PUCCH resource to transmit the corresponding UCI resource and the multiplexing method may vary according to the information of the overlapped UCI and the format of the PUCCH resource, which may be summarized as in [Table 28].

TABLE 28

| | PUCCH 1 | | |
|---|---|---|---|
| | SR | HARQ-ACK | CSI |
| PUCCH 2 | (format 0/1) | Format 1 / Format 0/2/3/4 | (format 2/3/4) |
| SR (format 0/1) | — | Option 1 / Option 2 | Option 3 |
| HARQ-ACK | Option 1 | Option 4 / Option 4 | Option 5 (grant-based) Option 6 (SPS) |

TABLE 28-continued

| | PUCCH 1 | | |
|---|---|---|---|
| | SR | HARQ-ACK | CSI |
| PUCCH 2 | (format 0/1) | Format 1 / Format 0/2/3/4 | (format 2/3/4) |
| Format 0/2/3/4 | Option 2 | Option 4 / Option 4 | Option 5 (grant-based) Option 6 (SPS) |
| CSI (format 2/3/4) | Option 3 | Option 5 (grant-based) Option 6 (SPS) / Option 5 (grant-based) Option 6 (SPS) | Option 7 |

Each option in the above table is as follows.

Option 1: Depending on the SR value of the SR PUCCH resource overlapped with the HARQ-ACK PUCCH resource, the PUCCH resource selection is different. That is, if the SR value is positive, the PUCCH resource for SR is selected, and if the SR value is negative, the PUCCH resource for HARQ-ACK is selected. HARQ-ACK information is transmitted to the selected PUCCH resource.

Option 2: The HARQ-ACK information and SR information is multiplexed and transmitted to PUCCH resource for HARQ-ACK.

Option 3: The SR information and HARQ-ACK information is multiplexed and transmitted to the PUCCH resource for CSI.

Option 4: The PUCCH resource for overlapping HARQ-ACK is transmitted.—Detailed operations are described in case 1-1) above.

Option 5: When the PUCCH resource for HARQ-ACK corresponding to PDSCH scheduled as PDCCH and the PUCCH resource for CSI transmission overlap and multiplexing between HARQ-ACK and CSI is configured as an upper layer, the PUCCH resource for HARQ-ACK information and the CSI information are multiplexed and transmitted.

Option 6: When the PUCCH resource for HARQ-ACK corresponding to semi-persistent scheduling (SPS) PDSCH and the PUCCH resource for CSI transmission overlap and multiplexing between HARQ-ACK and CSI is configured as a higher layer, the HARQ-ACK information and the CSI information are multiplexed and transmitted to the PUCCH resource for HARQ-ACK.

If the PUCCH resource list for multiplexing to the upper layer, that is, the multi-CSI-PUCCH-ResourceList is configured, all of the multiplexed UCI payloads among the resources in the list may be transmitted, and the UCI payload is transmitted after selecting one resource having the lowest index. If there is no resource that may transmit all of the multiplexed UCI payloads in the list, the resource with the largest index is selected and HARQ-ACK and CSI reports corresponding to the number of transmittable resources are transmitted.

Option 7: When multiple PUCCH resources for CSI transmission overlap and multiplexing between multiple CSIs is configured as the upper layer, the PUCCH resource list for CSI multiplexing configured as the upper layer, that is, multiplexed in the multi-CSI-PUCCH-ResourceList All UCI payloads may be transmitted and the UCI payload is transmitted after selecting the resource with the lowest index. If there is no resource that may transmit all of the multiplexed UCI payloads in the list, the resource with the largest index is selected and CSI reports corresponding to the number of transmittable resources are transmitted.

In the above, for the convenience of description, the case where two PUCCH resources overlap is focused upon, but the method may be similarly applied even when three or more PUCCH resources overlap. For example, when the PUCCH resource multiplexed with SR+HARQ-ACK overlaps with the CSI PUCCH resource, a multiplexing method between HARQ-ACK and CSI may be followed.

If the transmission is configured without multiplexing between specific UCIs, according to the order of HARQ-ACK>SR>CSI, a UCI with a higher priority may be transmitted and a UCI with a lower priority may be dropped. If the transmission is configured without multiplexing when multiple CSI PUCCH resources overlap, PUCCH corresponding to a CSI having a higher priority may be transmitted, and PUCCH corresponding to another CSI may be dropped.

Next, Case 2, that is, when multi-slot repetition is configured, is divided into Case 2-1) when two or more PUCCH resources for HARQ-ACK transmission are located in the same start slot and Case 2-2) for the rest. Each case is shown in FIG. 10.

Figure 10:
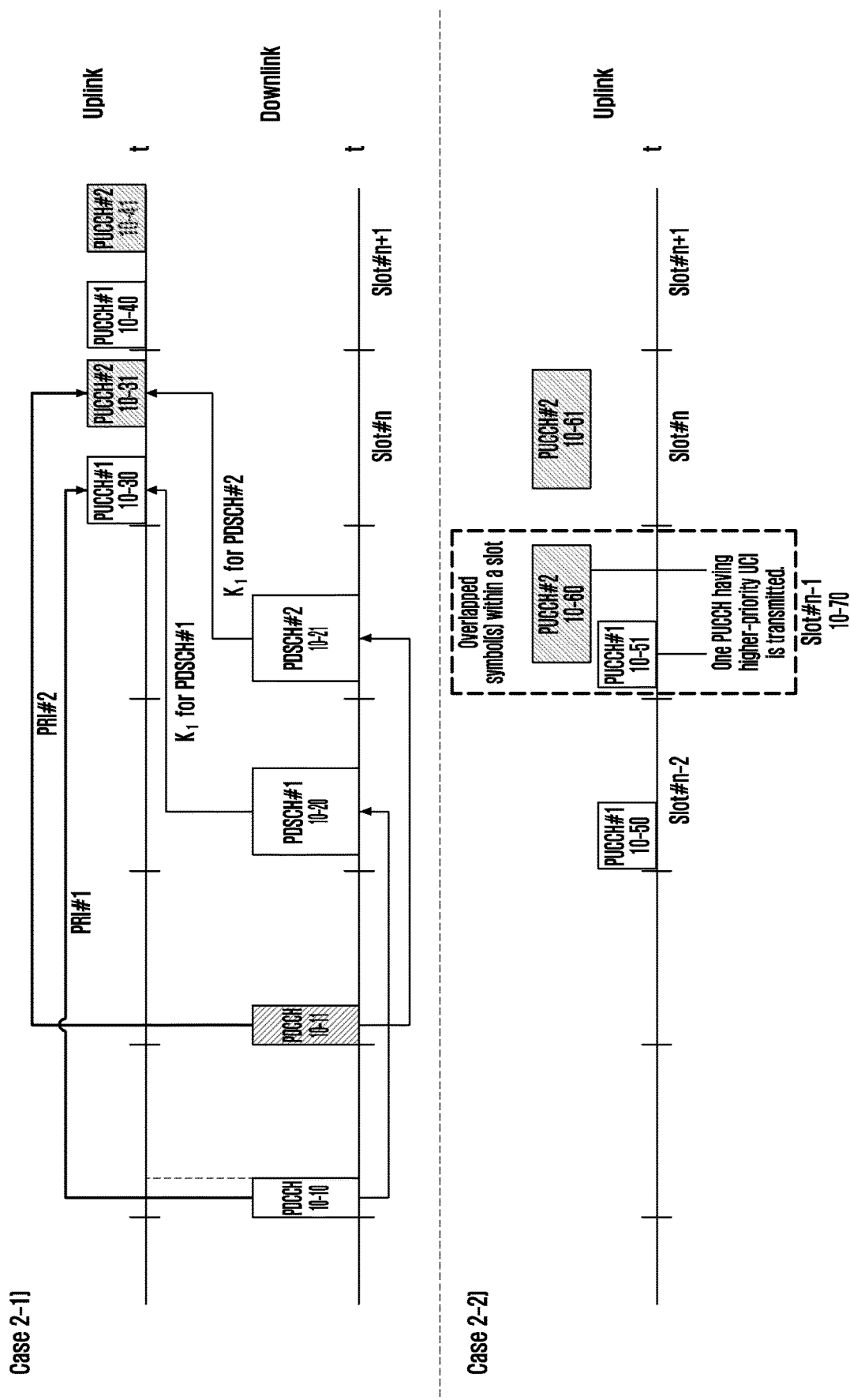
FIG. 10 illustrates a view for a case where PUCCH resources overlap when multi-slot repetition is configured according to an embodiment.

FIG. 10 illustrates a view for a case where PUCCH resources overlap when multi-slot repetition is configured according to an embodiment.

Referring to Case 2-1), when multi-slot repetition is configured in a PUCCH resource for HARQ-ACK, that is, PUCCH #1 is repeatedly transmitted over multiple slots (10-30, 10-40) and PUCCH #2 is also repeatedly transmitted over multiple slots (10-31, 10-41), if the starting slots of the two PUCCH indicated by $K_1$ are the same, a single PUCCH resource (PUCCH transmitted at the last time point in one slot), that is, PUCCH #2 may be selected in the same manner as in Case 1-1). Accordingly, HARQ-ACKs corresponding to PDSCH #1 and PDSCH #2 are multiplexed and transmitted to the corresponding PUCCH through the HARQ-ACK codebook.

For the convenience of description, the case where a plurality of multi-slot repetition PUCCHs overlap is exemplified, but the same method may be applied when there is overlapping between a multi-slot repetition PUCCH and a PUCCH transmitted in a single slot.

Case 2-2) corresponds to a case where symbol unit overlap occurs between PUCCH for HARQ-ACK transmission and PUCCH for SR or CSI transmission, or PUCCH for multiple SR or CSI transmission. That is, Case 2-2) corresponds to a case where PUCCH #1 is repeatedly transmitted over multiple slots (10-50, 10-51) and PUCCH #2 is also repeatedly transmitted over multiple slots (10-60, 10-61), and a case where PUCCH #1 and PUCCH #2 overlap more than one symbol in one slot (10-70).

Between the PUCCHs where more than one symbol overlap occurs in the corresponding slot (10-70), UCIs with higher priority may be transmitted by comparing the priority between UCIs in the PUCCH, and other UCIs may be dropped from the corresponding slot. At this time, the priority between the UCIs may follow an order of HARQ-ACK>SR>CSI.

In addition, when a plurality of CSI PUCCH resources overlap, a PUCCH corresponding to a high priority CSI may be transmitted, and a PUCCH corresponding to another CSI may be dropped from the corresponding slot. PUCCH transmission or dropping according to the above-described priority is performed only in the slot in which symbol unit overlap occurs, and is not performed in other slots. That is, the PUCCH in which multi-slot repetition is configured may be dropped in a slot in which symbol unit overlap occurs, but may be transmitted in the remaining slots as configured.

In the above case, for the convenience of description, the case where a plurality of multi-slot repetition PUCCHs are overlapped is exemplified, but the same method may be applied when there is overlapping between a multi-slot repetition PUCCH and a PUCCH transmitted in a single slot.

Next, a method of generating a HARQ-ACK codebook for transmitting HARQ-ACK on the selected PUCCH resource will be described. When the downlink data PDSCH is scheduled based on the DCI information of the PDCCH, the PDSCH is transmitted, and the slot information to which the corresponding HARQ-ACK feedback is mapped and the mapping information of the uplink control channel PUCCH carrying HARQ-ACK feedback information are transmitted. Specifically, the slot interval between the downlink data PDSCH and the corresponding HARQ-ACK feedback may be indicated through the PDSCH-to-HARQ_feedback timing indicator, and one of eight feedback timing offsets configured through a higher layer (e.g., RRC signaling) may be indicated. In addition, in order to deliver PUCCH resources including the type of the uplink control channel PUCCH to map HARQ-ACK feedback information, the location of the start symbol, and the number of mapping symbols, one of the 8 resources configured as an upper layer through the PUCCH resource indicator may be indicated. The terminal collects and transmits HARQ-ACK feedback bits to transmit HARQ-ACK information to the base station. In the following, the collected HARQ-ACK feedback bits may be referred to as a mixture of HARQ-ACK codebooks.

The base station may configure a Type-1 HARQ-ACK codebook to transmit HARQ-ACK feedback bits corresponding to a PDSCH that may be transmitted at a predetermined slot location regardless of whether or not an actual PDSCH is transmitted, for the terminal. Alternatively, the base station may configure a Type-2 HARQ-ACK codebook to manage and transmit HARQ-ACK feedback bits corresponding to the actually transmitted PDSCH through a counter downlink assignment index (DAI) or total DAI, for the terminal.

When the terminal receives a Type-1 HARQ-ACK codebook, the terminal may determine a feedback bit to be transmitted through K1 candidate values, which are HARQ-ACK feedback timing information for a PDSCH and a table including slot, start symbol, number of symbols or length information to which the PDSCH is mapped. The table including the start symbol, the number of symbols, or the length information of the PDSCH may be configured as higher layer signaling or may be determined as a default table. Also, K1 candidate values may be determined as default values, for example, {1, 2, 3, 4, 5, 6, 7, 8} or higher layer signaling. The slot to which the PDSCH is mapped can be known through the K1 value when the PDSCH is transmitted in a single slot, and if the PDSCH is repeatedly transmitted in multiple slots (slot aggregation), an upper layer parameter indicates the K1 value and the number of repetitive transmissions, for example, a pdsch-AggregationFactor value configured in the PDSCH-Config IE in the active BWP. If the PDSCH is repeatedly transmitted in multiple slots, the K1 value is indicated based on the last slot among the PDSCH repetitive transmissions, and the slot to which the PDSCH is mapped is regarded as the pdsch-AggregationFactor slot from the last slot to be repeatedly transmitted, that is, the slot to start the repeated transmission.

Assuming that the set of PDSCH reception candidate cases in the serving cell c is $M_{A,c}$, $M_{A,c}$ may be determined in the following [pseudo-code 1] steps.

[Start pseudo-code 1]
Step 1: Initialize j to 0, $M_{A,c}$ to be an empty set, and HARQ-ACK transmission timing index k to 0.
Step 2: Configure R for a set of each row in a table including slot, start symbol, number of symbols or length information to which the PDSCH is mapped. If the symbol to which the PDSCH indicated by each row of R is mapped is configured as an uplink symbol according to the higher layer configuring, delete the corresponding row from R.
Step 3-1: If the terminal receives one PDSCH for unicast in one slot, and R is not an empty set, add k to the set $M_{A,c}$.
Step 3-2: If the terminal receives more than one PDSCH in one slot, count the maximum number of PDSCHs that may be assigned to different symbols in R, increase the number of j by 1, and add them to $M_{A,c}$.
Step 4: Start again from step 2 and increase k by 1.
[End of pseudo-code 1]

HARQ-ACK feedback bits may be determined in the following [pseudo-code 2] steps for $M_{A \text{ and } c}$ defined as [pseudo-code 1].

[Start pseudo-code 2]
Step 1: Initialize the HARQ-ACK reception occasion index m to 0 and the HARQ-ACK feedback bit index j to 0.
Step 2-1: If the terminal is indicated not to receive HARQ-ACK bundling for a codeword through higher layer signaling, not to receive CBG transmission of PDSCH, and to receive up to 2 codewords through 1 PDSCH, construct HARQ-ACK feedback bit for each codeword by increasing j by 1.
Step 2-2: If the terminal is indicated to receive HARQ-ACK bundling for a codeword through higher layer signaling, and is indicated to receive up to 2 codewords through 1 PDSCH, compose HARQ-ACK feedback bit for each codeword of one HARQ-ACK feedback bit through binary AND operation.
Step 2-3: If the terminal is indicated to transmit CBG of the PDSCH through higher layer signaling, and is not indicated to receive up to 2 codewords through 1 PDSCH, construct HARQ-ACK feedback bit for each codeword for the number of CBGs by increasing j by 1.
Step 2-4: If the terminal is indicated to transmit the CBG of the PDSCH through higher layer signaling, and is indicated to receive up to 2 codewords through 1 PDSCH, construct HARQ-ACK feedback bits for the number of CBGs by increasing j by 1 and add to each codeword.
Step 2-5: If the terminal is not indicated to transmit CBG of the PDSCH through higher layer signaling, and is not indicated to receive up to 2 codewords through 1 PDSCH, construct a HARQ-ACK feedback bit for each codeword.
Step 3: Start again from step 2-1 and increase m by 1.
[End of pseudo-code 2]

When the terminal receives the Type-2 HARQ-ACK codebook, the terminal determines a feedback bit to be transmitted through counter downlink assignment index (DAI) or total DAI managing HARQ-ACK feedback bits corresponding to PDSCH and K1 candidate values that are HARQ-ACK feedback timing information for PDSCH. The K1 candidate values, which are HARQ-ACK feedback timing information for the PDSCH, are composed of a combination of default values and values specified through higher layer signaling. For example, the default values may be configured as {1, 2, 3, 4, 5, 6, 7, 8}.

If the counter DAI of DCI format 1_0 or DCI format 1_1 in which the PDSCH is allocated in the serving cell c is called $V_{C\text{-}DAI,c,m}^{DL}$ for the PDCCH monitoring timing m, and the total DAI of DCI format 1_1 in which the PDSCH is allocated to the uplink control channel PDCCH monitoring timing m is $V_{T\text{-}DAI,c,m}^{DL}$, a Type-2 HARQ-ACK codebook may be configured in the following [pseudo-code 3] steps.

[Start pseudo-code 3]
Step 1: Initialize serving cell index c to 0, PDCCH monitoring timing m to 0, j to 0, DAI comparison index $V_{temp}$, $V_{temp}$ to 0, and HARQ-ACK feedback bit set VS to be an empty set.
Step 2: If the PDCCH monitoring timing m is before the downlink BWP change for the serving cell c or before the uplink BWP change for the PCell, and the downlink BWP change is not triggered due to DCI format 1_1 of the PDCCH monitoring timing m, c is excluded from the serving cell set.
Step 3-1: If the PDSCH allocated by the PDCCH corresponding to the PDCCH monitoring timing m exists in the serving cell c, and if $V_{C\text{-}DAI,c,m}^{DL}$ is less than or equal to $V_{temp}$, j is increased by 1 and $V_{temp}$ is configured as $V_{C\text{-}DAI,c,m}^{DL}$. In addition, if $V_{T\text{-}DAI,c,m}^{DL}$ is an empty set, $V_{temp2}$ is configured as $V_{C\text{-}DAI,c,m}^{DL}$, and if $V_{T\text{-}DAI,c,m}^{DL}$ is not an empty set, $V_{temp2}$ is configured as $V_{T\text{-}DAI,c,m}^{DL}$.
Step 3-2: If the PDSCH allocated by the PDCCH corresponding to the PDCCH monitoring timing m exists in the serving cell c, and the terminal is indicated not to receive HARQ-ACK bundling for the codeword through higher layer signaling and indicated to receive up to two codewords from at least one downlink BWP of at least one serving cell through one PDSCH, construct HARQ-ACK feedback bit for each codeword by increasing j by 1.
Step 3-3: If the PDSCH allocated by the PDCCH corresponding to the PDCCH monitoring timing m exists in the serving cell c, and the terminal is indicated to receive HARQ-ACK bundling for the codeword through higher layer signaling and indicated to receive up to two codewords from at least one downlink BWP of at least one serving cell through one PDSCH, compose HARQ-ACK feedback bit for each codeword of one HARQ-ACK feedback bit through a binary AND operation.
Step 3-4: If the PDSCH allocated by the PDCCH corresponding to the PDCCH monitoring timing m exists in the serving cell c, and the terminal is not indicated to receive up to two codewords through one PDSCH, construct HARQ-ACK feedback bit for one codeword.
Step 4: Start again from Step 2 and increase c by 1.
Step 5: Start again from Step 2 and increase m by 1.
Step 6: Increase j by 1 when $V_{temp2}$ is less than $V_{temp}$.
Step 7-1: If the terminal is indicated not to bundle HARQ-ACK for the codeword through higher layer signaling, and instructed to receive up to 2 codewords from at least one downlink BWP of at least one serving cell through one PDSCH, configure the total number of HARQ-ACK feedback bits as $2 \cdot (4 \cdot j + V_{temp2})$.
Step 7-2: If the terminal is indicated to bundle HARQ-ACK for the codeword through higher layer signaling, or is not instructed to receive up to 2 codewords through 1 PDSCH, configure the total number of HARQ-ACK feedback bits as $4 \cdot j + V_{temp2}$.

Step 8: Determine HARQ-ACK feedback bits with NACK for HARQ-ACK feedback bits not configured in steps 3-1, 3-2, 3-3 and 3-4.

[End of pseudo-code 3]

Figure 11:
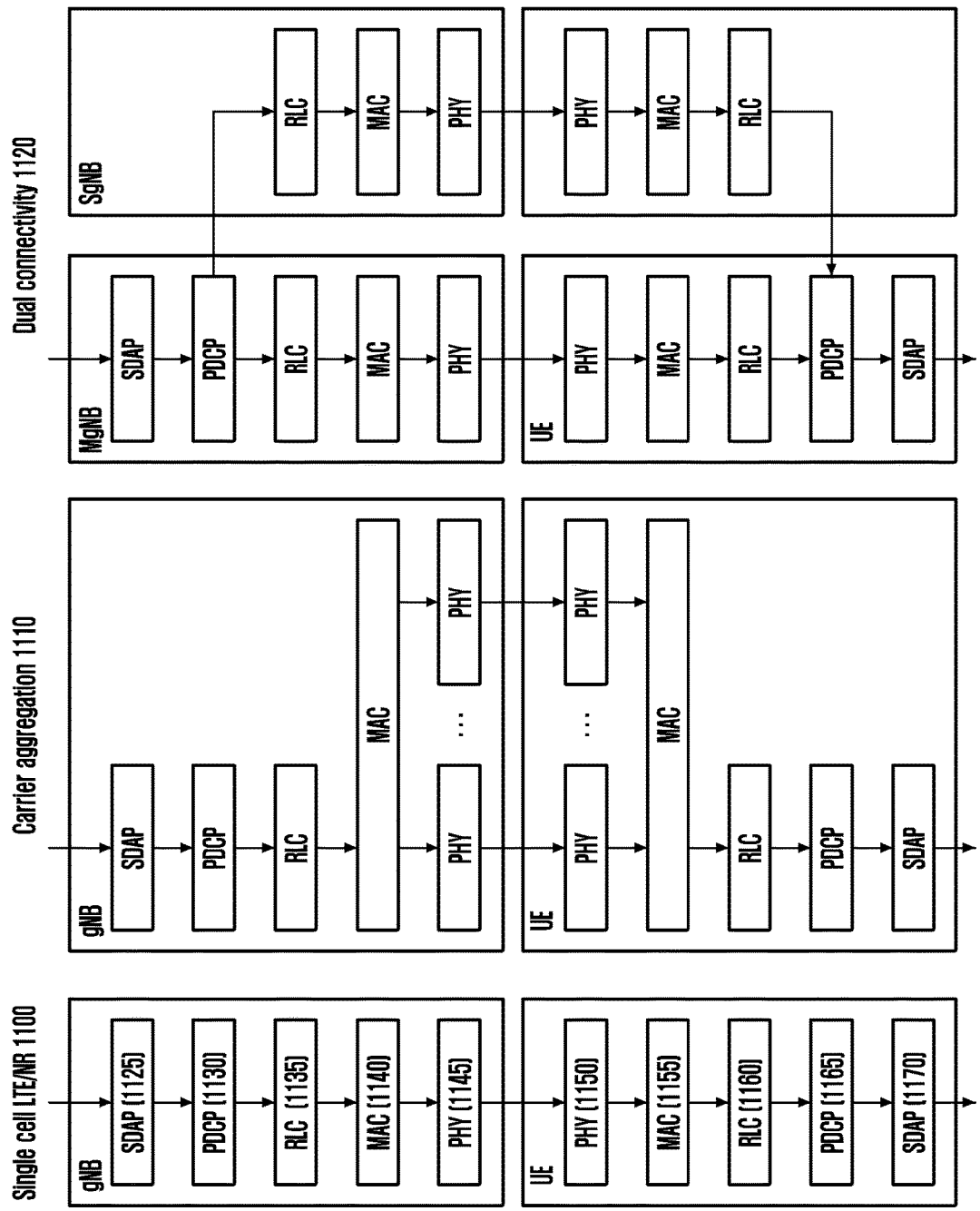
FIG. 11 illustrates a view for a base station and a terminal radio protocol structure when performing single cell, carrier aggregation, and dual connectivity according to an embodiment.

FIG. 11 illustrates a view for a base station and a terminal radio protocol structure when performing single cell, carrier aggregation, and dual connectivity according to an embodiment. Referring to FIG. 11, the radio protocols of a next-generation mobile communication system include an NR service data adaptation protocol (SDAP) 1125 and 1170, an NR packet data convergence protocol (PDCP) 1130 and 1165, and an NR radio link control (RLC) 1140 and 1155 in the terminal and the NR base station 1135 and 1160, and NR medium access control (MAC), respectively.

The main functions of the NR SDAPs 1125 and 1170 may include some of the following functions.

Transfer of user plane data
Mapping between a QoS flow and a DRB for both DL and UL
Marking QoS flow ID in both DL and UL packets
Mapping reflective QoS flow to DRB for the UL SDAP PDUs For the SDAP layer device, the terminal may be configured as to whether to use the header of the SDAP layer device for each PDCP layer device, for each bearer, or for each logical channel, or whether to use the function of the SDAP layer device through an RRC message, and when the SDAP header is configured, the NAS QoS reflection configuration 1-bit indicator (NAS reflective QoS) of the SDAP header and the AS QoS reflection configuration 1-bit indicator (AS reflective QoS) indicate that the terminal may update or reconfigure the QoS flow of uplink and downlink and mapping information for the data bearer. The SDAP header may include QoS flow ID information indicating QoS. The QoS information may be used as data processing priority and scheduling information to support a smooth service.

The main functions of NR PDCP 10-30 and 10-65 may include some of the following functions.

Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink In the above, the order reordering function of the NR PDCP device refers to a function of reordering PDCP PDUs received from a lower layer in order based on a PDCP sequence number (SN), may include a function of delivering data to an upper layer in the reordered order, may include a function of directly transmitting without considering the order, may include a function of reordering and recording lost PDCP PDUs, may include a function of transmitting a status report for the lost PDCP PDUs to the transmitting side, or may include a function of requesting retransmission of lost PDCP PDUs.

The main functions of the NR RLCs 1135 and 1160 may include some of the following functions.

Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment In the above, the in-sequence delivery of the NR RLC device refers to a function of sequentially transmitting RLC SDUs received from a lower layer to an upper layer, and may include a function of reassembling and delivering when one RLC SDU is originally divided into multiple RLC SDUs and received, may include a function of rearranging the received RLC PDUs, based on RLC sequence number (SN) or PDCP sequence number (SN), may include a function of reordering and recording lost RLC PDUs, may include a function of reporting the states of the lost RLC PDUs to a transmitting side, may include a function of requesting retransmission of lost RLC PDUs, may include a function of forwarding only RLC SDUs before the lost RLC SDU in order when there is a lost RLC SDU, may include a function of delivering all RLC SDUs received before the timer starts in order to a higher layer if a predetermined timer expires even if there is a lost RLC SDU, or may include a function of delivering all RLC SDUs received to the upper layer in order if a predetermined timer expires even if there is a lost RLC SDU. In addition, the RLC PDUs may be processed in the order in which they are received (regardless of the serial number or sequence number, in order of arrival) and delivered to the PDCP device in any order (out-of-sequence delivery), and in the case of a segment, segments that are stored in a buffer or to be received at a later time may be received and reconstructed into a complete RLC PDU, processed, and then transmitted to a PDCP device. The NR RLC layer might not include a concatenation function, and the function may be performed in the NR MAC layer or replaced by a multiplexing function of the NR MAC layer.

In the above, out-of-sequence delivery of the NR RLC device refers to a function of directly transmitting RLC SDUs received from a lower layer to an upper layer regardless of order, and may include a function of reassembling and delivering when one RLC SDU is originally divided into multiple RLC SDUs and received, or may include a function of storing the RLC SN or PDCP SN of the received RLC PDUs and sorting the order to record the lost RLC PDUs.

The NR MACs 1140 and 1155 may be connected to several NR RLC layer devices configured in one terminal, and the main functions of the NR MAC may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layer 1145 and 1150 may perform channel coding and modulating the upper layer data, making an OFDM symbol and transmitting the same to a radio channel, or demodulating and channel decoding an OFDM symbol received through the radio channel to deliver the same to the upper layer.

The detailed structure of the radio protocol structure may be changed according to a carrier (or cell) operation method. For example, when a base station transmits data to a terminal based on a single carrier (or cell), the base station and the terminal use a protocol structure having a single structure for each layer, such as 1100. On the other hand, when a base station transmits data to a terminal, based on carrier aggregation (CA) using multiple carriers in a single TRP, the base station and the terminal have a single structure up to RLC like 1110, but use a protocol structure for multiplexing the PHY layer through the MAC layer. As another example, when a base station transmits data to a terminal, based on dual connectivity (DDC) using multiple carriers in multiple TRPs, the base station and the terminal have a single structure up to RLC as in 1120, but use a protocol structure for multiplexing the PHY layer through the MAC layer.

Referring to the PUCCH-related descriptions above, the current Rel-15 NR is focused on PDSCH transmission from a single cell/transmission point/panel/beam (hereinafter referred to as a transmission reception point (TRP)), or coherent PDSCH transmission for multiple TRPs, and only one PUCCH resource for HARQ-ACK is transmitted within one slot as a HARQ-ACK transmission method.

On the other hand, NR release 16 supports non-coherent transmission for each TRP, that is, non-coherent joint transmission (NC-JT). At this time, each TRP participating in NC-JT may transmit a separate PDSCH to the terminal at the same time. HARQ-ACK information for the PDSCHs may be transmitted through one PUCCH resource, and the HARQ-ACK information may be transmitted through a separate PUCCH resource for each TRP in consideration of a case in which overhead due to information exchange between TRPs is burdensome, such as a case where a backhaul delay time for each TRP is long. Particularly, when HARQ-ACK information (or UCI information) is transmitted through a separate PUCCH resource for HARQ-ACK transmission for each TRP, the HARQ-ACK information may be transmitted through TDM in a slot. The treatment method for overlap between PUCCH resources was not defined in Rel-15. In the disclosure, by providing a processing method for the above-described case, the loss of uplink control information and transmission delay time in NC-JT transmission can be minimized. Meanwhile, the disclosure can be applied regardless of whether NC-JT transmission is performed when a plurality of PUCCH resources for HARQ-ACK transmission are included in one slot.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

Hereinafter, a base station is a subject that performs resource allocation of a terminal, and may be at least one of a gNode B (gNB), an eNode B (eNB), a Node B, a base station (BS), a radio access unit, a base station controller, or a node on a network. The terminal may include a user equipment (UE), a mobile station (MS), a cellular phone, a smart phone, a computer, or a multimedia system capable of performing communication functions. In addition, NR or LTE/LTE-A systems will be described below as an example, but embodiments of the disclosure may be applied to other communication systems having similar technical backgrounds or channel types. In addition, the embodiments of the disclosure may be applied to other communication systems through some modifications within a range not departing greatly from the scope of the disclosure as determined by a person having skilled technical knowledge.

The content of the disclosure is applicable to FDD and TDD systems.

Hereinafter, in the disclosure, high-level signaling is a signal transmission method transmitted from a base station to a terminal using a downlink data channel of a physical layer, or a signal transmission method transmitted from a terminal to a base station using an uplink data channel of a physical layer, and may be referred to as RRC signaling, PDCP signaling, or medium access control (MAC) control element (MAC CE).

Hereinafter, in the disclosure, in determining whether to apply cooperative communication, the terminal may use various methods in which the PDCCH(s) allocating the PDSCH to which the cooperative communication is applied has a specific format, the PDCCH(s) allocating the PDSCH to which the cooperative communication is applied includes a specific indicator indicating whether the cooperative communication is applied, PDCCH(s) allocating PDSCH to which cooperative communication is applied is scrambled with a specific RNTI, or the application of cooperative communication in a specific section indicated by the upper layer is assumed. Hereinafter, for the convenience of description, receiving the PDSCH to which the cooperative communication is applied based on conditions similar to the above by the terminal will be referred to as an NC-JT case.

Hereinafter, in the disclosure, determining the priority between A and B may be variously applied such as selecting one having a higher priority according to a predetermined priority rule to perform an operation corresponding thereto, or omitting or dropping an operation for a lower priority.

Hereinafter, in the disclosure, the above examples will be described through a number of embodiments, but these are not mutually independent, and it is possible that one or more embodiments may be applied simultaneously or in combination.

First Embodiment: DCI Reception for NC-JT

The 5G wireless communication system, unlike before, may support not only services requiring a high transmission speed, but also services having a very short transmission delay and services requiring a high connection density. In a wireless communication network including a plurality of cells, transmission and reception points (TRP), or beams, the coordinated transmission between each cell, TRP, and/or beam is one of the basic technologies that can satisfy various service requirements by increasing the strength of signals received by the terminal or efficiently performing interference control between cells, TRPs or/and beams.

Joint transmission (JT) is a representative transmission technique for cooperative communication as described above, and supports one terminal through different cells, TRP, and/or beams through the joint transmission technique to increase the strength of the signal received by the terminal. Meanwhile, since channels of each cell, TRP or/and beam and a terminal may have significantly different characteristics, different precodings, modulation and coding schemes (MCS), and resource assignments need to be applied to links between each cell, TRP or/and beam and the terminal. In particular, in the case of non-coherent joint transmission (NC-JT) supporting non-coherent precoding between each cell, TRP or/and beam, it is important to configure individual DL (downlink) transmission information for each cell, TRP or/and beam. Meanwhile, individual DL transmission information configuration for each cell, TRP, and/or beam is a major factor in increasing the payload required for DL DCI transmission, which may adversely affect the reception performance of a physical downlink control channel (PDCCH) transmitting DCI. Therefore, it is necessary to carefully design a tradeoff between DCI information amount and PDCCH reception performance for JT support.

Figure 12:
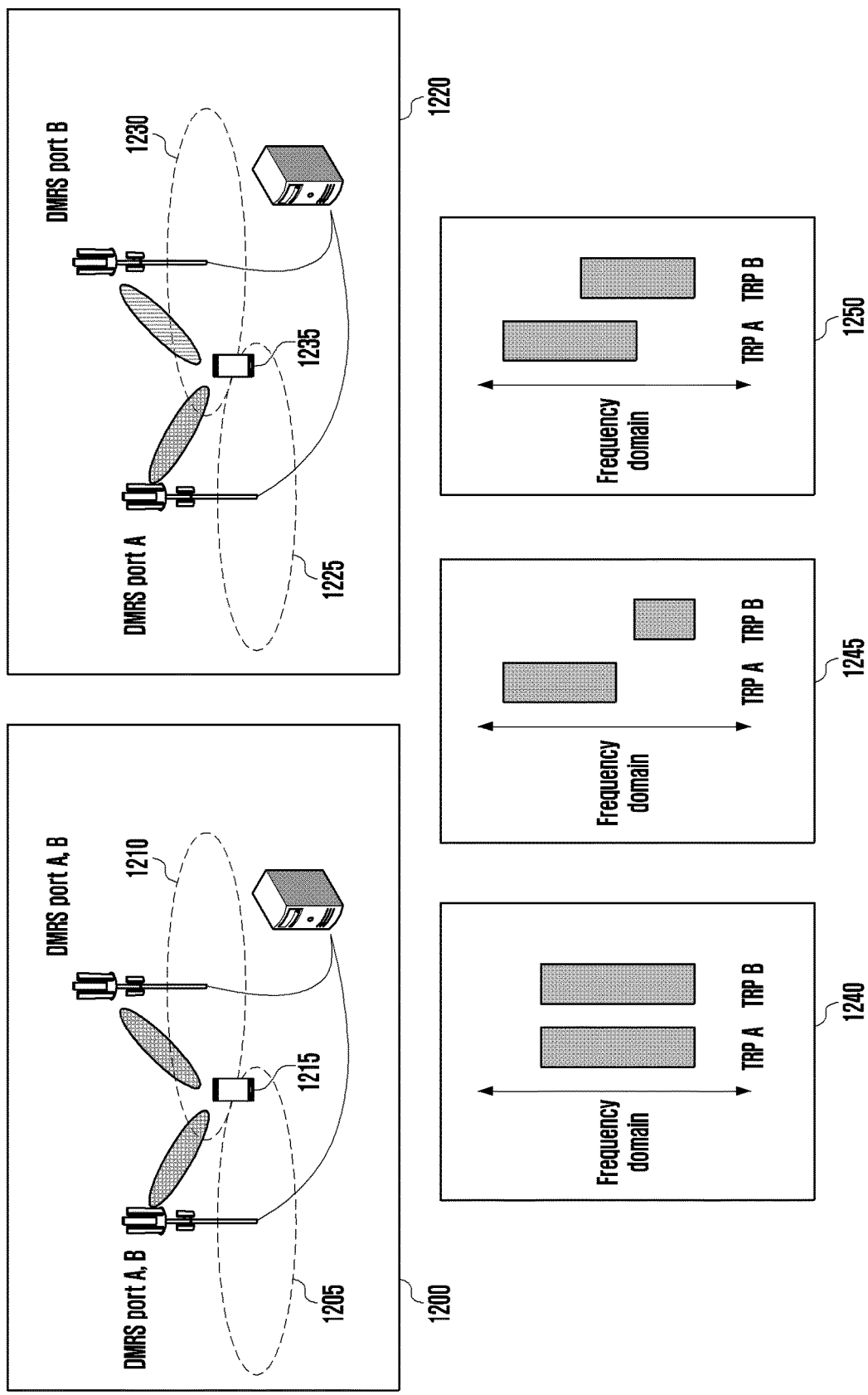
FIG. 12 illustrates a view for an example of an antenna port configuration and resource allocation for cooperative communication according to some embodiments in a wireless communication system according to an embodiment.

FIG. 12 illustrates a view for an example of antenna port configuration and resource allocation for cooperative communication according to some embodiments in a wireless communication system according to an embodiment.

Referring to FIG. 12, examples of joint resource allocation according to TRP according to a joint transmission (JT) technique and situation are illustrated. In FIG. 12, 1200 is an example of coherent joint transmission (C-JT) supporting coherent precoding between each cell, TRP or/and beam. In C-JT, a single data (PDSCH) is transmitted from the TRP A (1205) and the TRP B (1210) to the terminal 1215, and joint precoding may be performed in multiple TRPs. This may mean that TRP A (1205) and TRP B (1210) transmit DMRS through the same DMRS ports (e.g., DMRS ports A and B in both TRPs) for receiving the same PDSCH. In this case, the terminal may receive one DCI information for receiving one PDSCH demodulated based on DMRS transmitted through DMRS ports A and B.

In FIG. 12, 1220 is an example of non-coherent joint transmission (NC-JT) supporting non-coherent precoding between each cell, TRP or/and beam.

In the case of NC-JT, PDSCH may be transmitted to the terminal 1235 for each cell, TRP or/and beam, and precoding may be individually applied to each PDSCH. Each cell, TRP or/and beam transmits different PDSCHs to improve throughput compared to a single cell, TRP or/and beam transmission, or each cell, TRP or/and beam may repeatedly transmit the same PDSCH, thereby improving reliability compared to a single cell, TRP or/and beam transmission. Various radio resource allocations may be considered, such as when the frequency and time resources used by multiple TRPs for transmitting PDSCH are all the same (1240), when the frequency and time resources used by multiple TRPs do not overlap at all (1245), or when some of the frequency and time resources used by multiple TRPs overlap (1250). When multiple TRPs repeatedly transmit the same PDSCH to improve reliability in each case for the above-mentioned radio resource allocation, if the receiving terminal does not know whether the corresponding PDSCH is repeatedly transmitted, the corresponding terminal may have limitations in improving reliability because the terminal cannot perform combining in the physical layer for the corresponding PDSCH. Therefore, the disclosure provides a repeat transmission instruction and configuration method for improving NC-JT transmission reliability.

For NC-JT support, DCIs of various forms, structures, and relationships may be considered to simultaneously allocate multiple PDSCHs to one terminal.

Figure 13:
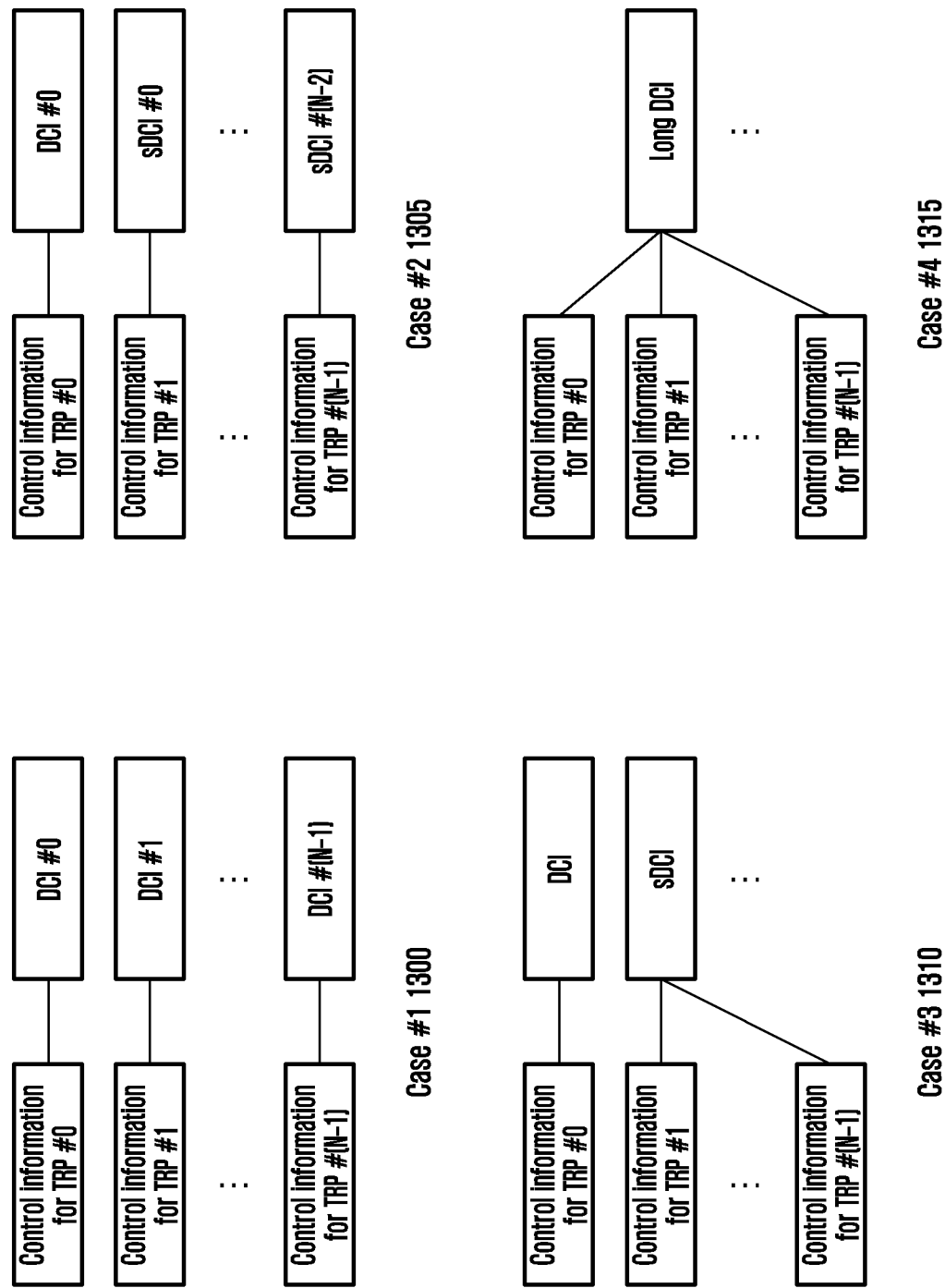
FIG. 13 illustrates a view for an example of downlink control information (DCI) configuration for cooperative communication in a wireless communication system according to an embodiment.

FIG. 13 illustrates a view for an example of downlink control information (DCI) configuration for cooperative communication in a wireless communication system according to an embodiment.

Referring to FIG. 13, four examples of DCI design for NC-JT support are illustrated. Referring to FIG. 13, case #1 (1300) is an example in which the control information for PDSCH transmitted in (N−1) additional TRPs is transmitted in the same form (same DCI format) as the control information for a PDSCH transmitted in a serving TRP, in a situation in which different (N−1) PDSCHs are transmitted from (N−1) additional TRPs (TRP #1 to TRP #(N−1)) in addition to the serving TRP (TRP #0) used when transmitting a single PDSCH. That is, the terminals may obtain control information for PDSCHs transmitted from different TRPs (DCI #0 to DCI #(N−1)) through DCIs having the same DCI format and the same payload (TRP #0 to TRP #(N−1)).

In case #1 described above, the degree of freedom for each PDSCH control (assignment) may be completely guaranteed, but when each DCI is transmitted in different TRPs, a coverage difference for each DCI may occur and reception performance may be deteriorated.

Case #2 (1305) is an example in which the control information for a PDSCH transmitted from (N−1) additional TRPs is transmitted in a different form (different DCI format or different DCI payload) from the control information for a PDSCH transmitted from the serving TRP, in a situation in which different (N−1) PDSCHs are transmitted in (N−1) additional TRPs (TRP #1 to TRP #(N−1)) in addition to the serving TRP (TRP #0) used when transmitting a single PDSCH. For example, in the case of DCI #0 that transmits control information for a PDSCH transmitted in the serving TRP (TRP #0), all information elements of DCI format 1_0 to DCI format 1_1 are included, but in the case of 'shortened' DCIs (sDCI #0 to sDCI #(N−2)) transmitting control information for PDSCHs transmitted from the cooperative TRP (TRP #1 to TRP #(N−1)), some of the information elements of DCI format 1_0 to DCI format 1_1 may be included. Therefore, in the case of sDCI that transmits control information for PDSCHs transmitted in the cooperative TRP, the payload may possibly be small compared to the normal DCI (nDCI) transmitting PDSCH-related control information transmitted from the serving TRP, or the payload may possibly include as many reserved bits as the number of bits less than the nDCI.

In case #2 described above, the degree of freedom of each PDSCH control (assignment) may be limited according to the contents of the information elements included in the sDCI, but since the reception performance of sDCI is superior to that of nDCI, the probability of occurrence of a coverage difference for each DCI may be lowered.

Case #3 (1310) is an example in which the control information for PDSCHs transmitted from (N−1) additional TRPs is transmitted in a different format (different DCI format or different DCI payload) from control information for PDSCHs transmitted from the serving TRP, in a situation in which (N−1) PDSCHs are transmitted from (N−1) additional TRPs (TRP #1 to TRP #(N−1)) other than the serving TRP (TRP #0) used when transmitting a single PDSCH. For example, in the case of DCI #0 transmitting control information for PDSCH transmitted in serving TRP (TRP #0), all information elements of DCI format 1_0 to DCI format 1_1 are included, and in the case of control information for PDSCHs transmitted from a cooperative TRP (TRP #1 to TRP #(N−1)), only some of the information elements of DCI format 1_0 to DCI format 1_1 may be collected and transmitted in one 'secondary' DCI (sDCI). For example, the sDCI may have at least one of HARQ-related information, such as frequency domain resource assignment, time domain resource assignment, and MCS of cooperative TRPs. In addition, for information not included in sDCI, such as a bandwidth part (BWP) indicator or a carrier indicator, the information may follow the DCI (DCI #0, normal DCI, nDCI) of serving TRP.

In case #3, the degree of freedom of each PDSCH control (assignment) may be limited according to contents of information elements included in sDCI, but the reception performance of sDCI can be adjusted and compared to case #1 or case #2, and the complexity of DCI blind decoding can be reduced.

Case #4 (1315) is an example of transmitting control information for PDSCHs transmitted from (N−1) additional TRPs in DCI (long DCI, lDCI) as control information for PDSCHs transmitted from the serving TRP, in a situation in which (N−1) PDSCHs are transmitted from (N−1) additional TRPs (TRP #1 to TRP #(N−1)) other than the serving TRP (TRP #0) used when transmitting a single PDSCH. That is, the terminal may acquire control information for PDSCHs transmitted from different TRPs (TRP #0 to TRP #(N−1)) through a single DCI. In case #4, the complexity of DCI blind decoding of the terminal may not increase, but the PDSCH control (assignment) degree of freedom may be low, such as having a limited number of cooperative TRPs due to long DCI payload limitation.

In the following description and embodiments, sDCI may refer to various auxiliary DCIs, such as shortened DCI, secondary DCI, or normal DCI (PDI format 1_0 to 1_1 described above) including PDSCH control information transmitted from a cooperative TRP. If no special restrictions are specified, the description is similarly applicable to the various auxiliary DCIs.

In the following descriptions and embodiments, the above-described case #1, case #2, and case #3 in which one or more DCIs (PDCCH) are used for NC-JT support are divided into multiple PDCCH-based NC-JTs, and a single DCI (for NC-JT support) (PDCCH) may be classified as a single PDCCH based NC-JT in case a of the above-described case #4.

In embodiments of the disclosure, "cooperative TRP" may be replaced with various terms such as "cooperative panel" or "cooperative beam" when actually applied.

In embodiments of the disclosure, the term "when NC-JT is applied" may be interpreted in various ways according to the situation, such as "when a terminal receives one or more PDSCHs simultaneously from one BWP", "when a terminal receives two or more PDSCHs simultaneously from one BWP, based on transmission configuration indicator (TCI) indication", "when the terminal receives PDSCH associated with one or more DMRS port group (port group)", etc., but it is used as one expression for convenience of explanation.

In the disclosure, the radio protocol structure for NC-JT may be used in various ways depending on the TRP deployment scenario. For example, if there is no or little backhaul delay between cooperative TRPs, it is possible to use a structure, based on MAC layer multiplexing similar to 1110 of FIG. 11 (CA-like method). On the other hand, when the backhaul delay between cooperative TRPs is so large that the backhaul delay cannot be ignored (e.g., when 2 milliseconds (ms) or more is required for information exchange such as CSI, scheduling, and HARQ-ACK between cooperative TRPs), a robust characteristic in delay may possibly be secured using an independent structure for each TRP from the RLC layer (DC-like method), similar to 1120 of FIG. 11.

Embodiment 1-1: Method of Configuring Downlink Control Channel for NC-JT Transmission on the Basis of Multi-PDCCH In multiple PDCCH-based NC-JT, when transmitting DCI for a PDSCH schedule of each TRP, there may be a CORESET or search space classified for each TRP. CORSET or search space for each TRP may be configured as at least one of the following cases.

Upper layer index configuration by CORESET: The TRP that transmits the PDCCH in the corresponding CORESET may be distinguished by the upper layer index value for each set CORESET. That is, in the set of CORESETs having the same upper layer index value, it may be considered that the same TRP transmits the PDCCH or the PDCCH that schedules the PDSCH of the same TRP is transmitted.

Multiple PDCCH-Config configuration: Multiple PDCCH-Configs in one BWP are configured, and each PDCCH-Config may be considered to be configured for each TRP PDCCH. Here, a list of TRP-specific CORESET and/or a list of search spaces by TRP may be configured.

CORESET beam/beam group configuration: The TRP corresponding to the corresponding CORESET may be identified through the beam or beam group set for each CORESET. For example, when the same TCI state is configured in a plurality of CORESETs, the corresponding CORESETs may be considered to be transmitted through the same TRP or a PDCCH that schedules the PDSCH of the same TRP in the corresponding CORESET may be transmitted.

Search space beam/beam group configuration: A beam or beam group is configured for each search space, and through this, TRP for each search space may be classified. For example, when the same beam/beam group or TCI state is configured in a plurality of search spaces, in the search space, it may be considered that the same TRP transmits the PDCCH, or it may be considered that the PDCCH that schedules the PDSCH of the same TRP is transmitted in the search space.

By dividing the CORESET or search space for each TRP as described above, PDSCH and HARQ-ACK information may be classified for each TRP, and thus, an independent HARQ-ACK codebook for each TRP may be generated and independent PUCCH resources may be used.

Second Embodiment: HARQ-ACK Information Transmission Method for NC-JT Transmission The following embodiment provides a detailed method of transmitting HARQ-ACK information for NC-JT transmission.

Figure 14A:
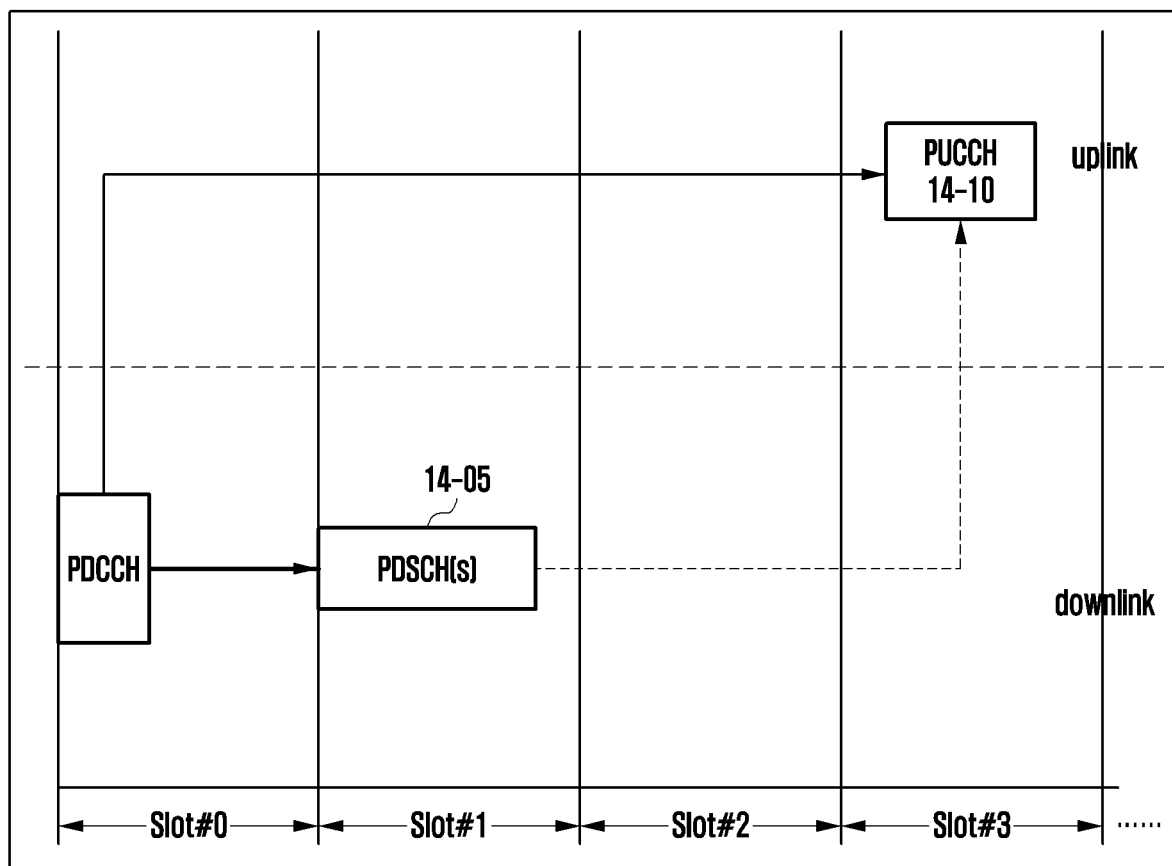
FIG. 14A illustrates a view for HARQ-ACK reporting for non-coherent joint transmission (NC-JT) transmission according to an embodiment.
Figure 14B:
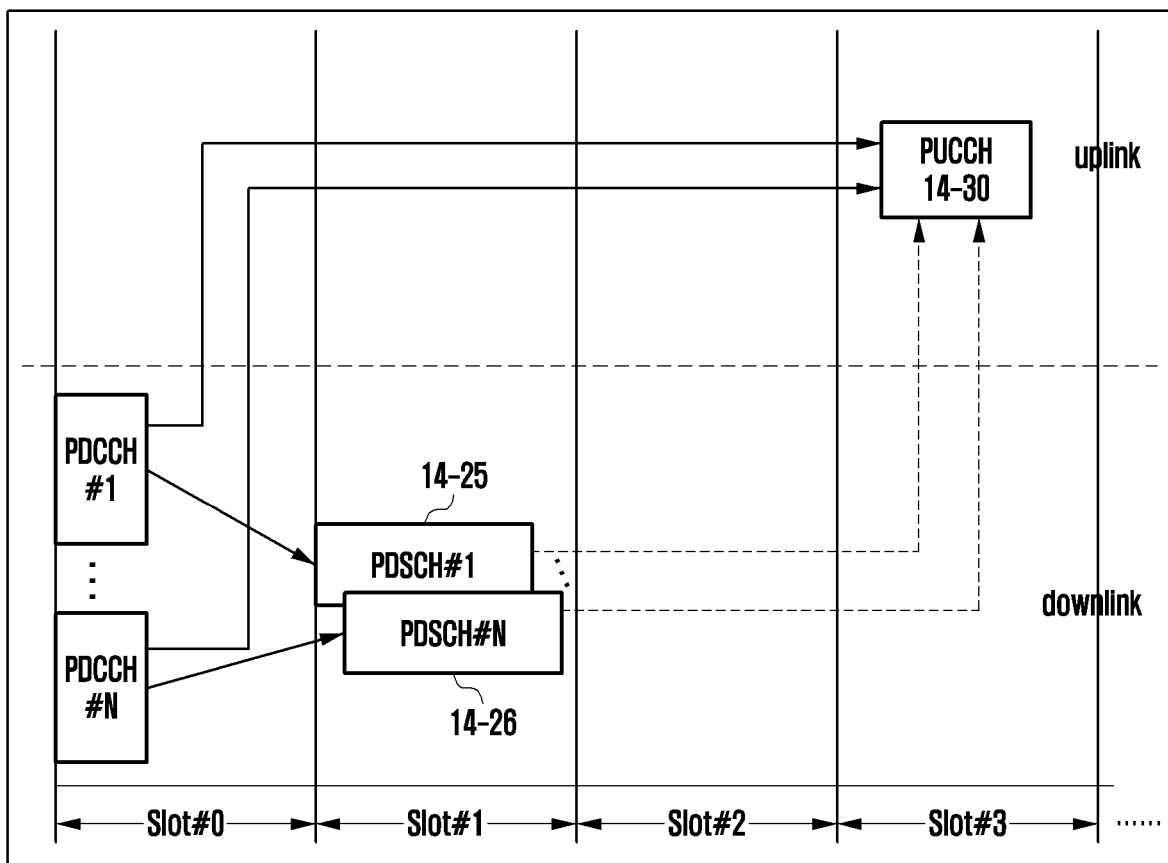
FIG. 14B is a view illustrating HARQ-ACK reporting for non-coherent joint transmission (NC-JT) transmission according to an embodiment.
Figure 14C:
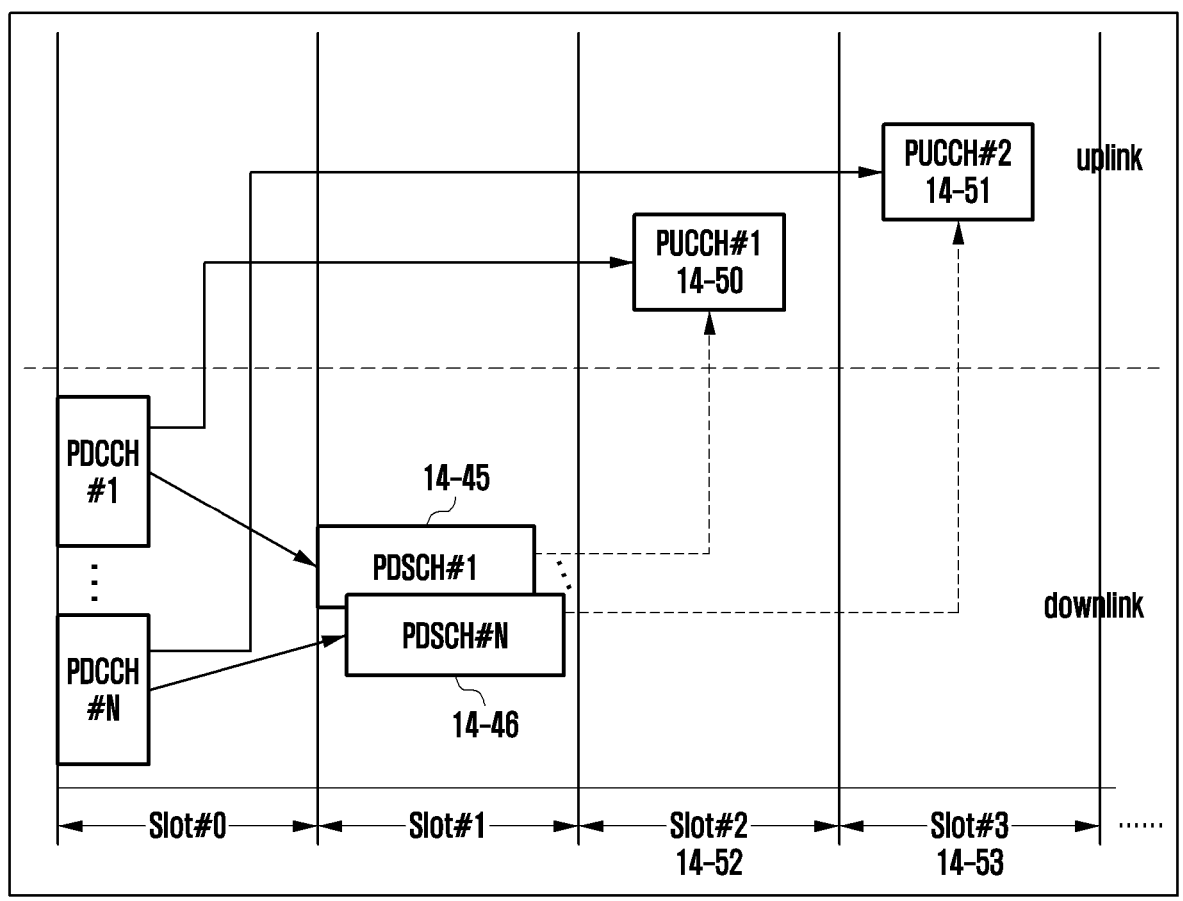
FIG. 14C is a view illustrating HARQ-ACK reporting for non-coherent joint transmission (NC-JT) transmission according to an embodiment.
Figure 14D:
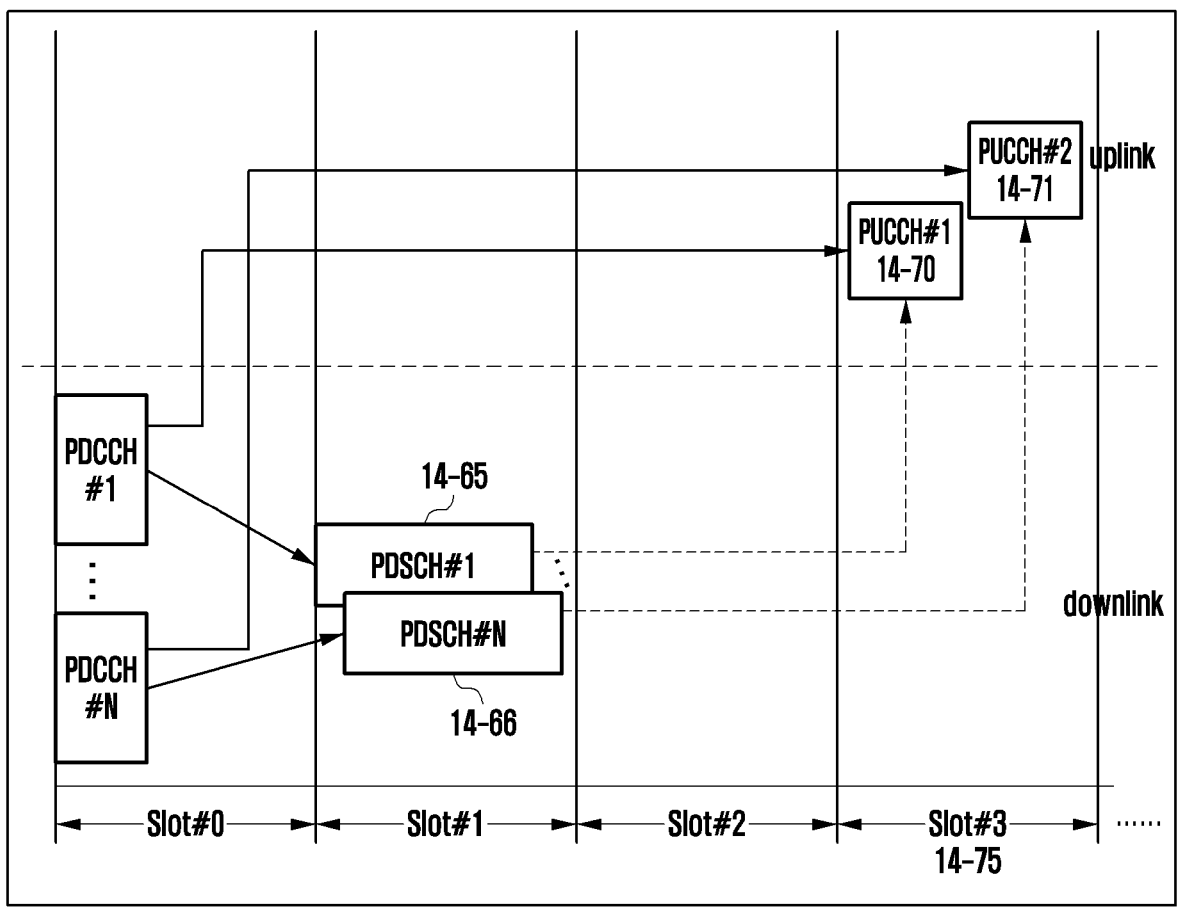
FIG. 14D is a view illustrating HARQ-ACK reporting for non-coherent joint transmission (NC-JT) transmission according to an embodiment.

FIG. 14A illustrates a view for HARQ-ACK reporting for non-coherent joint transmission (NC-JT) transmission according to an embodiment, FIG. 14B is a view illustrating HARQ-ACK reporting for non-coherent joint transmission (NC-JT) transmission according to an embodiment, FIG. 14C is a view illustrating HARQ-ACK reporting for non-coherent joint transmission (NC-JT) transmission according to an embodiment, and FIG. 14D is a view illustrating HARQ-ACK reporting for non-coherent joint transmission (NC-JT) transmission according to an embodiment.

First, FIG. 14A (option #1: HARQ-ACK for single-PDCCH NC-JT) 14-00 illustrates a situation in which HARQ-ACK information for one or a plurality of PDSCHs 14-05 scheduled by TRP is transmitted through one PUCCH resource 14-10 in the case of single-PDCCH-based NC-JT. The PUCCH resource may be indicated through the PRI value and $K_L$ value in DCI described above.

FIG. 14B (option #2) to FIG. 14D (option #4) 14-20, 14-40, 14-60 illustrate a case of a multi-PDCCH based NC-JT. At this time, each option may be classified according to the number of PUCCH resources to transmit HARQ-ACK information corresponding to the PDSCH of each TRP and the position on the time axis of the PUCCH resource.

FIG. 14B (option #2: joint HARQ-ACK) 14-20 illustrates a situation in which HARQ-ACK information corresponding to PDSCHs 14-25 and 14-26 of each TRP is transmitted through one PUCCH resource. All HARQ-ACK information for each TRP may be generated based on a single HARQ-ACK codebook, or HARQ-ACK information for each TRP may be generated based on an individual HARQ-ACK codebook.

When individual HARQ-ACK codebooks for each TRP are used, the TRP may be classified based on at least one of a set of CORESETs having the same upper layer index, a set of CORESETs belonging to the same TCI state, beam or beam group, or a set of search spaces belonging to the same TCI state, beam or beam group as defined in Example 1-1.

FIG. 14C (option #3: inter-slot time division multiplexed (TDMed) separate HARQ-ACK) 14-40 illustrates a situation in which HARQ-ACK information corresponding to PDSCHs 14-45 and 14-46 of each TRP is transmitted through PUCCH resources 14-50 and 14-51 of different slots 14-52 and 14-53. The slot through which the PUCCH resource for each TRP is transmitted may be determined by the above-described $K_1$ value. If the $K_1$ values indicated by multiple PDCCHs indicate the same slot, all of the corresponding PDCCHs may be considered to be scheduled in the same TRP and all HARQ-ACK information corresponding thereto may be transmitted.

FIG. 14D (option #4: intra-slot TDMed separate HARQ-ACK) 14-60 illustrates a situation in which HARQ-ACK information corresponding to PDSCHs 14-65 and 14-66 of each TRP is transmitted in different symbols in the same slot 14-75 through different PUCCH resources 14-70 and 14-71. The slot through which the PUCCH resource for each TRP is transmitted may be determined by the above-described $K_1$ value, and if the $K_1$ values indicated by multiple PDCCHs indicate the same slot, at least one of the following methods determines PUCCH resource selection and transmission symbols Configure PUCCH Resource Group for Each TRP A PUCCH resource group for HARQ-ACK transmission for each TRP may be configured. When the TRP for each CORESET/search space is classified as in Example 1-1, the PUCCH resource for HARQ-ACK transmission by TRP may be selected in the PUCCH resource group for the corresponding TRP. TDM may be expected between PUCCH resources selected from different PUCCH resource groups, that is, it may be expected that the selected PUCCH resources do not overlap in units of symbols. As described above, an individual HARQ-ACK codebook for each TRP may be generated and transmitted to the PUCCH resource selected for each TRP.

Indicate Different PRI for Each TRP

When TRP for each CORESET/search space is classified as in Example 1-1, a PUCCH resource for each TRP may be selected according to PRI. That is, the PUCCH resource selection process in Rel-15 described above may be independently performed for each TRP. At this time, the PRI used to determine PUCCH resource for each TRP may be different. For example, the terminal might not expect that PRI used for PUCCH resource determination for each TRP is indicated with the same value. In addition, TDM may be expected between PUCCH resources corresponding to PRI for each TRP. That is, it may be expected that the selected PUCCH resources do not overlap in a symbol unit. As described above, an individual HARQ-ACK codebook for each TRP may be generated and transmitted to the PUCCH resource selected for each TRP.

Define $K_1$ Value in Sub-Slot Units

The PUCCH resource selection process in Rel-15 is as follows, but a value may be defined in units of sub-slots. For example, a HARQ-ACK codebook for PDSCH/PDCCHs indicated to report HARQ-ACK in the same sub-slot may be generated and transmitted through a PUCCH resource indicated as PRI. The HARQ-ACK codebook generation and PUCCH resource selection process may be irrespective of whether TRP is classified for each CORESET/search space.

When the terminal supports NC-JT reception, one of the options may be configured through the upper layer or may be implicitly selected depending on the situation. For example, one of option 2 and option 3/4 may be configured for a terminal supporting multi-PDCCH-based NC-JT as an upper layer. As another example, depending on whether single-PDCCH-based NC-JT or multi-PDCCH-based NC-JT is supported/configured, option 1 may be selected for the single-PDCCH-based NC-JT and one of options 2/3/4 may be selected for the multi-PDCCH-based NC-JT. As another example, in multi-PDCCH-based NC-JT, an option used may be determined according to selection of PUCCH resource. When PUCCH resources of the same slot are selected from different TRPs, if the corresponding PUCCH resources are different and do not overlap in symbol units, the HARQ-ACK may be transmitted according to option 4, and if the PUCCH resources overlap in symbol units or are identical, the HARQ-ACK may be transmitted according to option 2. When PUCCH resources of different slots are selected from different TRPs, the HARQ-ACK may be transmitted according to option 3. The configuration for the options may be dependent on terminal capability. For example, the base station may receive the terminal capability according to the above-described procedure, and may configure the option, based on this. For example, option 4 configuration may be allowed for a terminal supporting intra-slot TDMed separate HARQ-ACK, and a terminal that does not have the capability may not expect the configuration according to option 4.

Third Embodiment: PUCCH-PUCCH Overlap Processing Method for Multi-PDCCH-Based NC-JT In the multi-PDCCH-based NC-JT, when the intra-slot TDMed separate HARQ-ACK is used, multiple HARQ-ACKs within one slot may be transmitted through PUCCH resources. This is different from Rel-15, which is limited so that only one HARQ-ACK is transmitted in one slot. Therefore, in this embodiment, a specific processing method for a case where overlap between the PUCCH resource for HARQ-ACK and the PUCCH resource for other uplink control information occurs is presented.

In this embodiment, a method for a case where overlap between PUCCH resources in which multi-repetition is not configured occurs will be described first. At this time, the following two cases shown in FIG. 15 will be described.

FIG. 15A illustrates a view for a case where overlap occurs between PUCCH resources according to an embodiment.

Referring to FIG. 15A, case 1 (15-10) shows a case where overlap occurs between PUCCH resources #1 and #2 (15-11 and 15-12) for HARQ-ACK transmission and other PUCCH resources #3 (15-13).

Case 2 (15-20) shows a case where overlap occurs between PUCCH resource #1 (15-21) for HARQ-ACK transmission and other PUCCH resource #3 (15-23).

Depending on the TRP-specific PUCCH resource configuration and the HARQ-ACK transmission method described in Example 2, some of the above cases might not occur.

For example, in a situation where joint HARQ-ACK to inter-slot TDMed separate HARQ-ACK is applied, only Case 2 may occur.

On the other hand, in the situation where intra-slot TDMed separate HARQ-ACK is applied, both Case 1 and Case 2 may occur.

As another example, some of the above cases might not occur depending on whether a PUCCH resource group for each TRP described in Example 2 is configured. If all PUCCH resources are classified according to the TRP-specific PUCCH resource group, only Case 2 may occur. On the other hand, in a situation where the PUCCH resource group for each TRP is not configured or only PUCCH resources for HARQ-ACK transmission are classified according to the PUCCH resource group for each TRP, both Case 1 and Case 2 may occur.

A method of processing PUCCH according to the overlap of PUCCH resources according to FIG. 15A will be described in FIG. 15B.

Figure 15B:
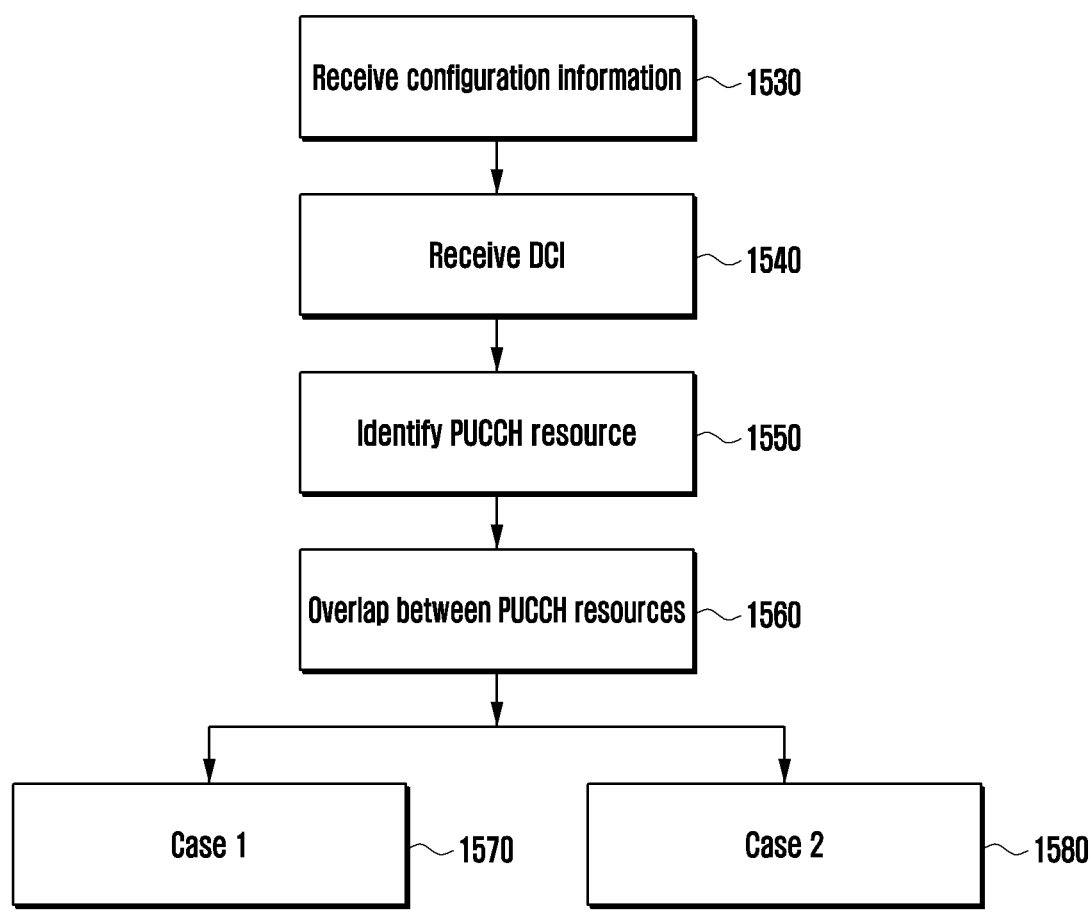
FIG. 15B illustrates a view a method of transmitting PUCCH when overlap occurs between PUCCH resources according to an embodiment.

FIG. 15B illustrates a view for a method of transmitting PUCCH when overlap occurs between PUCCH resources according to an embodiment.

Referring to FIG. 15B, the terminal may receive configuration information related to PUCCH resources in operation 1530. The configuration information may be received through higher layer signaling.

At this time, the configuration information may include one or more PUCCH resource sets as described above, and one or more PUCCH resources may be included in one PUCCH resource set. For details, refer to the above.

In addition, the terminal may receive DCI including resource allocation information in operation 1540. The resource allocation information may include at least one of information on resources for receiving downlink data and information on resources for transmitting uplink control information.

At this time, the information on the resource for transmitting the uplink control information may include an indicator indicating the PUCCH resource received through the configuration information. In addition, it may include information K1 about the slot location for transmitting the PUCCH resource. For details, refer to the above.

In addition, when the terminal supports NC-JT reception, the terminal may receive DCI for each TRP. At this time, as a method of receiving the DCI, various methods proposed in FIG. 13 may be used. For details, refer to the above.

In addition, the terminal may identify the PUCCH resource to transmit the uplink control information in step 1550. The terminal may identify the PUCCH resource, based on at least one of the configuration information or DCI.

When the NC-JT is configured in the terminal, the terminal may transmit UCI for a plurality of TRPs and may identify a plurality of PUCCH resources. At this time, when the identified plurality of PUCCH resources are located in one slot, PUCCH resource groups may be configured for each TRP as described above, different PRIs may be indicated for each TRP, or K1 values included in DCI may be defined in units of sub-slots to be allocated to other symbols within one slot. For details, refer to the above.

On the other hand, the terminal may transmit the capability information on whether or not to transmit the multiplexed control information for HARQ-ACK transmission through the TDM PUCCH resource in one slot to the base station, and the base station may configure a plurality of PUCCH resources for HARQ-ACK transmission in one slot as described above only when the terminal has the capability. The details related to the capability transmission/reception method and transmission/reception time point are the same as described above, and will be omitted below.

When two or more PUCCH resources (PUCCH #1, PUCCH #2) are located in one slot, at the same time, PUCCH resources (PUCCH #3) for different UCI transmissions may be allocated to the same slot. At this time, other uplink information may include SR, CSI, etc., or may include HARQ-ACK information for other TRP. Meanwhile, for the convenience of description, PUCCH #1 and PUCCH #2 that are TDM on a time axis among PUCCH resources illustrated in FIG. 15A may be referred to as a first PUCCH and PUCCH #3 as a second PUCCH. Alternatively, PUCCH #1, PUCCH #2, and PUCCH #3 may be referred to as a first PUCCH, a second PUCCH, and a third PUCCH, respectively.

Therefore, the terminal may identify whether an overlap has occurred between PUCCH resources in operation 1560. At this time, the terminal may identify whether an overlap has occurred between the PUCCH resource (e.g., TDM PUCCH resource in the slot) identified in operation 1550 and another PUCCH resource. At this time, another PUCCH resource may mean a resource for transmitting different UCIs (e.g., UCIs except HARQ-ACK). As described above, the PUCCH resources (PUCCH #1, PUCCH #2) identified in operation 1550 may be referred to as a first PUCCH and another PUCCH resource (PUCCH #3) as a second PUCCH.

At this time, overlap between PUCCH resources may mean an overlap in a unit of symbols. Therefore, operation 1560 may refer to an operation of identifying whether there is a PUCCH resource overlapping with the TDM PUCCH resource in the slot as shown in FIG. 15A.

As a result of identification, if an overlap does not occur, the terminal may transmit UCI through each PUCCH resource. For example, if the PUCCH resource corresponding to each of the TRP 1 and TRP 2 is included in one slot and intra-slot TDMed separate HARQ-ACK is configured, the terminal may multiplex and transmit HARQ-ACK information for each TRP to PUCCH resources for each TRP. At this time, the PUCCH resource for each TRP may be determined according to the PUCCH resource selection process in the above-described intra-slot TDMed separate HARQ-ACK. In addition, the other uplink information may also be transmitted through the allocated PUCCH resource.

On the other hand, when an overlap occurs, case 1 and case 2 described in FIG. 15A may occur.

Accordingly, when it is determined that the case corresponds to case 1 in operation 1570, the terminal may perform an operation accordingly.

On the other hand, if it is determined that the case corresponds to case 2 in operation 1580, the terminal may perform an operation accordingly.

Details of the operation according to case 1 and case 2 will be described below.

Returning to the description of FIG. 15A, in case 1, it may be determined whether the Rel-15-based PUCCH overlapping processing method is applicable according to the format of each PUCCH resource and transmission of SR or CSI through PUCCH resource #3. If SR is transmitted through PUCCH resource #3, the following problem may occur when applying the Rel-15-based PUCCH multiplexing method.

It is assumed that one of the PUCCH resources for HARQ-ACK transmission is PUCCH format 1 and the PUCCH resource #3 for SR transmission is PUCCH format 1. Hereinafter, for the convenience of description, a PUCCH resource for HARQ-ACK transmission corresponding to PUCCH format 1 is referred to as PUCCH resource #1.

In this case, if the SR is positive at this time, HARQ-ACK for PUCCH resource #1 should be transmitted through PUCCH resource #3. However, since PUCCH resource #3 is not TDM with PUCCH resource #2, it is necessary to change the Rel-15-based processing method. Therefore, at least one of the following methods may be considered to solve the above problem.

Method 1-1: When intra-slot TDMed separate HARQ-ACK is applied, the multiplexing rule is changed to drop the SR when overlapping between PUCCH resource (PUCCH format 1) for HARQ-ACK transmission and PUCCH resource (PUCCH format 1) for SR transmission occurs.

Method 1-2: When intra-slot TDMed separate HARQ-ACK is applied, PUCCH format 1 is not configured for HARQ-ACK transmission.

Method 1-3: When intra-slot TDMed separate HARQ-ACK is applied, PUCCH format 1 is not configured for SR transmission.

Method 1-4: When intra-slot TDMed separate HARQ-ACK is applied, the terminal does not expect an overlap between PUCCH resource (PUCCH format 1) for HARQ-ACK transmission and (PUCCH format 1) for SR transmission.

On the other hand, when the Rel-15-based PUCCH multiplexing method is applied, the following problems may occur. It is assumed that the PUCCH resource for HARQ-ACK transmission is not PUCCH format 1. In this case, the same SR information is multiplexed and transmitted in both PUCCH resources for HARQ-ACK transmission. This may be an undesirable situation in the network. For example, a plurality of TRPs receiving HARQ-ACK may proceed with all of the response procedures for the SR request, and thus unnecessary control information transmission and reception and uplink resource allocation may occur. Therefore, there is a need for a method of selecting one of PUCCH resources #1 and #2 and allowing SRs to be multiplexed only for the resource.

Therefore, at least one of the following methods may be considered to solve the above problem. Specifically, an SR is multiplexed and transmitted to two PUCCH resources for HARQ-ACK transmission, or an SR may be multiplexed and transmitted to any one of two PUCCH resources, and the following method may be considered as a method of selecting one PUCCH resource.

Method 2-1: Selection according to the index or order. For example, a PUCCH resource transmitted first on a time axis may be selected, or a PUCCH resource corresponding to a low PRI or a PUCCH resource corresponding to a low PUCCH resource group may be selected.

Method 2-2: Selection according to maximum payload. For example, a PUCCH resource having a large maximum payload that may be transmitted may be preferentially selected.

Method 2-3: Selection according to PUCCH format. A long PUCCH with good coverage may be selected in preference to a short PUCCH. In addition, PUCCH format 2/3/4 capable of transmitting a payload exceeding 2 bits may be selected in preference to PUCCH 0/1.

Method 2-4: Selection according to TRP. When SR information needs to be transmitted to a specific TRP, a PUCCH resource corresponding to the same TRP may be selected. For example, a PUCCH resource for HARQ-ACK with the same spatial relation info as PUCCH resource #3 may be selected. Alternatively, the PUCCH resource in the PUCCH resource group belonging to the TRP corresponding to the SR may be selected. Alternatively, if the TRP index is configured in the CORESET where the DCI that schedules the PDSCH and HARQ-ACK PUCCH transmission is transmitted, a TRP index corresponding thereto may be configured for each SR ID, or a TRP index to which all SRs are transmitted may be assumed to be a specific value, for example, TRP index 0. Alternatively, a TRP index may be configured in a PUCCH resource to transmit SR, or a specific value, for example, TRP index 0 may be assumed. At this time, the PUCCH resource corresponding to the HARQ-ACK having the same value as the TRP index associated with the above-described SR ID or PUCCH for SR transmission may be selected. Alternatively, the TRP index may be expressed as a parameter set for PUCCH power control. As an example, the TRP index may be expressed by one of the following values in the following PUCCH-PowerControl IE configured as RRC or a combination thereof.

```
PUCCH-PowerControl ::=         SEQUENCE {
  deltaF-PUCCH-f0              INTEGER (-16..15)
OPTIONAL, -- Need R
  deltaF-PUCCH-f1              INTEGER (-16..15)
OPTIONAL, -- Need R
  deltaF-PUCCH-f2              INTEGER (-16..15)
OPTIONAL, -- Need R
  deltaF-PUCCH-f3              INTEGER (-16..15)
OPTIONAL, -- Need R
  deltaF-PUCCH-f4              INTEGER (-16..15)
OPTIONAL, -- Need R
  p0-Set                       SEQUENCE (SIZE
(1..maxNrofPUCCH-P0-PerSet)) OF
P0-PUCCH                                 OPTIONAL,
-- Need M
  pathlossReferenceRSs         SEQUENCE (SIZE
(1..maxNrofPUCCH-PathlossReferenceRSs)) OF
PUCCH-PathlossReferenceRS
OPTIONAL, -- Need M
  twoPUCCH-PC-AdjustmentStates  ENUMERATED
{twoStates}
OPTIONAL, -- Need S
  ...
}
P0-PUCCH ::=                   SEQUENCE {
  p0-PUCCH-Id                  P0-PUCCH-Id,
  p0-PUCCH-Value               INTEGER (-16..15)
}
P0-PUCCH-Id ::=                INTEGER (1..8)
PUCCH-PathlossReferenceRS ::=  SEQUENCE {
  pucch-PathlossReferenceRS-Id    PUCCH-
PathlossReferenceRS-Id,
  referenceSignal              CHOICE {
    ssb-Index                    SSB-Index,
    csi-RS-Index                 NZP-CSI-RS-
ResourceId
}
```

In more detail, the TRP index may correspond to the p0-PUCCH-Id value configured for PUCCH power control. For example, if p-PUCCH-Id has a value between 1 and 4, p0-PUCCH-Id may correspond to TRP index 0, and when p0-PUCCH-Id has a value between 5 and 8, p0-PUCCH-Id may correspond to TRP index 1. The mapping between the range of the p0-PUCCH-sd and the TRP index may be changed. Alternatively, the TRP index may correspond to pathlossReferenceRS configured for PUCCH power control. Alternatively, the TRP index may correspond to a power control adjustment state index configured for PUCCH power control. The power control adjustment state index is an indicator indicating the power control state of the PUCCH resource, and may also be expressed by expressions such as closed loop power control index and TRP/panel specific closed loop power control index. When the twoPUCCH-PC-AdjustmentStates value of the RRC parameter is configured as twoStates, the power control adjustment state index may have one of two values, for example, i0 or i1, where i0 may correspond to TRP index 0, and i1 may correspond to TRP index 1. The above-mentioned i0 or i1 may be indicated in the form of closedLoopIndex parameter value in spatial relation info that is activated for each PUCCH/PUCCH group as follows.

```
PUCCH-SpatialRelationInfo ::=    SEQUENCE {
    pucch-SpatialRelationInfoId      PUCCH-SpatialRelationInfoId,
    servingCellId                    ServCellIndex
OPTIONAL,    -- Need S
    referenceSignal                  CHOICE {
        ssb-Index                        SSB-Index,
        csi-RS-Index                     NZP-CSI-RS-
ResourceId,
        srs                              SEQUENCE {
                                             resource
SRS-ResourceId,
                                             uplinkBWP
BWP-Id
                                         }
    },
    pucch-PathlossReferenceRS-Id     PUCCH-
PathlossReferenceRS-Id,
    p0-PUCCH-Id                      P0-PUCCH-Id,
    closedLoopIndex                  ENUMERATED { i0, i1 }
}
```

According to the above description, the resource with the closedLoopIndex parameter included in spatial relation info associated with the PUCCH resources configured as i0 may be regarded as a PUCCH resource corresponding to TRP index 0, and the resource with the closedLoopIndex parameter configured as i1 may be regarded as a PUCCH resource corresponding to TRP index 1.

On the other hand, the power control adjustment state index may be extended to be able to configure two per TRP. Therefore, when the number of TRPs is supported up to 2, the total configurable power control adjustment state index may be expanded up to 4. For example, as the value of the twoPUCCH-PC-AdjustmentStates parameter, for example, FourStates may be configured or new parameters such as the fourPUCCH-PC-AdjustmentStates parameter may be configured. At this time, when the closedLoopIndex parameter included in the spatial relation info is configured as i0 and i1, the closedLoopIndex parameter may be considered as TRP index 0, and when the closedLoopIndex parameter is configured as i2, 3, or a new parameter in the spatial relation info, for example, closedLoopIndexNew parameter is additionally configured, the closedLoopIndex parameter may be considered as TRP index 1. In addition, as described above, a connection relationship between PUCCH resource and TRP index may be established.

If the PUCCH resource for the TRP to which the SR to be transmitted is not selected (e.g., due to the absence of information such as spatial relation info), the terminal might not multiplex SR and HARQ-ACK. In this case, according to the order of HARQ-ACK>SR>CSI, PUCCH resource or UCI with a lower priority may be dropped.

Alternatively, for simplification of the terminal operation, the base station may appropriately schedule PUCCH resources or instruct multiplexing configuration so that the above-described case does not occur.

Next, in case 1, if CSI is transmitted through PUCCH resource #3, it may be determined whether to multiplex between HARQ-ACK and CSI by configuring a higher layer. If the multiplexing is configured, the following problems may occur when applying the Rel-15-based PUCCH multiplexing method.

The same CSI information may be multiplexed and transmitted to both PUCCH resources for HARQ-ACK transmission, which may result in a waste of uplink transmission resources and transmission power due to duplicate CSI payload transmission. Therefore, there is a need for a method of selecting one of PUCCH resources #1 and #2 and allowing CSI to be multiplexed only for the resource.

In order to solve the above problem, at least one of the following methods may be considered.

Method 3-1: Selection according to index or order. For example, a PUCCH resource transmitted first on a time axis may be selected, or a PUCCH resource corresponding to a low PRI or a PUCCH resource corresponding to a low PUCCH resource group may be selected.

Method 3-2: Selection according to maximum payload. A PUCCH resource having a large maximum payload that may be transmitted may be preferentially selected.

Method 3-3: Selection according to PUCCH format. A long PUCCH with good coverage may be selected in preference to a short PUCCH. In addition, when a subband CSI is reported, PUCCH format 3/4 capable of subband CSI transmission may be selected in preference to PUCCH format 2 only capable of wideband CSI transmission.

Method 3-4: Selection according to TRP. When only the channel state for a specific TRP is included in the CSI information, it may be desirable to multiplex CSI information only on PUCCH resources to be transmitted to the corresponding TRP. To this end, for example, PUCCH resource for HARQ-ACK with the same spatial relation info as PUCCH resource #3 may be selected. Alternatively, the PUCCH resource in the PUCCH resource group belonging to the TRP corresponding to the CSI information may be selected. Alternatively, if the TRP index is configured in the CORESET where the DCI that has scheduled the PDSCH and HARQ-ACK PUCCH transmission is transmitted, the TRP index may be configured in the CSI report/resource configuration or the TRP index in the PUCCH resource for CSI report transmission. At this time, a PUCCH resource corresponding to HARQ-ACK having the same value as the TRP index associated with the aforementioned CSI PUCCH may be selected. If the PUCCH resource for the TRP to which the CSI is to be transmitted is not selected, the terminal may not multiplex the CSI with other UCIs. In this case, according to the order of HARQ-ACK>SR>CSI, a PUCCH resource or UCI with a lower priority may be dropped. When multiple CSIs overlap, priority between CSIs may be applied. Alternatively, when the TRP index is configured in the CSI report/resource configuration or the TRP index is configured in the PUCCH resource for transmitting the CSI report, a plurality of CSIs having different TRP indexes may overlap. At this time, if the CSI is configured to be multiplexed, for example, when the above-described multi-CSI-PUCCH-ResourceList is configured, the TRP index of the PUCCH resource to transmit the multiplexed CSI may be unclear. The above situation can be prevented by appropriately scheduling PUCCH resources for CSI report transmission in the network. Alternatively, if CSI reports/resources with different TRP indexes are configured or activated/triggered, multi-CSI-PUCCH-ResourceList might not be expected to be configured. Alternatively, a TRP index may be configured for each PUCCH resource corresponding to multi-CSI-PUCCH-ResourceList, or a specific TRP index value, for example, TRP index 0 may be assumed. Alternatively, in this case, even if multi-CSI-PUCCH-ResourceList is configured, multiplexing between overlapping CSI reports is not performed and dropping according to priority may be performed. The priority at this time may follow the Rel-15-based CSI report priority.

Alternatively, the TRP index may be expressed as a parameter set for PUCCH power control. As an example, the TRP index may be expressed by one of the following values in the following PUCCH-PowerControl IE configured as RRC or a combination thereof.

| | |
|---|---|
| PUCCH-PowerControl ::= | SEQUENCE { |
| deltaF-PUCCH-f0 | INTEGER (−16..15) |
| OPTIONAL, -- Need R | |
| deltaF-PUCCH-f1 | INTEGER (−16..15) |
| OPTIONAL, -- Need R | |
| deltaF-PUCCH-f2 | INTEGER (−16..15) |
| OPTIONAL, -- Need R | |
| deltaF-PUCCH-f3 | INTEGER (−16..15) |
| OPTIONAL, -- Need R | |
| deltaF-PUCCH-f4 | INTEGER (−16..15) |
| OPTIONAL, -- Need R | |
| p0-Set | SEQUENCE (SIZE (1..maxNrofPUCCH-P0-PerSet)) OF P0-PUCCH    OPTIONAL, -- Need M |
| pathlossReferenceRSs | SEQUENCE (SIZE (1..maxNrofPUCCH-PathlossReferenceRSs)) OF PUCCH-PathlossReferenceRS    OPTIONAL, -- Need M |
| twoPUCCH-PC-AdjustmentStates    {twoStates} OPTIONAL, -- Need S | ENUMERATED |
| ... | |
| } | |
| P0-PUCCH ::= | SEQUENCE { |
| p0-PUCCH-Id | P0-PUCCH-Id, |
| p0-PUCCH-Value | INTEGER (−16..15) |
| } | |
| P0-PUCCH-Id ::= | INTEGER (1..8) |
| PUCCH-PathlossReferenceRS ::= | SEQUENCE { |
| pucch-PathlossReferenceRS-Id | PUCCH-PathlossReferenceRS-Id, |
| referenceSignal | CHOICE { |
| ssb-Index | SSB-Index, |
| csi-RS-Index | NZP-CSI-RS-ResourceId |
| } | |
| } | |

In more detail, the TRP index may correspond to the p0-PUCCH-Id value configured for PUCCH power control. For example, if p0-PUCCH-Id has a value between 1 and 4, p0-PUCCH-Id may correspond to TRP index 0, and when p0-PUCCH-Id has a value between 5 and 8, p0-PUCCH-Id may correspond to TRP index 1. The mapping between the range of the p0-PUCCH-Id and the TRP index may be changed. Alternatively, the TRP index may correspond to pathlossReferenceRS configured for PUCCH power control. Alternatively, the TRP index may correspond to a power control adjustment state index configured for PUCCH power control. The power control adjustment state index is an indicator indicating the power control state of the PUCCH resource, and may also be expressed by expressions such as closed loop power control index and TRP/panel specific closed loop power control index. The power control adjustment state index may have one of two values, for example, i0 or i1, when the twoPUCCH-PC-AdjustmentStates value of the RRC parameter is configured as twoStates, where i0 may correspond to TRP index 0, and i1 may correspond to TRP index 1. The above-mentioned i0 or i1 may be indicated in the form of a closedLoopIndex parameter value in spatial relation info that is activated for each PUCCH/PUCCH group as follows.

| | |
|---|---|
| PUCCH-SpatialRelationInfo ::= | SEQUENCE { |
| pucch-SpatialRelationInfoId | PUCCH-SpatialRelationInfoId, |
| servingCellId    OPTIONAL, -- Need S | ServCellIndex |
| referenceSignal | CHOICE { |
| ssb-Index | SSB-Index, |
| csi-RS-Index | NZP-CSI-RS-ResourceId, |
| srs | SEQUENCE { |
| | resource |
| SRS-ResourceId, | |
| | uplinkBWP |
| BWP-Id | |
| | } |
| }, | |
| pucch-PathlossReferenceRS-Id | PUCCH-PathlossReferenceRS-Id, |
| p0-PUCCH-Id | P0-PUCCH-Id, |
| closedLoopIndex | ENUMERATED { i0, i1 } |
| } | |

According to the above description, among the PUCCH resources, the resource with the closedLoopIndex parameter related to spatial relation info configured as i0 may be considered as the PUCCH resource corresponding to TRP index 0, and the resource with the closedLoopIndex parameter configured as i1 may be considered as the PUCCH resource corresponding to TRP index 1.

On the other hand, the power control adjustment state index may be extended to be able to configure two per TRP. Therefore, when the number of TRPs supported is a maximum of 2, the total configurable power control adjustment state index may be expanded to 4. For example, as the value of the twoPUCCH-PC-AdjustmentStates parameter, for example, FourStates may be configured or new parameters such as the fourPUCCH-PC-AdjustmentStates parameter may be configured. At this time, when the closedLoopIndex parameter related to spatial relation info is configured as i0 and i1, the closedLoopIndex parameter may be considered as TRP index 0, and the closedLoopIndex parameter is configured as i2 and i3 or a new parameter in the spatial relation info, for example, the closedLoopIndexNew parameter is additionally configured, the closedLoopIndex parameter may be considered as TRP index 1. In addition, as described above, a connection relationship between PUCCH resource and TRP index can be established.

However, if CSI is transmitted through PUCCH resource #3, and multiplexing between HARQ-ACK and CSI is configured, a method of multiplexing and transmitting the same CSI information to both PUCCH resources may be used.

Alternatively, for simplification of the terminal operation, the base station may appropriately schedule PUCCH resources or instruct multiplexing configuration so that the above-described case does not occur. For example, when the above-described simultaneous-HARQ-ACK-CSI is configured, the terminal might not expect a situation in which CSI is transmitted through PUCCH resource #3 in Case 1.

In case 2, beams between overlapped PUCCH resources may be different. This can be interpreted as meaning that the TRP to which the UCI is transmitted may be different through the overlapped PUCCH resource. If multiplexing between corresponding PUCCH resources is configured, a problem occurs in that some of the multiplexed UCIs may be transmitted to an unintended TRP. To solve this, at least one of the following methods may be considered.

Method 4-1: This method follows the beam applied to the PUCCH corresponding to the high priority UCI among the multiplexed UCIs. At least the high priority UCI may be transmitted to the desired TRP therethrough. The UCI priority may be HARQ-ACK>SR>CSI. When multiple CSIs overlap, priority between CSIs may be applied.

Method 4-2: When the beams between the overlapped PUCCHs are different, multiplexing might not be performed, which may take priority over the upper layer configuration. Accordingly, only one of the overlapped PUCCHs may be selected and transmitted, and the rest may be dropped, and the PUCCH selection may follow the priority between UCIs contained in the overlapped PUCCHs. The UCI priority may be HARQ-ACK>SR>CSI. When multiple CSIs overlap, priority between CSIs may be applied. The above-described PUCCH beam may be indicated through PUCCH spatial relation info. Alternatively, the above-described PUCCH beam may be replaced with a TRP to transmit PUCCH, where TRP may be represented by PUCCH spatial relation info, PUCCH resource group, TRP index, and the like. For example, when a TRP index is configured in a CORESET where DCIs scheduled for PDSCH and HARQ-ACK PUCCH transmission are transmitted, a TRP index may be configured in a CSI report/resource configuration or a TRP index in a PUCCH resource for CSI report transmission. At this time, the PUCCH resource corresponding to the CSI having the same value as the TRP index associated with the aforementioned HARQ-ACK PUCCH may be selected.

Alternatively, the TRP index, which may be configured in a CSI report or PUCCH resource for SR or HARQ-ACK transmission, may be expressed as a parameter configured for PUCCH power control. As an example, the TRP index may be expressed as one of the following values in the following PUCCH-PowerControl IE configured as RRC or a combination thereof.

| | |
|---|---|
| PUCCH-PowerControl ::= | SEQUENCE { |
| deltaF-PUCCH-f0 | INTEGER (−16..15) |
| OPTIONAL, -- Need R | |
| deltaF-PUCCH-f1 | INTEGER (−16..15) |
| OPTIONAL, -- Need R | |
| deltaF-PUCCH-f2 | INTEGER (−16..15) |
| OPTIONAL, -- Need R | |
| deltaF-PUCCH-f3 | INTEGER (−16..15) |
| OPTIONAL, -- Need R | |
| deltaF-PUCCH-f4 | INTEGER (−16..15) |

-continued

| | |
|---|---|
| OPTIONAL, -- Need R | |
| p0-Set | SEQUENCE (SIZE (1..maxNrofPUCCH-P0-PerSet)) OF P0-PUCCH |
| | OPTIONAL, |
| -- Need M | |
| pathlossReferenceRSs | SEQUENCE (SIZE (1..maxNrofPUCCH-PathlossReferenceRSs)) OF PUCCH-PathlossReferenceRS |
| OPTIONAL, -- Need M | |
| twoPUCCH-PC-AdjustmentStates | ENUMERATED {twoStates} |
| OPTIONAL, -- Need S | |
| ... | |
| } | |
| P0-PUCCH ::= | SEQUENCE { |
| p0-PUCCH-Id | P0-PUCCH-Id, |
| p0-PUCCH-Value | INTEGER (−16..15) |
| } | |
| P0-PUCCH-Id ::= | INTEGER (1..8) |
| PUCCH-PathlossReferenceRS ::= | SEQUENCE { |
| pucch-PathlossReferenceRS-Id | PUCCH-PathlossReferenceRS-Id, |
| referenceSignal | CHOICE { |
| ssb-Index | SSB-Index, |
| csi-RS-Index | NZP-CSI-RS-ResourceId |
| } | |
| } | |

In more detail, the TRP index may correspond to the p0-PUCCH-Id value configured for PUCCH power control. For example, if p0-PUCCH-Id has a value between 1 and 4, p0-PUCCH-Id may correspond to TRP index 0, and when p0-PUCCH-Id has a value between 5 and 8, p0-PUCCH-Sd may correspond to TRP index 1. The mapping between the p-PUCCH-Id range and the TRP index may be changed. Alternatively, the TRP index may correspond to pathlossReferenceRS configured for PUCCH power control. Alternatively, the TRP index may correspond to a power control adjustment state index configured for PUCCH power control. The power control adjustment state index is an indicator indicating the power control state of the PUCCH resource, and may also be referred to in an expression such as closed loop power control index or TRP/panel specific closed loop power control index. The power control adjustment state index may have one of two values, for example, i0 or i1, when the twoPUCCH-PC-AdjustmentStates value of the RRC parameter is configured as twoStates, where i0 is TRP index 0 and i1 may correspond to TRP index 1. The above-mentioned i0 or i1 may be indicated in the form of closedLoopIndex parameter value in spatial relation info activated by PUCCH/PUCCH group as follows.

| | |
|---|---|
| PUCCH-SpatialRelationInfo ::= | SEQUENCE { |
| pucch-SpatialRelationInfoId | PUCCH-SpatialRelationInfoId, |
| servingCellId | ServCellIndex |
| OPTIONAL, -- Need S | |
| referenceSignal | CHOICE { |
| ssb-Index | SSB-Index, |
| csi-RS-Index | NZP-CSI-RS-ResourceId, |
| srs | SEQUENCE { |
| | resource |
| SRS-ResourceId, | |
| | uplinkBWP |
| BWP-Id | |
| | } |
| }, | |

```
    pucch-PathlossReferenceRS-Id        PUCCH-
PathlossReferenceRS-Id,
    p0-PUCCH-Id                         P0-PUCCH-Id,
    closedLoopIndex                     ENUMERATED { i0, i1 }
}
```

According to the above description, among the PUCCH resources, a resource with closedLoopIndex parameter related to spatial relation info configured as i0 may be considered as a PUCCH resource corresponding to TRP index 0, and a resource with closedLoopIndex parameter configured as i1 may be considered as PUCCH resource corresponding to TRP index 1. On the other hand, the power control adjustment state index may be extended to be able to configure two per TRP. Therefore, when the number of TRPs supported is a maximum of 2, the total configurable power control adjustment state index may be expanded to 4. For example, as the value of the twoPUCCH-PC-Adjustment-States parameter, for example, FourStates may be configured or new parameters such as the fourPUCCH-PC-AdjustmentStates parameter may be configured. At this time, when the closedLoopIndex parameter related to the spatial relation info is configured as i0 and i1, the closedLoopIndex parameter may be considered as the TRP index 0, and when the closedLoopIndex parameter is configured as i2 and i3, or a new parameter in the spatial relation info, for example, closedLoopIndexNew parameter, the closedLoopIndex parameter may be considered as TRP index 1. In addition, as described above, a connection relationship between PUCCH resource and TRP index can be established.

If the TRP index is configured in the CSI report/resource configuration or the TRP index is configured in the PUCCH resource for transmission of the CSI report, a plurality of CSIs having different TRP indexes may overlap. At this time, if the CSI is configured to be multiplexed, for example, when the above-described multi-CSI-PUCCH-ResourceList is configured, the TRP index of the PUCCH resource to transmit the multiplexed CSI may be unclear. The above situation can be prevented by appropriately scheduling PUCCH resources for CSI report transmission in the network. Alternatively, if CSI reports/resources with different TRP indexes are configured or activated/triggered, multi-CSI-PUCCH-ResourceList might not be expected to be configured. Alternatively, a TRP index may be configured for each PUCCH resource corresponding to multi-CSI-PUCCH-ResourceList, or a specific TRP index value, for example, TRP index 0 may be assumed. Alternatively, in this case, even if multi-CSI-PUCCH-ResourceList is configured, multiplexing between overlapping CSI reports is not performed, and dropping according to priority may be performed. The priority at this time may follow the Rel-15-based CSI report priority.

Method 4-3: In order to simplify the terminal operation, the base station may appropriately schedule PUCCH resources so that the overlapped PUCCH beam/TRP does not occur in different cases.

At this time, the TRP or TRP index may be classified by the method described in Method 4-2. For example, the TRP index may be configured for each PUCCH resource. Meanwhile, a TRP index might not be configured in the PUCCH resource for HARQ-ACK transmission or might not be used even if a TRP index is configured. Instead, the TRP index configured in the CORESET where the DCI that scheduled the PUCCH transmission is transmitted may be actually used. In addition, the terminal might not expect that the TRP index configured for each PUCCH resource is different from the TRP index value configured in the CORESET where the DCI that schedules the PUCCH transmission is transmitted.

For example, the TRP index configured for each PUCCH resource may be expressed in a parameter configured for PUCCH power control. As an example, the TRP index may be expressed in one of the following values in the following PUCCH-PowerControl IE configured as RRC or a combination thereof.

```
PUCCH-PowerControl ::=              SEQUENCE {
    deltaF-PUCCH-f0                 INTEGER (-16..15)
OPTIONAL, -- Need R
    deltaF-PUCCH-f1                 INTEGER (-16..15)
OPTIONAL, -- Need R
    deltaF-PUCCH-f2                 INTEGER (-16..15)
OPTIONAL, -- Need R
    deltaF-PUCCH-f3                 INTEGER (-16..15)
OPTIONAL, -- Need R
    deltaF-PUCCH-f4                 INTEGER (-16..15)
OPTIONAL, -- Need R
    p0-Set                          SEQUENCE (SIZE
(1..maxNrofPUCCH-P0-PerSet)) OF
P0-PUCCH                            OPTIONAL,
-- Need M
    pathlossReferenceRSs            SEQUENCE (SIZE
(1..maxNrofPUCCH-PathlossReferenceRSs)) OF
PUCCH-PathlossReferenceRS
OPTIONAL, -- Need M
    twoPUCCH-PC-AdjustmentStates    ENUMERATED
{twoStates}
OPTIONAL, -- Need S
    ...
}
P0-PUCCH ::=                        SEQUENCE {
    p0-PUCCH-Id                     P0-PUCCH-Id,
    p0-PUCCH-Value                  INTEGER (-16..15)
}
P0-PUCCH-Id ::=                     INTEGER (1..8)
PUCCH-PathlossReferenceRS ::=       SEQUENCE {
    pucch-PathlossReferenceRS-Id    PUCCH-
PathlossReferenceRS-Id,
    referenceSignal                 CHOICE {
        ssb-Index                   SSB-Index,
        csi-RS-Index                NZP-CSI-RS-
ResourceId
    }
}
```

In more detail, the TRP index may correspond to the p0-PUCCH-Id value configured for PUCCH power control. For example, if p0-PUCCH-Id has a value between 1 and 4, p0-PUCCH-Id may correspond to TRP index 0, and when p0-PUCCH-Id has a value between 5 and 8, p0-PUCCH-Id may correspond to TRP index 1. The mapping between the p-PUCCH-Id range and the TRP index may be changed. Alternatively, the TRP index may correspond to pathloss-ReferenceRS configured for PUCCH power control. Alternatively, the TRP index may correspond to a power control adjustment state index configured for PUCCH power control. The power control adjustment state index is an indicator indicating the power control state of the PUCCH resource, and may also be referred to as a closed loop power control index, TRP/panel specific closed loop power control index, or the like. The power control adjustment state index may have one of two values when the twoPUCCH-PC-AdjustmentStates value of the RRC parameter is configured as twoStates, for example, a value indicated by i0 or i1, where i0 may correspond to TRP index 0 and i1 may correspond to TRIP index 1. The above-mentioned i0 or i1 may be indicated in the form of closedLoopIndex parameter value in spatial relation info activated by PUCCH/PUCCH group as follows.

```
PUCCH-SpatialRelationInfo ::=       SEQUENCE {
    pucch-SpatialRelationInfoId         PUCCH-SpatialRelationInfoId,
    servingCellId                           ServCellIndex
OPTIONAL, -- Need S
    referenceSignal                     CHOICE {
        ssb-Index                           SSB-Index,
        csi-RS-Index                        NZP-CSI-RS-
ResourceId,
        srs                                 SEQUENCE {
                                            resource
SRS-ResourceId,
                                            uplinkBWP
BWP-Id
                                        }
    },
    pucch-PathlossReferenceRS-Id        PUCCH-
PathlossReferenceRS-Id,
    p0-PUCCH-Id                         P0-PUCCH-Id,
    closedLoopIndex                     ENUMERATED { i0, i1 }
}
```

According to the above description, among the PUCCH resources, the resource with closedLoopIndex parameter related to spatial relation info configured as i0 may be regarded as a PUCCH resource corresponding to TRP index 0, and the resource with closedLoopIndex parameter configured as i1 may be regarded as PUCCH resource corresponding to TRP index 1. Meanwhile, the power control adjustment state index may be extended to be able to configure two per TRP. Therefore, when the number of TRPs supported is a maximum of 2, the total configurable power control adjustment state index may be expanded to 4. For example, as the value of the twoPUCCH-PC-Adjustment-States parameter, for example, FourStates may be configured or new parameters such as the fourPUCCH-PC-AdjustmentStates parameter may be configured. At this time, when the closedLoopIndex parameter related to the spatial relation info is configured as i0 and i1, the closedLoopIndex parameter may be regarded as TRP index 0, and when the closedLoopIndex parameter is configured as i2, i3 or a new parameter in the spatial relation info, for example, the closedLoopIndexNew parameter is additionally configured, the closedLoopIndex parameter may be regarded as TRP index 1. In addition, as described above, a connection relationship between PUCCH resource and TRP index can be established.

Alternatively, when the beam/TRP between overlapping PUCCHs is different, the base station may instruct multiplexing configuration so that multiplexing is not performed. For example, when the above-described simultaneousHARQ-ACK-CSI is configured, the terminal might not expect a situation in which the PUCCH resource in which HARQ-ACK is transmitted and the PUCCH resource in which CSI is transmitted overlap in Case 2. At this time, the inter-PUCCH beam/TRP may indicate the above-described TRP index.

In the case of intra-slot TDMed separate HARQ-ACK, constraints for simplifying the overlap processing method between PUCCHs may be configured. For example, the PUCCH format of the PUCCH resource for HARQ-ACK transmission may be limited, and the format may be a short PUCCH, that is, format 0 and format 2 or some of them. It is also possible to be limited to a long PUCCH or some of them. Alternatively, in the case of Intra-slot TDMed separate HARQ-ACK, multiplexing between HARQ-ACK and CSI is not expected, or it is possible to ignore the multiplexing between HARQ-ACK and CSI and to always drop overlapping CSIs.

Meanwhile, the above-mentioned method can be similarly applied even when multi-slot repetition is configured. Therefore, for details, refer to the above.

Alternatively, when multi-slot repetition is configured, multiplexing is not allowed between overlapping PUCCHs similar to Rel-15, and the PUCCH resource or UCI with a low priority may be dropped from overlapping slots depending on the priority of HARQ-ACK>SR>CSI. Accordingly, when multiple CSIs are multiplexed, priority between CSIs may be applied.

Meanwhile, even when the PUCCH and the PUSCH overlap, multiplexing or dropping may occur. In this case, the PUCCH and the PUSCH may be scheduled in the same serving cell or component carrier (CC), or may be scheduled in the same cell group or other serving cells/CCs belonging to the same PUCCH group. At this time, a case in which Multiple PUCCH and single PUSCH for HARQ-ACK transmission similar to Case 1 overlap within the same cell group or the same PUCCH group, single PUCCH and single PUSCH for HARQ-ACK/SR/CSI transmission similar to Case 2 overlap, or multiple PUSCHs scheduled in multiple serving cells/CC and single/multiple PUSCHs overlap may occur. At this time, the TRP index is configured for each CORESET where DCIs for scheduling PUSCHs are transmitted in each serving cell/CC, and the TRP index may be configured for PUCCHs overlapping these PUSCHs. When multiplexing between the overlapped PUCCH and PUSCH, the PUCCH may be multiplexed on the PUSCH corresponding to the lowest serving cell/CC index among PUSCHs corresponding to the same value as the TRP index of the PUCCH. If there is no PUSCH corresponding to the same value as the TRP index of the corresponding PUCCH, the corresponding PUCCH may be dropped or the PUSCH may be dropped according to a preset priority. For example, when the PUCCH includes HARQ-ACK, the PUSCH is dropped, and when the PUCCH includes the CSI and the PUSCH also includes the CSI, the PUCCH may be dropped. If the TRP index is not configured in the PUSCH, dropping or multiplexing may be performed according to the rules configured in Rel-15.

At this time, the TRP or TRP index of the PUCCH may be obtained according to the above-described method. For example, the TRP index may be expressed as a parameter configured for PUCCH power control. As an example, the TRP index may be expressed as one of the following values in the following PUCCH-PowerControl IE configured as RRC or a combination thereof.

```
PUCCH-PowerControl ::=              SEQUENCE {
    deltaF-PUCCH-f0                     INTEGER (-16..15)
OPTIONAL, -- Need R
    deltaF-PUCCH-f1                     INTEGER (-16..15)
OPTIONAL, -- Need R
    deltaF-PUCCH-f2                     INTEGER (-16..15)
OPTIONAL, -- Need R
    deltaF-PUCCH-f3                     INTEGER (-16..15)
OPTIONAL, -- Need R
    deltaF-PUCCH-f4                     INTEGER (-16..15)
OPTIONAL, -- Need R
    p0-Set                              SEQUENCE (SIZE
(1..maxNrofPUCCH-P0-PerSet)) OF
    P0-PUCCH                                        OPTIONAL,
-- Need M
    pathlossReferenceRSs                SEQUENCE (SIZE
(1..maxNrofPUCCH-PathlossReferenceRSs)) OF
PUCCH-PathlossReferenceRS
OPTIONAL, -- Need M
    twoPUCCH-PC-AdjustmentStates        ENUMERATED
{twoStates}
```

-continued

```
    OPTIONAL, -- Need S
    ...
    }
    P0-PUCCH ::=                       SEQUENCE {
        p0-PUCCH-Id                        P0-PUCCH-Id,
        p0-PUCCH-Value                     INTEGER (-16..15)
    }
    P0-PUCCH-Id ::=                    INTEGER (1..8)
    PUCCH-PathlossReferenceRS ::=      SEQUENCE {
        pucch-PathlossReferenceRS-Id       PUCCH-
PathlossReferenceRS-Id,
        referenceSignal                    CHOICE {
            ssb-Index                          SSB-Index,
            csi-RS-Index                       NZP-CSI-RS-
ResourceId
        }
    }
```

In more detail, the TRP index may correspond to the p0-PUCCH-Id value configured for PUCCH power control. For example, if p0-PUCCH-Id has a value between 1 and 4, p0-PUCCH-Id may correspond to TRP index 0, and when p0-PUCCH-Id has a value between 5 and 8, p0-PUCCH-Id may correspond to TRP index 1. The mapping between the p0-PUCCH-Id range and the TRP index may be changed. Alternatively, the TRP index may correspond to pathlossReferenceRS configured for PUCCH power control. Alternatively, the TRP index may correspond to a power control adjustment state index configured for PUCCH power control. The power control adjustment state index is an indicator indicating the power control state of the PUCCH resource, and may also be referred to as an expression such as closed loop power control index or TRP/panel specific closed loop power control index. The power control adjustment state index may have one of two values when the twoPUCCH-PC-AdjustmentStates value of the RRC parameter is configured as twoStates, for example, a value indicated by i0 or i1, where i0 may correspond to TRP index 0, and i1 may correspond to TRP index 1. The above-mentioned i0 or i1 may be indicated in the form of closedLoopIndex parameter value in spatial relation info activated by PUCCH/PUCCH group as follows.

```
PUCCH-SpatialRelationInfo ::=      SEQUENCE {
    pucch-SpatialRelationInfoId        PUCCH-SpatialRelationInfoId,
    servingCellId                         ServCellIndex
OPTIONAL, -- Need S
    referenceSignal                    CHOICE {
        ssb-Index                          SSB-Index,
        csi-RS-Index                       NZP-CSI-RS-
ResourceId,
        srs                                SEQUENCE {
                                               resource
SRS-ResourceId,
                                               uplinkBWP
BWP-Id
                                           }
    },
    pucch-PathlossReferenceRS-Id       PUCCH-
PathlossReferenceRS-Id,
    p0-PUCCH-Id                        P0-PUCCH-Id,
    closedLoopIndex                    ENUMERATED { i0, i1 }
}
```

According to the above description, among the PUCCH resources, a resource with closedLoopIndex parameter related to spatial relation info configured as i0 may be regarded as a PUCCH resource corresponding to TRP index 0, and a resource with closedLoopIndex parameter configured as i1 may be regarded as PUCCH resource corresponding to TRP index 1.

On the other hand, the power control adjustment state index may be extended to be able to configure two for each TRP. Therefore, when the number of TRPs supported is a maximum of 2, the total configurable power control adjustment state index may be expanded up to 4. For example, as the value of the twoPUCCH-PC-AdjustmentStates parameter, for example, FourStates may be configured or new parameters such as the fourPUCCH-PC-AdjustmentStates parameter may be configured. At this time, when the closedLoopIndex parameter connected to the spatial relation info is configured as i0 and i1, the closedLoopIndex parameter may be regarded as TRP index 0, and when the closedLoopIndex parameter is configured as i2, i3 or a new parameter in the spatial relation info, for example, closedLoopIndexNew parameter, the closedLoopIndex parameter may be regarded as TRP index 1. In addition, as described above, a connection relationship between PUCCH resource and TRP index can be established. The connection relationship as above can be similarly applied between a parameter for PUSCH power control and a TRP index.

Example 4; Method of Selecting PUCCH Resource for Multi-PDCCH-Based NC-JT

In this embodiment, when two or more PUCCH resources overlap, a method of selecting PUCCH resources for multiplexing is proposed.

Case i. When two or more PUCCH resources overlap, when the PUCCH for the HARQ-ACK transmission based on grant is included, as described above, among the PUCCH resources indicated by PRI 9-40, 9-41 for HARQ-ACK in the PDCCH, only the PUCCH resource (9-31) selected based on PRI (9-41) corresponding to the PDCCH (9-11) transmitted at the last time point may be selected and transmitted. The PUCCH resource selected at this time may be selected based on the payload of the UCI to be transmitted as described above. That is, a PUCCH resource set having a minimum payload not smaller than the UCI payload may be selected. Next, the PUCCH resource set indicated as PRI in the corresponding PUCCH resource set may be selected.

If the overlapped PUCCH resource contains UCI transmitted to different TRPs, a dropping rule as described in Example 3 may be applied.

If the overlapped PUCCH resource contains UCI to be transmitted to the same TRP, a method is needed to ensure that the selected PUCCH resource may also be transmitted to the same TRP according to the payload of the multiplexed UCI. For this, at least one of the following methods may be considered.

Method 1. Within the PUCCH resource set, only the PUCCH resource corresponding to the target TRP of the UCI to be multiplexed is selected.

Method 2. In the PUCCH resource set, the PUCCH resource that does not correspond to the target TRP of the UCI to be multiplexed is excluded. That is, one of the PUCCH resource corresponding to the target TRP and the PUCCH resource for which the target TRP is not configured are selected.

Method 3. PUCCH resource set and PUCCH resource are selected according to the Rel-15-based method described above. At this time, it is assumed that the target TRP of the selected PUCCH resource corresponds to the target TRP of the multiplexed UCI.

At this time, the index of the target TRP of the UCI may be an upper layer index configured in CORESET where a DCI corresponding to the corresponding HARQ-ACK is transmitted, for example, a CORESET group index or a TRP index in a case of HARQ-ACK. Meanwhile, in the case of CSI, the index of the target TRP may be a CORESET group index or a TRP index corresponding to a corresponding CSI report/resource configuration. Alternatively, the HARQ-ACK or CSI may be an explicit/implicit TRP classification factor corresponding to the PUCCH resource to be transmitted, and the corresponding TRP classification factor may be one of a CORESET group index/TRP index/serving cell index. Alternatively, a PUCCH resource group in which the corresponding PUCCH resource included or a group/set index corresponding to a PUCCH resource set may be used as a TRP classification factor.

Meanwhile, the target TRP corresponding to the PUCCH resource may be a TRP classification factor that explicitly/implicitly corresponds to the corresponding PUCCH resource, and the TRP classification factor may be one of a CORESET group index/TRP index/serving cell index. Alternatively, a PUCCH resource group to which the corresponding PUCCH resource belongs or a group/set index corresponding to a PUCCH resource set may be used as a TRP classification factor. Alternatively, the third embodiment may be represented by one or a combination of the above-described PUCCH power control parameters, and the parameter may be the above-described p0-PUCCH-Id value, pathlossReferenceRS, power control adjustment state index. If the power control adjustment state index is used, the TRP classification factor may be a corresponding TRP index from the power control adjustment state index as described above.

When the PUCCH resource selected according to one of the above methods overlaps with other PUCCH resources, the above-described UCI multiplexing and PUCCH resource selection process may be (re)applied if the target TRP of these PUCCH resources is the same. If the target TRP of these PUCCH resources is different, a dropping rule as described in Embodiment 3 above may be applied.

Case ii. When two or more PUCCH resources overlap, each of the corresponding PUCCH resources is a resource for CSI transmission, or when a HARQ-ACK based on a configured grant and one or more CSI overlap, as described above, if multiplexing between multiple CSIs is configured as a higher layer, a PUCCH resource list for CSI multiplexing configured as a higher layer, for example, all of the multiplexed UCI payloads in a multi-CSI-PUCCH-ResourceList may be transmitted, and UCI payload may be transmitted after selecting one resource with the lowest index. If there is no resource that may transmit all of the multiplexed UCI payloads in the list, the resource with the largest index is selected and the number of CSI reports that may be transmitted to the resource is transmitted.

If the overlapped PUCCH resource contains UCI transmitted to different TRPs, a dropping rule as described in Example 3 may be applied.

If the overlapped PUCCH resource contains UCI to be transmitted to the same TRP, a method is needed to ensure that the selected PUCCH resource may also be transmitted to the same TRP according to the payload of the multiplexed UCI. For this, at least one of the following methods may be considered.

Method 1. In the multi-CSI-PUCCH-ResourceList, select only the PUCCH resource corresponding to the target TRP of the UCI to be multiplexed.

Method 2. In the multi-CSI-PUCCH-ResourceList, PUCCH resources that do not correspond to the target TRP of the UCI to be multiplexed are excluded. That is, one of the PUCCH resource corresponding to the target TRP and the PUCCH resource for which the target TRP is not configured are selected.

Method 3. Select PUCCH resource in multi-CSI-PUCCH-ResourceList according to the Rel-15-based method described above. At this time, it is assumed that the target TRP of the selected PUCCH resource corresponds to the target TRP of the multiplexed UCI.

At this time, the target TRP of the UCI and the target TRP of the PUCCH resource may be identified according to the method described above (e.g., Case i).

When the PUCCH resource selected according to one of the above methods overlaps with other PUCCH resources, if the target TRP of the overlapping PUCCH resources is the same, the above-described UCI multiplexing and PUCCH resource selection process may be reapplied. If the target TRP of these PUCCH resources is different, a dropping rule as described in Embodiment 3 above may be applied.

Case iii. In the case of overlap between PUCCH resource and PUSCH, in Rel-15, a procedure for transmitting PUSCH only after multiplexing UCI of PUCCH to PUSCH or dropping PUSCH without PUCCH-PUSCH multiplexing is described. At this time, PUCCH and PUSCH where the overlap occurs may belong to the same serving cell, or may belong to the same cell group or another serving cell belonging to the same PUCCH group.

If the overlapped PUCCH resource and the target TRP of the PUSCH are different, a dropping rule similar to that described in (e.g., Embodiment 3) may be applied.

If the overlapped PUCCH resource and the target TRP of the PUSCH are the same, there is a need for a method to ensure that the multiplexed PUSCH may also be designated as the same target TRP. For this, at least one of the following methods may be considered.

Method 1. Within the PUCCH and the overlapped PUSCH, one PUSCH corresponding to the target TRP of the UCI to be multiplexed is selected according to a predetermined rule. The rule may be the same as the rule described in Embodiment 3.

Method 2. Within the PUCCH and the overlapped PUSCH, PUSCH that does not correspond to the target TRP of the UCI to be multiplexed is excluded. That is, one of the PUSCH corresponding to the target TRP and the PUSCH for which the target TRP is not configured are selected. The rule may be the same as the rule described in Embodiment 3.

Method 3. According to the Rel-15-based method, the PUSCH to be multiplexed is selected regardless of whether the target TRP value of the PUSCH or the target TRP is configured. At this time, it may be assumed that the target TRP of the selected PUSCH corresponds to the target TRP of the multiplexed UCI. At this time, the target TRP of the UCI and the target TRP of the PUCCH resource may be identified according to the method described above (e.g., Case i). The target TRP of the PUSCH may be identified through the TRP index configured in the CORESET where the DCI that schedules the PUSCH is transmitted, or may be identified through a beam for transmission of the corresponding PUSCH, for example, TPMI indicated by DCI scheduling the corresponding PUSCH or spatialRelationInfo connected to SRI or SRS specified as SRI.

When the selected PUSCH overlaps with other PUCCH resources according to one of the above methods, if the target TRPs of these PUSCHs and PUCCH resources are the same, the multiplexing process described above may be reapplied. If the target TRPs of these PUSCH and PUCCH resources are different, a dropping rule as described in Embodiment 3 above may be applied.

Meanwhile, in the method proposed in the disclosure, some components may be omitted and only some components may be included without detracting from the essence of the disclosure.

In addition, the method proposed in the disclosure may be performed in combination with some or all of the contents included in each embodiment without detracting from the essence of the disclosure.

Embodiment; Method of Generating a HARQ-ACK Codebook for Repetitive Transmission NC-JT NC-JT may be used to improve the reliability of PDSCH repeat transmission. Repeated transmission of NC-JT PDSCH may be performed through different time resources. For example, the PDSCH may be repeatedly transmitted for each slot over multiple slots, or the PDSCH may be repeatedly transmitted within one slot. A single PDCCH may be used to schedule the repetitive transmission. The DCI of the PDCCH may indicate a list of all TRPs participating in repetitive transmission. The list of TRPs to be repeatedly transmitted may be indicated in the form of a TCI state list, and the length of the TCI state list may be changed dynamically.

When the PDSCH is repeatedly transmitted over multiple slots, the time and frequency resources of the first PDSCH transmitted are indicated by DCI, and the time and frequency resources in the slots allocated to the PDSCH repeatedly transmitted for each slot may be the same. If the number of repetitive transmissions is greater than the number of TCI states, a specific pattern may be followed when the TCI state is applied to each repetition slot. For example, if the number of repetitive transmissions is 4 and TCI state indexes 1 and 2 are indicated, the TCI state may be applied to each of the transmission slots according to the pattern of 1, 2, 1, 2 or the pattern of 1, 1, 2, 2. In addition, the number of repetitive transmissions may be dynamically indicated through DCI/MAC-CE. For example, the number of repetitive transmissions may be indicated through a time domain resource allocation field indicated by DCI. For example, in addition to the value indicated in the current NR through the time domain resource allocation field of DCI, for example, the values of K0, S, L, etc. described above in FIG. 8, the number of repetitive transmissions may be indicated together.

When a PDSCH is repeatedly transmitted in one slot, time and frequency resources of the first PDSCH transmitted in the slot may be indicated by DCI, and symbol length and frequency resources allocated for each PDSCH repeatedly transmitted may be the same. The repetitively transmitted PDSCH offset may be configured in a unit of symbols. For example, as a reference to the last symbol of the first repetitive transmission PDSCH, the next repetitive transmission PDSCH may be transmitted after a symbol separated by a configured offset.

For the convenience of description, the repetitive transmission method has been described with NC-JT as an example, but the repetitive transmission method is similarly applicable to a single TRP-based transmission. For example, a method in which the number of repetitive transmissions is dynamically indicated through a time domain resource allocation field indicated by DCI is similarly applicable to a single TRP-based transmission.

When repetitive transmission is configured according to the above embodiment, HARQ-ACK codebook generation methods may be different for each repetitive transmission method. That is, different HARQ-ACK codebook generation methods may be applied according to repeated transmission in a slot or repeated transmissions over multiple slots. In this embodiment, for convenience of description, a description is focused on a type 1 HARQ-ACK codebook.

Figure 16A:
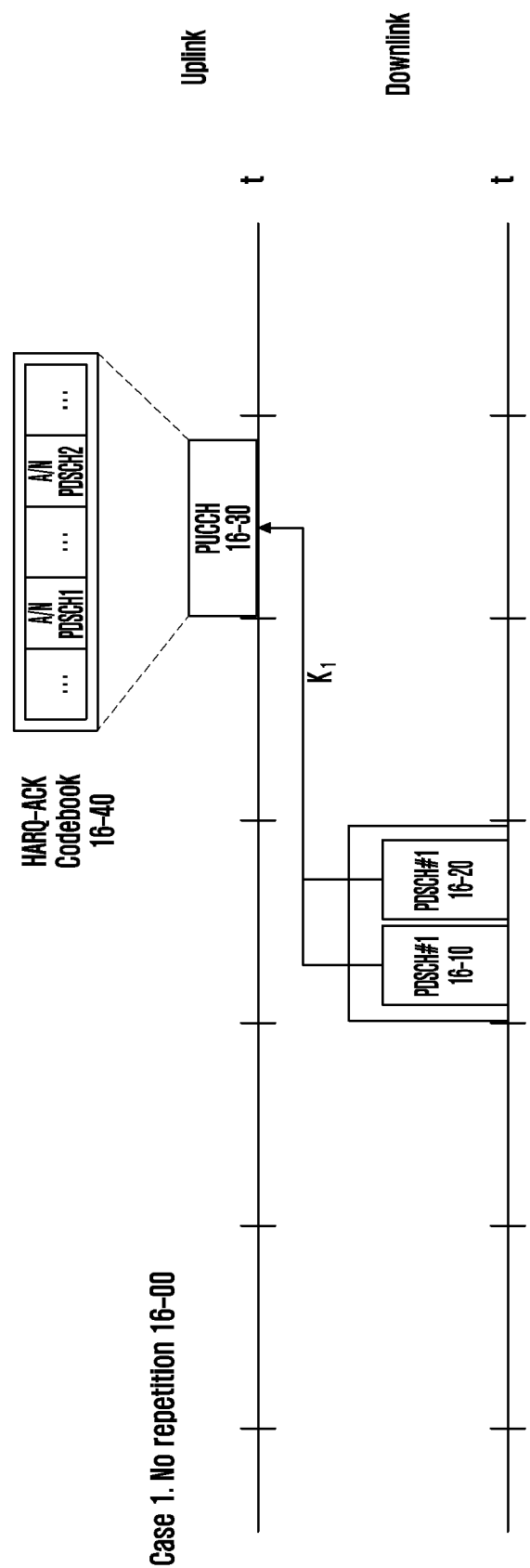
FIG. 16A illustrates a view for type 1 HARQ-ACK codebook methods for each PDSCH repetitive transmission across multiple slots, a PDSCH repetitive transmission within a single slot, and no repetitive transmission according to an embodiment.
Figure 16B:
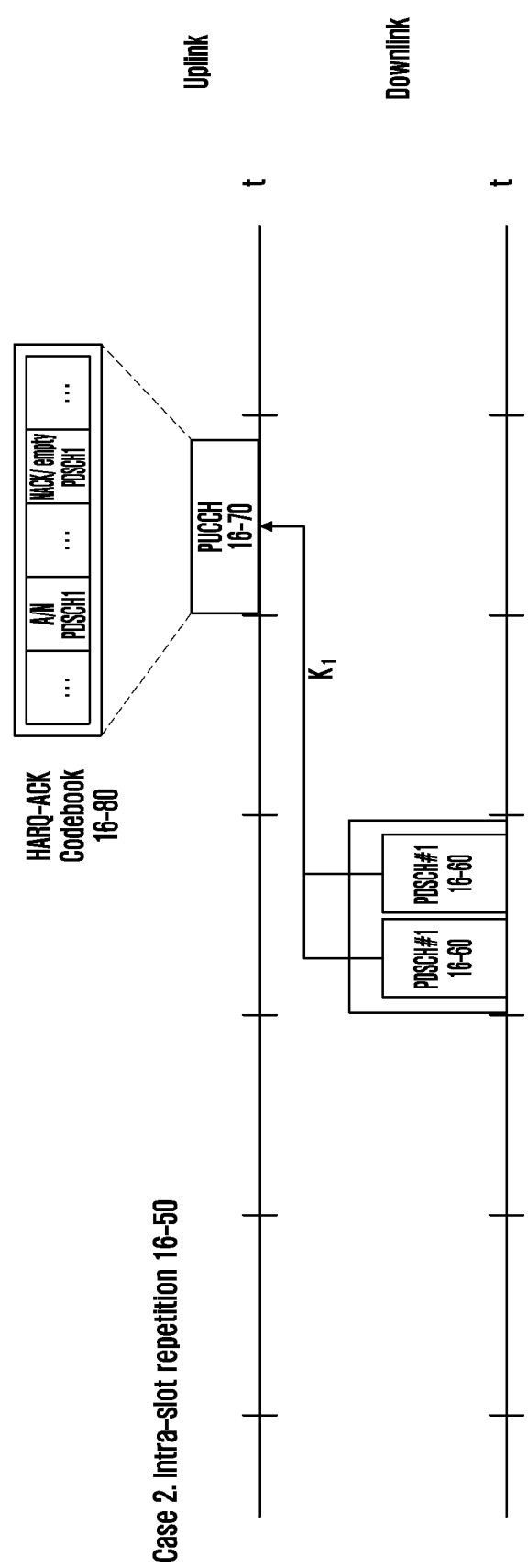
FIG. 16B is a view illustrating type 1 HARQ-ACK codebook methods for each PDSCH repetitive transmission across multiple slots, a PDSCH repetitive transmission within a single slot, and no repetitive transmission according to an embodiment.

FIG. 16A illustrates a view for type 1 HARQ-ACK codebook methods for each PDSCH repetitive transmission across multiple slots, a PDSCH repetitive transmission within a single slot, and no repetitive transmission according to an embodiment, FIG. 16B is a view illustrating type 1 HARQ-ACK codebook methods for each PDSCH repetitive transmission across multiple slots, a PDSCH repetitive transmission within a single slot, and no repetitive transmission according to an embodiment, and FIG. 16C illustrates a view for type 1 HARQ-ACK codebook methods for each PDSCH repetitive transmission across multiple slots, a PDSCH repetitive transmission within a single slot, and no repetitive transmission according to an embodiment.

First, when there is no repetitive transmission (16-00), a set $M_{A,c}$ of a reception candidate case may be configured according to the pseudo-code 1, and HARQ-ACK feedback bit may be determined according to whether a PDSCH corresponding to each reception candidate in the set $M_{A,c}$ is received according to pseudo-code 2. Whether to receive PDSCH #1 16-10 and PDSCH #2 16-20 is composed of HARQ-ACK codebooks 16-40, respectively, and may be transmitted as PUCCH resources 16-30 or PUSCH resources.

Next, when repetitive transmission in a slot is configured (16-50), a set $M_{A,c}$ of a reception candidate case may be configured according to the pseudo-code 1, and the HARQ-ACK feedback bit may be determined according to whether each reception candidate in the set $M_{A,c}$ according to the pseudo-code 2 may be determined according to whether a PDSCH corresponding to each reception candidate in the set $M_{A,c}$ is received according to pseudo-code 2. On the other hand, in the pseudo-code 2, the HARQ-ACK feedback bit is determined according to whether the repetitive PDSCH is received for the first repetitively transmitted PDSCH, while the HARQ-ACK feedback bit is omitted or the corresponding PDSCH for the second and subsequent PDSCH, or in the case of a reception candidate corresponding to, that is, a HARQ-ACK feedback bit may be determined as a NACK at a position corresponding to a corresponding PDSCH among $M_{A,c}$. In addition, when it is configured as to whether the intra-slot repetitive transmission is performed, repetitive transmissions over multiple slots might not be configured at the same time, and thus, in this case, the number of transmission slots may be regarded as one slot.

Next, when repetitive transmission is configured over multiple slots (16-90), the HARQ-ACK feedback bit of the repeated transmission PDSCH 16-92 may be transmitted to the PUCCH 16-95 transmitted to the slot corresponding to the K1 value from the last slot where the PDSCH is repeatedly transmitted. When the HARQ-ACK is transmitted according to the pseudo-code 1 and the pseudo-code 2 with respect to the PUCCH (16-94) of the remaining slots, the HARQ-ACK feedback bit may be determined as a NACK at a reception candidate corresponding to the repetitively transmitted PDSCH, that is, a position corresponding to the corresponding PDSCH among $M_{A,c}$.

Figure 17:
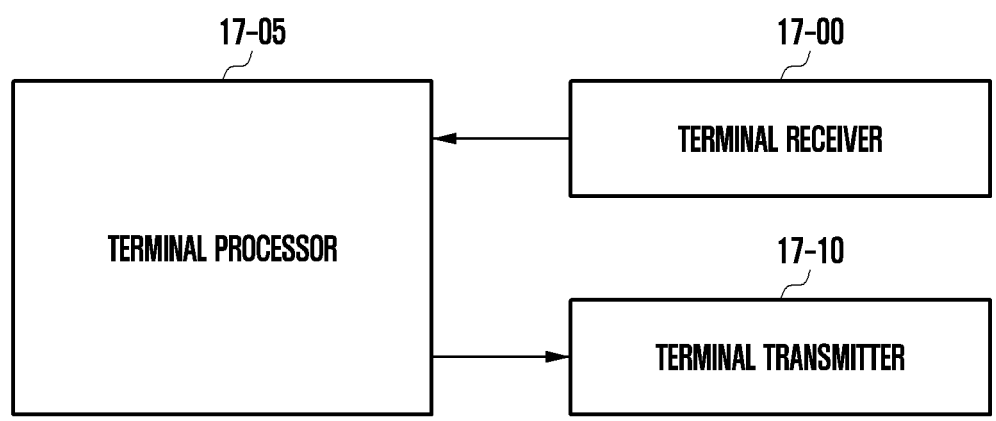
FIG. 17 illustrates a terminal structure in a wireless communication system according to an embodiment.

FIG. 17 illustrates a terminal structure in a wireless communication system according to an embodiment.

Referring to FIG. 17, the terminal may include a transceiver 17-00, a memory 17-05, and a processor 17-10. According to the communication method of the above-described terminal, the transceiver 17-00 and the processor 17-10 of the terminal may operate. However, the components of the terminal are not limited to the above-described examples. For example, the terminal may include more components or fewer components than the aforementioned components. In addition, the transceiver 17-00, the memory 17-05, and the processor 17-10 may be implemented in the form of single chip.

The transceiver 17-00 may transmit and receive a signal to and from a base station. Here, the signal may include control information and data. To this end, the transceiver 17-00 may include an RF transmitter that up-converts and amplifies the frequency of the transmitted signal, an RF receiver that amplifies the received signal with low noise and down-converts the frequency. However, this is only an embodiment of the transceiver 17-00, and the components of the transceiver 17-00 are not limited to the RF transmitter and the RF receiver.

The transceiver 17-00 may receive a signal through a wireless channel, output the signal to the processor 17-10, and transmit a signal output from the processor 17-10 through the wireless channel.

The memory 17-05 may store programs and data necessary for the operation of the terminal. In addition, the memory 17-05 may store control information or data included in signals transmitted and received by the terminal. The memory 17-05 may include a storage medium such as a ROM, a RAM, a hard disk, a CD-ROM and a DVD, or a combination of storage media. In addition, a plurality of memories 17-05 may be provided.

In addition, the processor 17-10 may control a series of processes so that the terminal operates according to the above-described embodiment. For example, the processor 17-10 may control a component of the terminal to receive a plurality of PDSCH at the same time by receiving a DCI composed of two layers. There may be a plurality of processors 17-10, and the processors 17-10 may perform component control operations of the terminal by executing a program stored in the memory 17-05.

Figure 18:
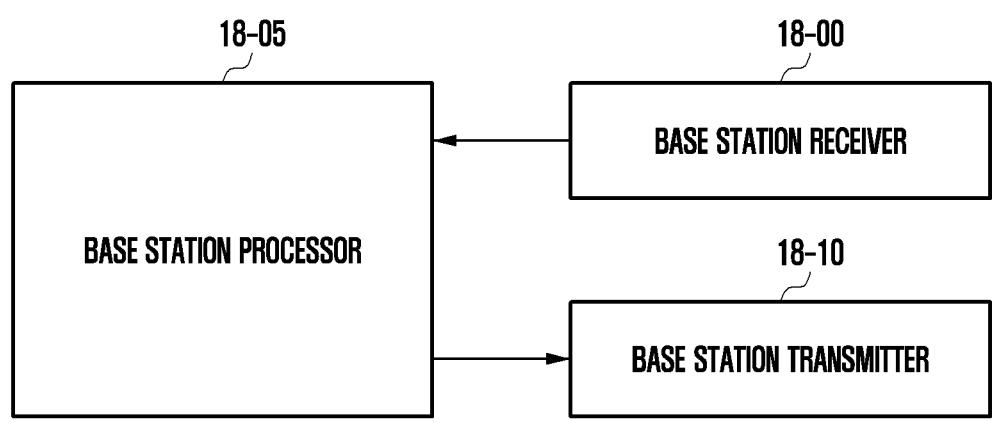
FIG. 18 illustrates a structure of a base station in a wireless communication system according to an embodiment.

FIG. 18 illustrates a structure of a base station in a wireless communication system according to an embodiment.

Referring to FIG. 18, the base station may include a transceiver 18-00, a memory 18-05, and a processor 18-10. Depending on the communication method of the base station, the transceiver 18-00 and the processor 18-10 of the base station may operate. However, the components of the base station are not limited to the examples described above. For example, the base station may include more or less components than the above-described components. In addition, the transceiver 18-00, the memory 18-05, and the processor 18-10 may be implemented in the form of single chip.

The transceiver 18-00 may transmit and receive signals to and from the terminal. Here, the signal may include control information and data. To this end, the transceiver 18-00 may be configured with an RF transmitter that up-converts and amplifies the frequency of the transmitted signal, and an RF receiver that amplifies the received signal with low noise and down-converts the frequency. However, this is only an embodiment of the transceiver 18-00, and the components of the transceiver 18-00 are not limited to RF transmitters and RF receivers. The transceiver 18-00 may receive a signal through a wireless channel, output the signal to the processor 18-10, and transmit the signal output from the processor 18-10 through the wireless channel.

The memory 18-05 may store programs and data necessary for the operation of the base station. Further, the memory 18-05 may store control information or data included in signals transmitted and received by the base station. The memory 18-05 may include a storage medium such as a ROM, a RAM, a hard disk, a CD-ROM and a DVD, or a combination of storage media. In addition, a plurality of memories 18-05 may be provided.

The processor 18-10 may control a series of processes so that the base station may operate according to the above-described embodiments. For example, the processor 18-10 may configure two layers of DCIs including allocation information for multiple PDSCHs and control each component of the base station to transmit them. There may be a plurality of processors 18-10, and the processors 18-10 may perform component control operations of the base station by executing a program stored in the memory 18-05.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical spirit of the disclosure. Further, the above respective embodiments may be employed in combination, as necessary. For example, embodiments 1 and 2 of the disclosure may be partially combined to operate a base station and a terminal. Further, although the above embodiments have been described by way of the FDD LTE system, other variants based on the technical idea of the embodiments may be implemented in other systems such as TDD LTE, 5G, and NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for transmitting hybrid automatic repeat request (HARQ) information for multi-transmission and reception points (TRPs) performed by a terminal in a wireless communication system, the method comprising:
   receiving, from a base station, a list of physical downlink shared channel (PDSCH) time domain resources via radio resource control (RRC) signaling, each of the PDSCH time domain resources including a slot offset between downlink control information (DCI) and a PDSCH scheduled by the DCI;
   receiving, from the base station, the DCI including a field indicating one of the PDSCH time domain resources and an indicator, wherein the field indicates a repetition number;
   performing PDSCH receptions on the one of the PDSCH time domain resources indicated by the field in a plurality of slots based on the repetition number; and
   transmitting, to the base station, the HARQ information for the PDSCH receptions,
   wherein the HARQ information corresponding to a first PDSCH reception in a first slot other than a last slot of the plurality of slots is set to a negative acknowledgment (NACK).

2. The method of claim 1, wherein the HARQ information corresponding to a second PDSCH reception in the last slot of the plurality of slots is set to an acknowledgment (ACK) in case that a PDSCH is received successfully.

3. The method of claim 1,
   wherein a plurality of HARQ feedback timings are received via the RRC signaling,
   wherein the DCI includes an indicator indicating one of the plurality of HARQ feedback timings,
   wherein the HARQ information is transmitted in a second slot determined based on the last slot of the plurality of slots and a HARQ feedback timing indicated by the DCI, and
   wherein a number of the HARQ feedback timings is configured to a maximum of 8.

4. The method of claim 1, wherein a start symbol and a number of symbols of the plurality of slots are received via the RRC signaling.

5. A method for transmitting hybrid automatic repeat request (HARQ) information for multi-transmission and reception points (TRPs) performed by a base station in a wireless communication system, the method comprising:
   transmitting, to a terminal, a list of physical downlink shared channel (PDSCH) time domain resources via radio resource control (RRC) signaling, each of the PDSCH time domain resources including a slot offset between downlink control information (DCI) and a PDSCH scheduled by the DCI;
   transmitting, to the terminal, the DCI including a field indicating one of the PDSCH time domain resources and an indicator, wherein the field indicates a repetition number;
   transmitting, to the terminal, PDSCHs on the one of the PDSCH time domain resources indicated by the field in a plurality of slots based on the repetition number; and
   receiving, from the terminal, the HARQ information for the PDSCHs,
   wherein the HARQ information corresponding to a first PDSCH in a first slot other than a last slot of the plurality of slots is set to a negative acknowledgment (NACK).

6. The method of claim 5, wherein the HARQ information corresponding to a second PDSCH in the last slot of the plurality of slots is set to an acknowledgment (ACK) in case that a PDSCH is transmitted successfully.

7. The method of claim 5,
   wherein a plurality of HARQ feedback timings are transmitted via the RRC signaling,
   wherein the DCI includes an indicator indicating one of the plurality of HARQ feedback timings, and
   wherein the HARQ information is received in a second slot determined based on the last slot of the plurality of slots and a HARQ feedback timing indicated by the DCI, and
   wherein a number of the HARQ feedback timings is configured to a maximum of 8.

8. The method of claim 5, wherein a start symbol and a number of symbols of the plurality of slots are transmitted via the RRC signaling.

9. A terminal for transmitting hybrid automatic repeat request (HARQ) information for multi-transmission and reception points (TRPs) in a wireless communication system, the terminal comprising:
   a transceiver; and
   a controller coupled with the transceiver and configured to:
      receive, from a base station, a list of PDSCH time domain resources via radio resource control (RRC) signaling, each of the PDSCH time domain resources including a slot offset between downlink control information (DCI) and a physical downlink shared channel (PDSCH) scheduled by the DCI,
      receive, from the base station, the DCI including a field indicating one of the PDSCH time domain resources, wherein the field indicates a repetition number,
      perform physical downlink shared channel (PDSCH) receptions on the one of the PDSCH time domain resources indicated by the field in a plurality of slots based on the repetition number, and
      transmit, to the base station, the HARQ information for the PDSCH receptions,
   wherein the HARQ information corresponding to a first PDSCH reception in a first slot other than a last slot of the plurality of slots is set to a negative acknowledgment (NACK).

10. The terminal of claim 9, wherein the HARQ information corresponding to a second PDSCH reception in the last slot of the plurality of slots is set to an acknowledgment (ACK) in case that a PDSCH is received successfully.

11. The terminal of claim 9,
wherein a plurality of HARQ feedback timings are received via the RRC signaling,
wherein the DCI includes an indicator indicating one of the plurality of HARQ feedback timings,
wherein the HARQ information is transmitted in a second slot determined based on the last slot of the plurality of slots and a HARQ feedback timing indicated by the DCI, and
wherein a number of the HARQ feedback timings is configured to a maximum of 8.

12. The terminal of claim 9, wherein a start symbol and a number of symbols of the plurality of slots are received via the RRC signaling.

13. A base station for transmitting hybrid automatic repeat request (HARQ) information for multi-transmission and reception points (TRPs) in a wireless communication system, the base station comprising:
a transceiver; and
a controller coupled with the transceiver and configured to:
transmit, to a terminal, a list of PDSCH time domain resources via radio resource control (RRC) signaling, each of the PDSCH time domain resources including a slot offset between downlink control information (DCI) and a physical downlink shared channel (PDSCH) scheduled by the DCI,
transmit, to the terminal, the DCI including a field indicating one of the PDSCH time domain resources and an indicator, wherein the field indicates a repetition number,
transmit, to the terminal, physical downlink shared channels (PDSCHs) on the one of the PDSCH time domain resources indicated by the field in a plurality of slots based on the repetition number, and
receive, from the terminal, the HARQ information for the PDSCHs,
wherein the HARQ information corresponding to a first PDSCH in a first slot other than a last slot of the plurality of slots is set to a negative acknowledgment (NACK).

14. The base station of claim 13, wherein the HARQ information corresponding to a second PDSCH in the last slot of the plurality of slots is set to an acknowledgment (ACK) in case that a PDSCH is transmitted successfully.

15. The base station of claim 13,
wherein a plurality of HARQ feedback timings are transmitted via the RRC signaling,
wherein the DCI includes an indicator indicating one of the plurality of HARQ feedback timings, and
wherein the HARQ information is received in a second slot determined based on the last slot of the plurality of slots and a HARQ feedback timing indicated by the DCI, and
wherein a number of the HARQ feedback timings is configured to a maximum of 8.

16. The base station of claim 13, wherein a start symbol and a number of symbols of the plurality of slots are transmitted via the RRC signaling.

\* \* \* \* \*